US011861640B2

(12) United States Patent
Doumar et al.

(10) Patent No.: US 11,861,640 B2
(45) Date of Patent: *Jan. 2, 2024

(54) SYSTEM AND METHOD FOR OMNICHANNEL TEXT-BASED ROUTING, TRANSFER, AND COMMUNICATION SYSTEM

(71) Applicant: TapText llc, Coral Springs, FL (US)

(72) Inventors: Steve Doumar, Fort Lauderdale, FL (US); Paul Levasseur, Fort Lauderdale, FL (US)

(73) Assignee: TAPTEXT, LLC, Coral Springs, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/875,402

(22) Filed: Jul. 27, 2022

(65) Prior Publication Data

US 2023/0029355 A1    Jan. 26, 2023

Related U.S. Application Data

(63) Continuation of application No. 17/349,659, filed on Jun. 16, 2021, now Pat. No. 11,488,188, which is a
(Continued)

(51) Int. Cl.
*H04M 1/64* (2006.01)
*G06Q 30/0207* (2023.01)
(Continued)

(52) U.S. Cl.
CPC ..... *G06Q 30/0207* (2013.01); *G06F 16/9554* (2019.01); *G06F 16/9558* (2019.01);
(Continued)

(58) Field of Classification Search
CPC ......... H04M 3/53333; H04M 3/53308; H04M 3/527; H04M 3/523; H04M 3/4878; G06Q 30/0207
(Continued)

(56) References Cited

U.S. PATENT DOCUMENTS 8,630,899 B1 * 1/2014 Barbulescu ......... H04M 3/4878
705/14.55
10,051,075 B1    8/2018 Kothari et al.
(Continued)

*Primary Examiner* — Md S Elahee
(74) *Attorney, Agent, or Firm* — Galvin Patent Law LLC; Brian R. Galvin

(57) ABSTRACT

A system and method for omnichannel text-based routing, transfer, and customer-to-enterprise communications. The system is a cloud-based network containing an interaction control server, a routing engine, an optimization engine, a media translation server, a mobile application, a business entity portal, mobile and compute devices for business enterprise and customer, and an enterprise database. Taken together or in part, said system optimizes customer interactions by delivering context aware text message, chat or email to customers; and when requested by customer, optimally routes with context, based upon a multitude of variables, to best available resource to handle the customer interaction. The system may be accessed through web browsers or purpose-built computer and mobile phone applications.

20 Claims, 59 Drawing Sheets

Related U.S. Application Data continuation of application No. 17/348,660, filed on Jun. 15, 2021, now Pat. No. 11,232,471, which is a continuation of application No. 17/344,695, filed on Jun. 10, 2021, now Pat. No. 11,354,691, which is a continuation of application No. 17/229,251, filed on Apr. 13, 2021, which is a continuation-in-part of application No. 17/209,474, filed on Mar. 23, 2021, now Pat. No. 11,599,916, which is a continuation-in-part of application No. 17/208,059, filed on Mar. 22, 2021, now Pat. No. 11,562,407, which is a continuation-in-part of application No. 17/191,977, filed on Mar. 4, 2021, which is a continuation-in-part of application No. 17/190,260, filed on Mar. 2, 2021, now Pat. No. 11,532,020, which is a continuation-in-part of application No. 17/153,426, filed on Jan. 20, 2021, now abandoned.

(60) Provisional application No. 63/166,391, filed on Mar. 26, 2021, provisional application No. 63/154,357, filed on Feb. 26, 2021, provisional application No. 63/040,610, filed on Jun. 18, 2020, provisional application No. 63/025,287, filed on May 15, 2020, provisional application No. 63/022,190, filed on May 8, 2020, provisional application No. 62/994,219, filed on Mar. 24, 2020, provisional application No. 62/965,626, filed on Jan. 24, 2020, provisional application No. 62/963,368, filed on Jan. 20, 2020, provisional application No. 62/963,379, filed on Jan. 20, 2020.

(51) Int. Cl.

| | | |
|---|---|---|
| *G06K 19/06* | (2006.01) | |
| *G06F 16/955* | (2019.01) | |
| *G06N 20/00* | (2019.01) | |
| *H04M 3/527* | (2006.01) | |
| *H04M 3/533* | (2006.01) | |
| *G06F 21/32* | (2013.01) | |
| *G06F 21/62* | (2013.01) | |
| *G06K 7/14* | (2006.01) | |
| *G06Q 10/0631* | (2023.01) | |
| *G06Q 30/016* | (2023.01) | |
| *G06Q 30/0201* | (2023.01) | |
| *H04M 3/523* | (2006.01) | |
| *G06Q 30/0251* | (2023.01) | |

(52) U.S. Cl.
CPC .......... *G06F 21/32* (2013.01); *G06F 21/6245* (2013.01); *G06K 7/1417* (2013.01); *G06K 19/06037* (2013.01); *G06N 20/00* (2019.01); *G06Q 10/06315* (2013.01); *G06Q 30/016* (2013.01); *G06Q 30/0201* (2013.01); *H04M 3/523* (2013.01); *H04M 3/527* (2013.01); *H04M 3/53308* (2013.01); *H04M 3/53333* (2013.01); *G06F 2221/2139* (2013.01); *G06Q 30/0267* (2013.01)

(58) Field of Classification Search
USPC ............................... 379/88.22, 265.01–266.1
See application file for complete search history.

(56) References Cited

U.S. PATENT DOCUMENTS

| | | |
|---|---|---|
| 10,165,114 B1 | 12/2018 | Liu |
| 10,171,669 B2 | 1/2019 | Korolev et al. |
| 10,218,850 B2 | 2/2019 | Conway et al. |
| 2007/0241189 A1 | 10/2007 | Slavin et al. |
| 2009/0144068 A1 | 6/2009 | Altberg et al. |
| 2009/0234731 A1 | 9/2009 | Mariotti |
| 2013/0325567 A1 | 12/2013 | Bradley et al. |
| 2014/0257945 A1 | 9/2014 | Sandridge et al. |
| 2015/0178784 A1 | 6/2015 | Oliver et al. |
| 2017/0231016 A1 | 8/2017 | Park et al. |

* cited by examiner

SYSTEM AND METHOD FOR OMNICHANNEL TEXT-BASED ROUTING, TRANSFER, AND COMMUNICATION SYSTEM

CROSS-REFERENCE TO RELATED APPLICATIONS

Priority is claimed in the application data sheet to the following patents or patent applications, the entire written description of each of which is expressly incorporated herein by reference in its entirety:
  Ser. No. 17/349,659
  Ser. No. 17/348,660
  Ser. No. 17/344,695
  Ser. No. 17/229,251
  63/166,391
  Ser. No. 17/209,474
  Ser. No. 17/208,059
  Ser. No. 17/191,977
  Ser. No. 17/190,260
  63/154,357
  Ser. No. 17/153,426
  63/040,610
  63/025,287
  63/022,190
  62/994,219
  62/965,626
  62/963,379
  62/963,368

BACKGROUND

Field of the Art

The disclosure relates to the field of computer-based communication systems, routing and optimization and artificial intelligent systems, and more particularly to the field of computerized routing and optimization systems using speech recognition as related to omnichannel communications.

Discussion of the State of the Art

Business enterprises often communicate with their customers in a siloed non-contextual approach offering one generic customer experience for in-store interactions; another for Internet website accessed via a fixed compute device; and yet another experience from a mobile device. In each case, generic communications modes are made available to the customer requiring them to navigate various screens and options when all they really want is assistance with their pre- or post-sales transaction from a resource knowing their unique history using a communication mode of their choosing. Moreover, when a customer does require assistance with their transaction, they want to accomplish it without introducing unnecessary delay while using their preferred mode of communication, whether text, chat, or email. From the business enterprise perspective, they are often already heavily invested in traditional call centers systems and human resources (agents) and therefore drive their customers to these resources when oftentimes better resources existing outside the call center. The end result is often a near-term suboptimal experience for the customer and potential loss of sale and long-term viability for the business.

There is currently no system that optimizes an omnichannel customer communication across all business enterprise resources that address these shortcomings.

What is needed is a system and method for optimized omnichannel customer interaction utilizing text-based communication resulting in short- and long-term business competitive advantage and viability.

SUMMARY

Accordingly, the inventor has conceived, and reduced to practice, a system and method for omnichannel text-based routing, transfer, and customer-to-enterprise communications. The system is a cloud-based network containing an interaction control server, a routing engine, an optimization engine, a media translation server, a mobile application, a business entity portal, mobile and compute devices for business enterprise and customer, and an enterprise database. Taken together or in part, said system optimizes customer interactions by delivering context aware text message, chat or email to customers; and when requested by customer, optimally routes with context, based upon a multitude of variables, to best available resource to handle the customer interaction. The system may be accessed through web browsers or purpose-built computer and mobile phone applications.

According to a first preferred embodiment, a system for real-time omnichannel voice interaction is disclosed, comprising: an interaction control server comprising a first plurality of programming instructions stored in a memory of, and operable on a processor of, a computing device, wherein the first plurality of programming instructions, when operating on the processor of the computing device, cause the computing device to: receive a first electronic request from a first user device to establish a voice-based connection from the first user device to a second user device, the second user device being an enterprise resource associated with an enterprise; instantiate a voice-based interaction between the first user device and the second user device to fulfill the first electronic request from the first user device; send a call routing request to a routing engine; receive a call route from the routing engine; send the call route to a media translation server; and store a first plurality of details about the voice-based interaction to an interaction database; www a routing engine comprising a second plurality of programming instructions stored in a memory of, and operable on a processor of, the computing device, wherein the plurality of programming instructions, when operating on the processor of the computing device, cause the computing device to: receive the call routing request from the interaction control server; retrieve a plurality of enterprise resources from an enterprise database; use a routing logic to iterate through the plurality of enterprise resources testing for a successful connection; select the first successfully connected enterprise resource as the second user device; and send the call route to the interaction control server, the call route is between the first user device and the first successfully connected enterprise resource, the first successfully connected enterprise resource being the second user device; and a media translation server comprising a third plurality of programming instructions stored in a memory of, and operable on a processor of, the computing device, wherein the third plurality of programming instructions, when operating on the processor of the computing device, cause the computing device to: create a first set of interaction control legs between the first user device and the second user device; mask personally identifying information of the first user device to the second user device, and of the second user device to the first user device; establish a first real-time voice stream between the first user device and the second user device; and disconnect the first set of interaction control legs and the first real-time voice stream.

According to a second preferred embodiment, a method for real-time omnichannel voice interaction is disclosed, comprising the steps of: receiving a first electronic request from a first user device to establish a voice-based connection from the first user device to a second user device, the second user device being an enterprise resource associated with an enterprise; instantiating a voice-based interaction between the first user device and the second user device to fulfill the first electronic request from the first user device; retrieving a plurality of enterprise resources from an enterprise database; using a routing logic to iterate through the plurality of enterprise resources testing for a successful connection; selecting the first successfully connected enterprise resource as the second user device; creating a first set of interaction control legs between the first user device and the second user device; masking personally identifying information of the first user device to the second user device, and of the second user device to the first user device; establishing a first real-time voice stream between the first user device and the second user device; disconnecting the first set of interaction control legs and the first real-time voice stream; and storing a first plurality of details about the voice-based interaction to an interaction database.

According to various aspects; wherein a notification of completion is sent to the interaction control server upon disconnection of any real-time voice stream; wherein the routing logic is selected from the group consisting of priority ordered routing, circular ordered routing, and percentage-based algorithmic routing; wherein the routing logic includes a timeout feature that re-routes the interaction to a subsequent enterprise resource if the interaction is not handled within a given time; wherein the routing logic leverages artificial intelligence including machine learning and deep learning techniques based on prior customer interaction data, customer relationship management data, sales and marketing data and business operation data; wherein the plurality of enterprise resources comprises more than one enterprise; wherein the first user device comprises a mobile application to send the first electronic request by clicking or tapping on a picture or graphic; wherein the first user device receives an advertisement to initiate the first electronic request; wherein the iteration of testing for successful connections of the plurality of enterprise resources concludes once all enterprise resources have been attempted one or more times; wherein the conclusion of the iteration configures the call route to be between the first user device and a voicemail, the voicemail associated with the enterprise.

BRIEF DESCRIPTION OF THE DRAWINGS

The accompanying drawings illustrate several aspects and, together with the description, serve to explain the principles of the disclosed embodiments. It will be appreciated by one skilled in the art that the particular arrangements illustrated in the drawings are merely exemplary, and are not to be considered as limiting of the scope of the claims herein in any way.

DETAILED DESCRIPTION

Figure 1A:
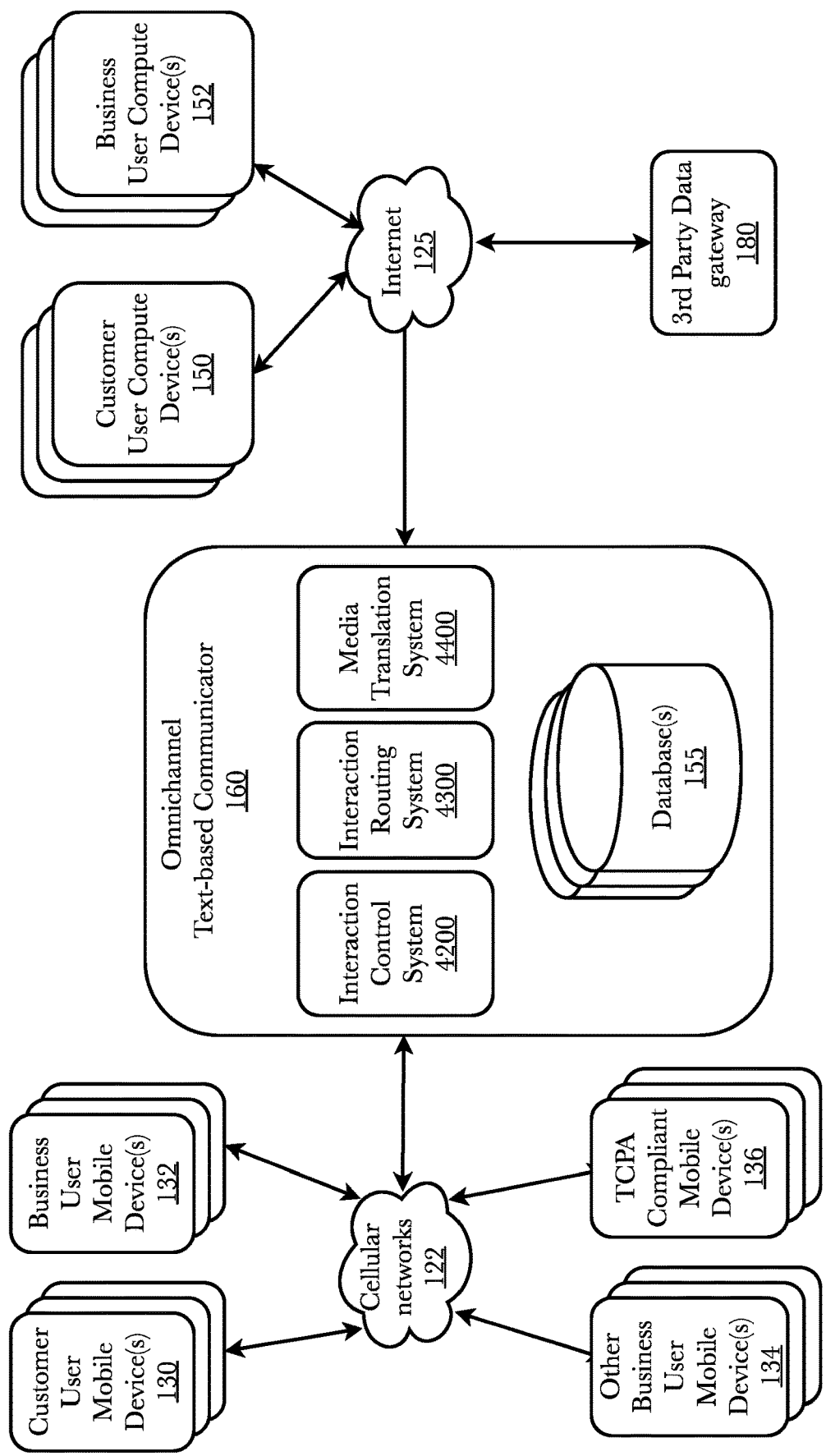
FIG. 1A is a system diagram of an omni-channel text-based communicator platform with TCPA compliant mobile device.

The inventor has conceived and reduced to practiced, a system and method for omnichannel text-based routing, transfer, and customer-to-enterprise communications. The system is a cloud-based network containing an interaction control server, a routing engine, an optimization engine, a media translation server, a mobile application, a business entity portal, mobile and compute devices for business enterprise and customer, and an enterprise database. Taken together or in part, said system optimizes customer interactions by delivering context aware text message, chat or email to customers; and when requested by customer, optimally routes with context, based upon a multitude of variables, to best available resource to handle the customer interaction. The system may be accessed through web browsers or purpose-built computer and mobile phone applications.

According to one embodiment, the system comprises an application that allows a user who has viewed an advertisement on a non-interactive medium to speak one or more words dictated by the advertisement into the application in order to receive business incentives. A speech recognition engine recognizes the words spoken into the application and matches the words to the relevant advertisement and delivers a text-based incentive to the user. Furthermore, with the potential customer's phone number now available, an omnichannel text-based communicator may now send other advertisements, reminders (such as to use the incentive), and communications to the user of the application.

According to one embodiment, a system and method for allowing seamless integration of an omni-channel communication platform into third-party ad campaigns is disclosed. An omni-channel communication platform comprises an interaction control system, an interaction routing system, and a media translation system. Users perform function calls via an application programming interface (API) to a URL generator in order to receive a custom redirect URL that may be hosted on a user's advertisement. The redirect URL intercepts customer interactions with that advertisement and allows the customer and user to communication over the customer's and user's preferred method, converting the user's communication technology to the customer's communication technology and vice-versa. Furthermore, the user may request a generated user-interface graphic that is associated with the redirect URL via the same or a different function call.

According to one embodiment, the embodiment allowing seamless communication between customers using a web chat integrated into a webpage and business representatives receiving and replying to the customer's web chat messages via text messaging over a mobile device. The system and method used an omnichannel text-based communicator that integrates omnichannel communications and converts the communications into other formats of electronic messages. According to various embodiments, a consumer views one or more forms of advertisement, e.g., webpage banner, Internet browser popup, billboard, poster, business card with QR code, etc., and initiates interest in the product of service the advertisement is promoting. The advertisement may be static or dynamic depending on the medium used. Dynamic (electronic-based) advertisements may change in real-time based on a variety of factors not limited to, audience, time, location, device, facial recognition, etc. Initiation of interest by the customer (i.e., sales lead) may also take many forms. Non-interactive mediums such as posters, billboards, and flyers may have a specific phone number to call or QR code which auto populates a phone number or text on the users mobile device and upon the user activating, the system will autogenerate a text-based communication to be sent to the caller in response. Electronic advertisements may have a button, hyperlink, or swipe function to auto generate a communication with the system. Some advertisements may be limited to one or more communication methods, other advertisements may allow for all forms of communication. Communication methods used may be SMS, social media messaging, webchat (chatting over Internet communication protocols such as HTTP), phone call, etc. Some embodiments make use of a chatbot, utilizing Artificial Intelligence (AI), or natural language processing, or third party services that initiates a conversation with the user after the user has interacted with the advertisement or initiated contact. The chatbot may ask a series or questions related to the product or service in question. These questions may be stored in a database, predetermined, however, other embodiments anticipate natural language processing to respond in-kind to the user's questions. The chatbot may recognize when a customer does not want to answer the questions posed and initiate a transfer to a sales agent for the desired product or service. However, in any situation, any and all pertinent information collected by the chatbot is forwarded to the sales agent thus increasing the sales agent's awareness and saving time for the customer.

As one example, the omnichannel text-based communicator receives one or more of the various forms of communication (e.g., text, call, webchat, etc.) from a customer via the customer's mobile device about some product or service. This communication triggers a message, typically a SMS message but may comprise other forms of messaging, to be sent to the customer's device with further information about the product and service as well as a follow up questions from an automated chatbot. This chatbot uses AI to communicate with the customer and request information from the customer such as desired product features, price range, location, or other metrics relating to the customer and the product or service. After this automated chatbot experience, the customer is presented with one or more communication options to continue the conversation with a real person, i.e., an agent or sales staff. The system finds an available agent via one or more methods such as a round-robin style search function, wherein an ordered list of agents is iterated over until an available agent is found. The time between attempts to contact an agent is referred to as a timeout. The duration of a timeout can be set as desired and may be implemented in any routing algorithm, e.g., sequential, percentage-based, as needed. Once an agent has accepted, the conversation communication will be transferred and any pertinent information collected from the chatbot experience (may be metadata, customer profile information, desired product features, etc.) will be forwarded to the sales agent via the agent's or business preferred communication method. This enhances sales lead acquisition, retention, and closes.

According to one embodiment, an advertisement (e.g., webpage) for a vehicle is seen by a potential customer. A tap text link—a URL that requests the customer's phone number—is present on the advertisement. The potential customer clicks on the tap text link and enters their phone number. The phone number and vehicle information are received by the system which then triggers the chatbot to respond to the potential customer. The chatbot follows up with questions regarding credit history, location, trade-ins, down payments, and/or anything that may be desired information by a vehicle dealership. Additionally, all follow up questions are related to the specific vehicle due to the transmission of one or more unique identification numbers associated with the advertisement the customer clicked the tap text link from. Once the series of questions are complete, or upon request from the customer, the system forwards the potential customer to a sales agent along with any and all pertinent information collected. A series of methods are described herein allowing various methods to choose which sales agent receives which call and in what priority. The chatbot may generate a message to the customer with a link or button allowing the customer to auto-populate their communication device with the sales agent's contact information. The contact information may or may not be the actual information of the sales agent as the system may mask all customer and sales agent uniquely identifying information for compliance with standards. All interactions and information collected may be stored in an analytics database for further use.

According to one embodiment, when a customer is using an electronic device such as a laptop, desktop, cellular smartphone, and other like devices, the customer may be presented with a button or hyperlink to text, message, or webchat with a live representative. According to this embodiment, the omnichannel text-based communicator receives the choice of communication method (text, message, email, or webchat) from the customer and facilitates an immediate real-time conversion from the customer's preferred method of communication to SMS (or other mobile device messaging service e.g, MMS, imessage, RCS). For example, if the customer desired to use an Internet browser chat window, message input there from the customer will be converted to the messaging service of the live agent without the need for the agent to be on the same Internet browser chat service. Another example is if a customer desired to converse over emails, the email content will be converted to the agent's preferred message service format and replies from the agent to the customer will be converted into emails. Phone numbers and other identifying information is masked by the omnichannel text-based communicator.

The conversion of web chat—which is sometimes referred to as live support software, is a chat software integrated into a website to allow customers to chat with the business representative or the website owner. Live support on a web chat channel can be provided by both human agents as well as virtual agents and chatbots. In many cases, both humans and live chat tools work in tandem to improve the digital customer experience. Furthermore, web chat is a type of Internet online chat distinguished by its simplicity and accessibility to users who do not wish to take the time to install and learn to use specialized chat software. Considering the ease of use and popularity of web chat, various embodiments described herein directly convert web chat entries from a customer to SMS messages (or any other type of messaging protocol) sent to a mobile device, typically used by a business agent. Messages sent from the mobile device are converted into web chat entries for the customer to view in the web chat screen.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in said arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 1B:
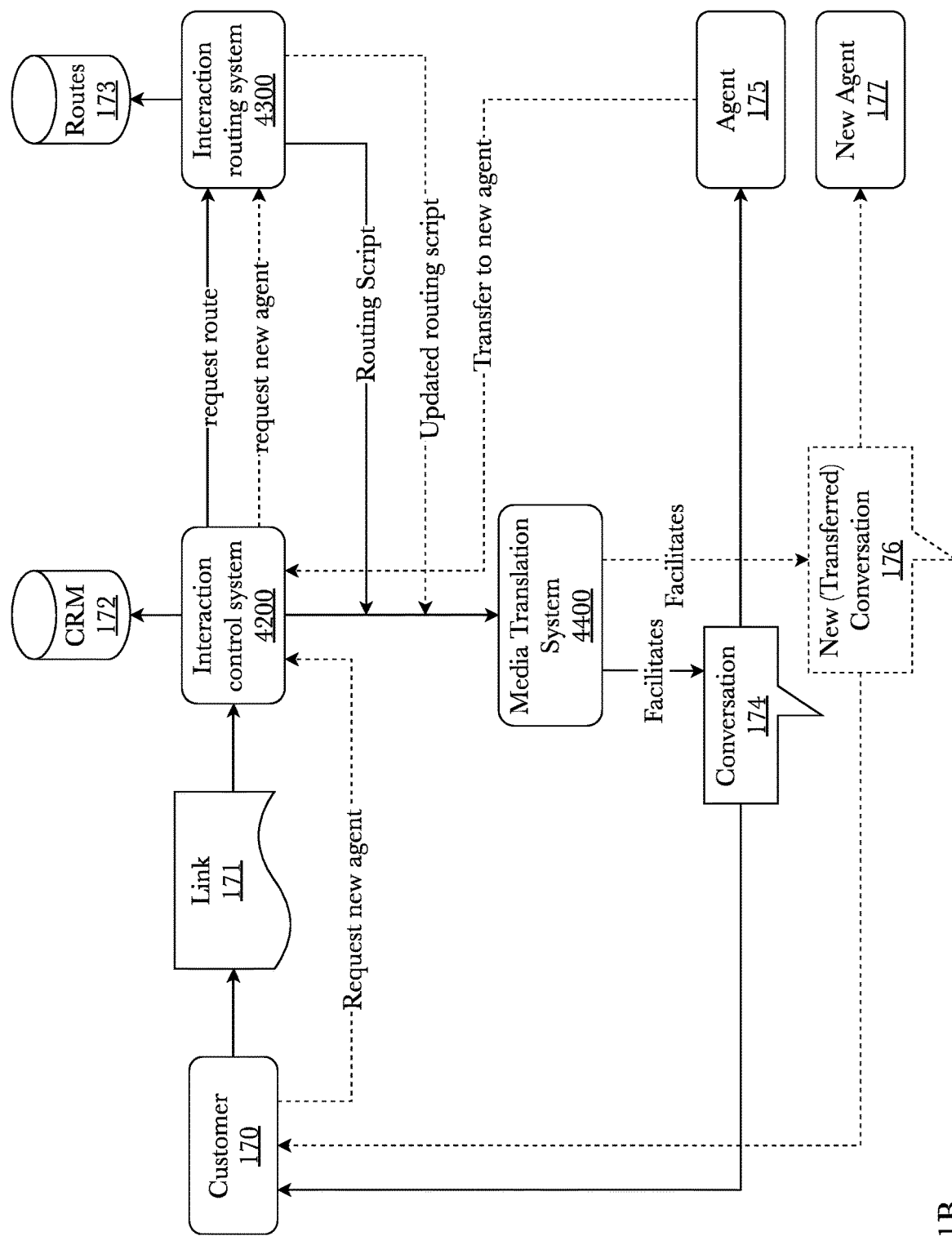
FIG. 1B is a method diagram of an omni-channel text-based communicator platform with TCPA compliant mobile device.

FIG. 1A is a block diagram illustrating an exemplary system architecture 160 for an omnichannel text-based communicator system and FIG. 1B is an exemplary method diagram thereof. According to a preferred aspect, system 160 comprises an interaction control system 4200, a routing system 4300, a media translation system 4400, and databases 155. Customers 170 and their user mobile device(s) 130, agents 175, 177 and their business user mobile device(s) 132, other business user device(s) 134, and TCPA compliant mobile device(s) 136 used by agents 175, 177, may connect to omnichannel text-based communicator system 160, typically via a cellular phone network 122, although connections may be made through other means, as well, such as through the Internet 125 via a Wi-Fi router for example. Similarly, customer user compute devices 150 may connect to omnichannel text-based communicator system 160 over a Local Area Network ("LAN") or Wide Area Network ("WAN"), the Internet 125, a direct physical connection to another device, or some other network connection. System 160 may connect to $3^{rd}$ party or external systems or components, such as Customer Relationship Management ("CRM") systems, Private Branch Exchange ("PBX"), traditional telephony call center agents, voicemail systems, and so forth, through 3rd party data gateway 180.

According to an aspect, a business may access a business user mobile device 132, business TCPA compliant mobile device 136, or business user compute device 152 to enter or update a variety of business information or business operational data that may be stored in a database 155, 172, 173. Examples of the types of information or operational data that a business may enter include, but are not limited to: business name, branch name, location, types of product or server provided (e.g. vehicle make/model/year, maintenance/repair/cleaning), item pricing, credit terms, special pricing promotions, business hours of operation, inventory information, promotional information, staff and employee training and skill information, and other business operational data.

According to another aspect, TCPA compliant mobile device 136, which is a device that is in compliance with the Telephone Consumer Protection Act (TCPA) of 1991, after an initial device power on sequence, must connect with interaction control system 4200 and request business user (agent 175) authentication, business user authentication may involve user data input, user data input may include what the user knowns (e.g. user name, user password, personal identification number, etc.), what the user has (e.g. mobile push authenticator, multi-factor authentication code generated from $3^{rd}$ party device such as GEMALTO™, GOOGLE AUTHENTICATOR™, or other device), something the user is (e.g. biometric data from retinal scan, fingerprint, DNA sample and the like), or some other verification technique available to those skilled in the art. Once interaction control system 4200 has enabled communication of business user mobile device 136, business user mobile device may select customer mobile device 130 from an interaction database 155, enterprise CRM system 172 or other data repository, through 3rd party data gateway 180 and request to initiate an interaction through interaction control system 4200. An interaction control system 4200 will initiate communication through media translation system 4400 which in turn will mask ("ghost") business user mobile device 136 from customer use mobile device 130, and mask customer user mobile device 130 from business user mobile device 136, setup an interaction between customer user mobile device 130 and business user mobile device 136, interaction details may be logged in database 155.

Similarly, a customer may access customer user compute mobile device 130 or customer compute device 150 to create and update user profile information that may be stored in database 155, 172. Examples of the type of information a customer may enter include but are not limited to: name, address, contact information, preferred method of contact (e.g. mobile phone, email), payment (WELLSFARGO™, VENMO™, PAYPAL™) or credit card information (e.g. VISA™, MASTERCARD™, DISCOVER™) other personal information such as interests or hobbies (e.g. playing board games including but not limited to Backgammon or Go, creative writing, sports cars, growing microgreens, brewing craft beer, camping, hiking and the like).

Data stored in database 155 may be used by an interaction control system 4200, routing system 4300, media translation system 4400, or $3^{rd}$ party CRM system 172 to optimize business communications between customers and a business entity. Database 155 may take the form of a managed or unmanaged database, document-oriented database system, or a Structured Query Language ("SQL") database. Examples of types of database software that may operate include MYSQL™, ORACLE DATABASE™, MONGODB™, and others. It may exist as a distinct physical device or be operating on another computing device that may perform other functions aside from operating, hosting and serving the database 155. If it is a distinct physical device, the database may be connected over a LAN or WAN, the Internet, a direct physical connection to another device, or some other network connection.

In an aspect, system 160 may be able to determine certain information by accessing 3rd party data gateway 180 such as a CRM system or CRM database 172, mapping websites and applications. For example, system 160 may access an existing CRM system which the business maintains and contains, for example, customer purchase history, customer preferred contact method (e.g. mobile phone, e-mail), customer preferred contact times, customer previous interaction history and so forth. Further, system 160 may access a publicly available mapping website such as GOOGLE™, which may contain information about the business location, product availability, hours of operation, phone number, etc. Thus, in some aspects, it is not necessary for the business to enter certain information through portal, as the information may be automatically obtained from 3rd party data gateway 180.

In another aspect, when a customer user mobile device 130 when prompted by a link (tap text link) or call to action 171 connects to interaction control system 4200 and requests to communicate with a business representative 175 (e.g. salesperson, support specialist, agent etc.), interaction control system 4200 queries database 155, 172 for customer profile data, interaction control system requests target routing information from routing system 4300. Routing system will execute routing script that may query database 155, 173 to access and send target routing information to interaction control system 4200. An interaction control system 4200 will send a request to a media translation system 4400 to set up an interaction (i.e., conversations 174) between customer user mobile device 130 and business user mobile device 132. Upon termination of interaction, which may be initiated by customer user mobile device 130, or business user mobile device 132, and acted upon by interaction control system 4200 in concert with media translation system 4400, interaction details may be logged in database 155.

In an aspect, when a customer user mobile device 130 connects to interaction control system 4200 and requests to communicate with a business representative (e.g. salesperson, support specialist, etc.), interaction control system 4200 queries database 155 for customer profile data, interaction control system requests target routing information from routing system 4300. Routing system will execute routing script that may query database 155 to access and send target routing information to interaction control system 4200. An interaction control system 4200 will send a request to a media translation system 4400 to set up an interaction between customer user mobile device 130 and business user mobile device 132. Once communication is established, a different business user 134 may necessitate a transfer of the interaction from business user 132 to business user 134 and a subsequent termination between the customer user mobile device 130 and business user mobile device 132. An interaction transfer 176 may be initiated by customer user mobile device 130, or business user mobile device 132, and acted upon by interaction control system 4200 in concert with media translation system 4400, interaction details may be logged in database 155. Routing system will execute routing script that may query database 155 to access and send target routing information to interaction control system 4200. An interaction control system 4200 will send a request to a media translation system 4400 to set up an interaction between customer user mobile device 130 and business user mobile device 134 132.

In another aspect, an interaction transfer may be initiated without the explicit use of routing system 4300. In this example, business user mobile device 132 may select business mobile device 134 destination address from an interaction database 155, enterprise CRM system or other data repository, through 3rd party data gateway 180 and request a transfer through interaction control system 4200. An interaction control system 4200 will initiate transfer through media translation system 4400 which in turn will mask ("ghost") business user mobile device 134 from customer use mobile device 130, and mask customer user mobile device 130 from business user mobile device 134, setup an interaction between customer user mobile device 130 and business user mobile device 134 and terminate interaction with business user mobile device 132, interaction details may be logged in database 155.

In an aspect, when a customer user mobile device 130 connects to interaction control system 4200 and requests to communicate via voice with a business representative (e.g. salesperson, support specialist, etc.); interaction control system 4200 queries database 155 for customer profile data, interaction control system requests target routing information from routing system 4300. Routing system will execute routing script that may query database 155 to determine target resource; and send target routing information to interaction control system 4200. An interaction control system 4200 will send a request to a media translation system 4400 to set up an interaction between customer user mobile device 130 and business user mobile device 132. Media translation system may mask information and data so that customer user device 130 cannot be identified by business user device 132, and business user device 132 cannot be identified by customer user device 130. Should business user mobile device 132 not accept the request to connect, interaction control system 4200 may request another enterprise resource via the routing system 4300 which in turn will execute routing script that may query database 155 to determine next target resource which will repeat until all enterprise resources are exhausted (i.e. no enterprise resource is available to accept the call) or call has been accepted by the business user mobile device 132. Should all enterprise resources be exhausted, the voice call may be routed to a voicemail system corresponding to one of the enterprise resources or a general voicemail box. When customer user device 130 connects with voicemail box via 3rd party data gateway 180 and leaves a voicemail, or not, an electronic notification (e.g. text message) is sent via interaction control system 4200 to business user 132 of customer user device 130 failed attempt to connect with a live enterprise resource. Business user mobile device 132 may send an electronic message (e.g. text) to customer user device 130 who may accept request or not. If accepted an interaction (e.g. voice, text or other) may be set up between customer user device 130 and business user device 132 via interaction control system 4200 in concert with media translation system 4400 such that media translation system 4400 may mask information and data so that customer user device 130 cannot be identified by business user device 132, and business user device 132 cannot be identified by customer user device 130; interaction details may be logged in database 155 or CRM system via 3rd party data gateway 180 which may be made available for future reporting and analytics.

In some other aspect, routing system 4300, through business user mobile device 132, may provide information to the business user of upcoming staffing needs which the business user may accept or decline. If the business has entered information such as incentive pay, routing system 4300 may use that information to offer the business staff additional monetary or other incentives (e.g. future vacation day with pay) to accept a shift schedule. Such incentives may be adjusted for busy periods at the business, either automatically based on the business's history as stored in a database 155, or by retrieving information stored in a database 155 that has been manually entered by the business through business compute device 152 or business mobile device 132.

Figure 42:
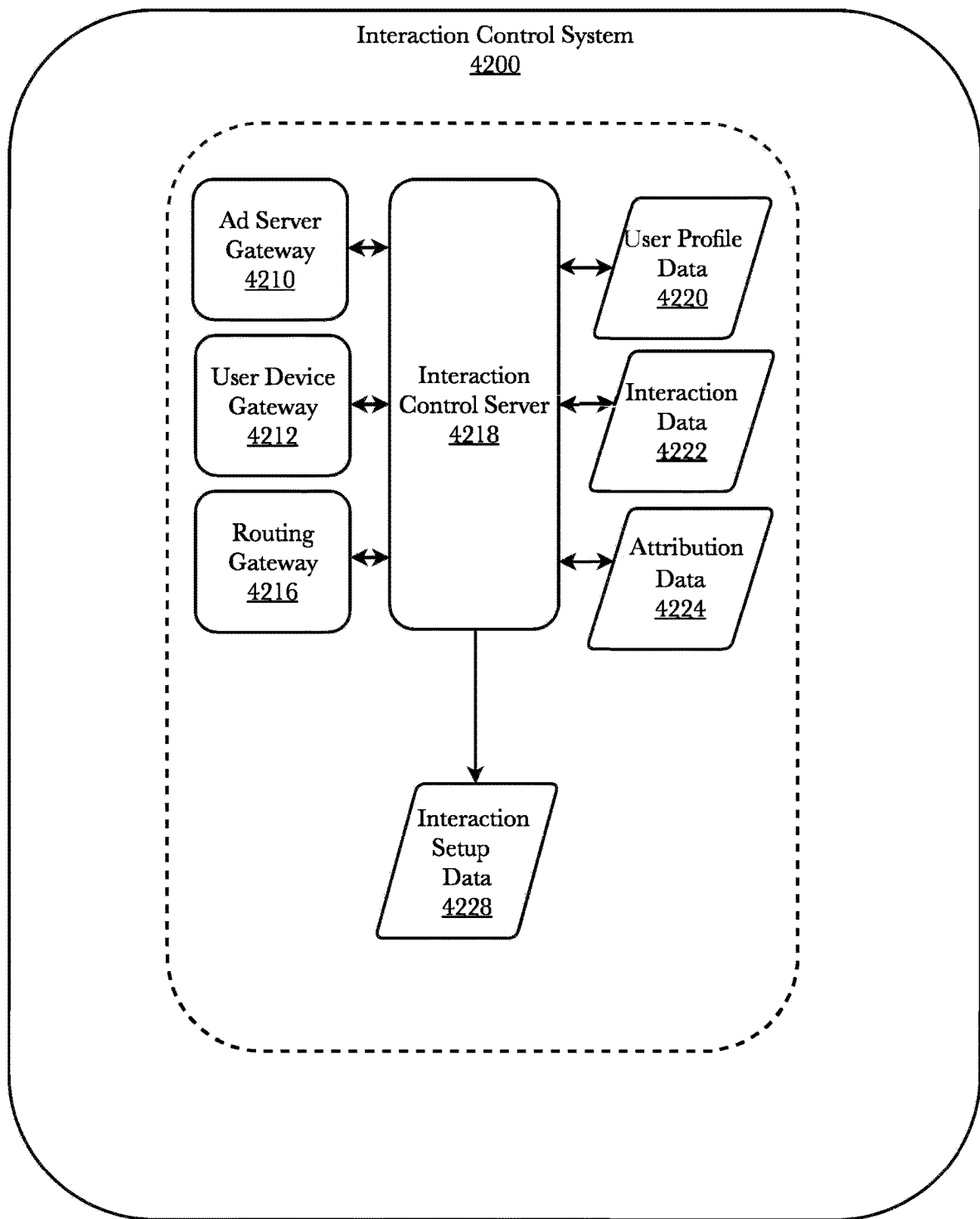
FIG. 42 is a system diagram of an interaction control system.

Now turning our attention to FIG. 42 illustrating an exemplary block diagram architecture for an interaction control system 4200. According to an aspect, an interaction control system 4200 comprises interaction control server 4218, ad server gateway 4210, user device gateway 4212, routing gateway 4216, user profile data 4220, interaction data 4222, attribution data 4224, and interaction setup data 4228. In operation, interaction control server 4218 may connect, for a bi-lateral data exchange, between ad server gateway 4210, user device gateway 4212, routing gateway 4216; may receive user profile 4220, interaction data 4222, attribution data 4222; may provide as output call interaction data 4228.

In an aspect, customer mobile user device 130 that may include a smart phone, or table device, or similar user device capable of sending and receiving electronic messages, may receive a CTA electronic message (e.g. text, chat, email or other electronic message format) from interaction control server 4218 via user device gateway 4212 which abstracts away any potential communication protocol (e.g. HTTP, RTP, SMS, SIMPLE, TCP, UDP or other protocols that may be in use) that may exist between interaction control server 4218 and customer user mobile device 130 or customer user compute device 150. A CTA may include a link to an online retail portal, a referral to a product or service website, directions to a store, discount coupon code, or some other information or content that may cause the customer to act in some way, for example tapping on an electronic picture, clicking on a link or the like; and may be a result of an advertisement campaign or some other indication that a customer may be interested in further engagement with business entity. Upon receiving CTA, a customer through user mobile device 130 may indicate desire to further engage with business by interacting with CTA which may include clicking or tapping on electronic message or some other means that will result in an electronic notification being received by interaction control server 4218. An interaction control server 4218 upon receiving notification from customer user mobile device 130, may access customer user profile data 4220, customer profile data may include name, address, phone number, email, preferred contact method, historical purchase information, customer tiering level (e.g. bronze, silver, gold), personal information (e.g. marital status, number of dependents, net worth, interests/hobbies) or other data that may have been directly provided by customer or obtained by other means including a business CRM system accessible via 3rd party data gateway 180, and may aid the business in optimally handling the customer request to engage with the business; may access interaction data 4222, interaction data may include but is not limited to interactions that customer has previously had with business, brand, product, or if available competitor business, brand or product, product or service purchased, amount of purchase, prior communications (e.g. text, chat, email, snail mail, voice call, call center interaction, in-person, telegram or other communication that may be in use) with business or business partner; may access attribution data 4224, attribution data may include advertising campaigns run including media channel (e.g. TV, social media, near-field communication, in-store offers, targeted email), dates and times of ad campaigns, aggerate sales data associated with each advertising campaign, customer-specific sales outcome and any other data related to media and marketing efforts and associated business sales outcomes. Once interaction control server 4218 has a complete data set of the business-customer relation, this is sent along with a route request via routing gateway 4216 to routing system 4300.

In another aspect, ad server gateway 4210 may provide referral information of a customer interested in receiving additional information (aka CTA) from said business to interaction control server 4218, referred information may include customer name, contact information, business name, product or service of interest any other data that may be of use to optimize communication and business outcomes between customer and business.

Figure 43:
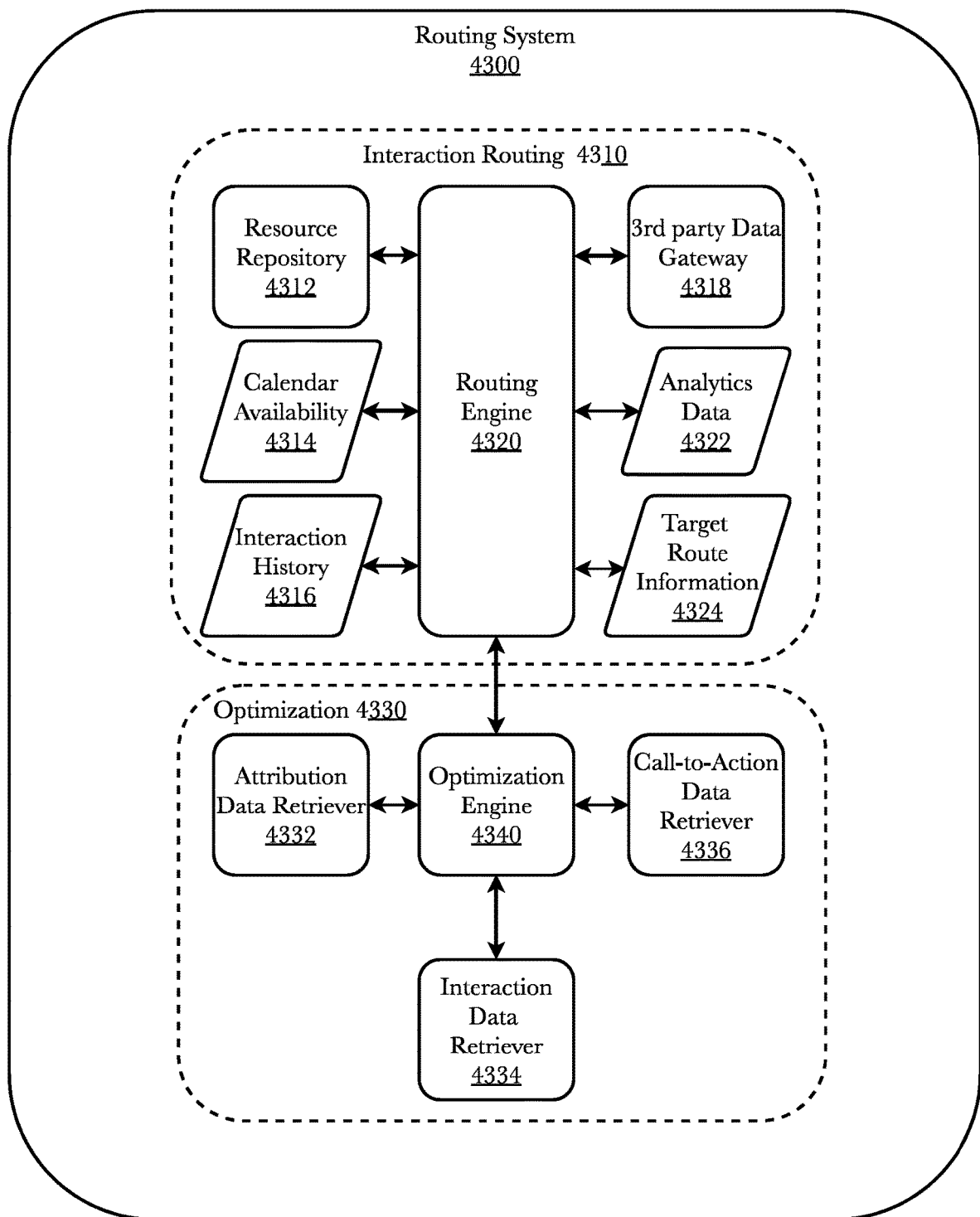
FIG. 43 is a system diagram of a routing system.

Referring now to FIG. 43 illustrating an exemplary block diagram architecture for a routing system 4300. According to an aspect, a routing system 4300 comprises interaction routing 4310 subsystem and optimization 4330 subsystem. An interaction routing 4310 subsystem further comprising a routing engine 4320, routing repository 4312, calendar availability 4314, routing scripts 4316, $3^{rd}$ party data gateway 4318, analytics data 4322, target route information 4324. An optimization 4330 subsystem further comprising optimization engine 4340, attribution data retriever 4332, call-to-action data retriever 4336 and interaction data retriever 4334.

In operation, routing engine 4320 may connect, for a bi-lateral data exchange between optimization engine 4340; may receive routing repository 4312, calendar availability 4314, interaction history 4316, $3^{rd}$ party data gateway 4318, analytics data 4318; and provide target route information 4324. An optimization engine 4340 may connect for bi-lateral data exchange with routing engine 4320, attribution data retriever 4332, interaction data retriever 4334, and call-to-action data retriever 4336.

In an aspect, routing engine 4320 receives a route request from interaction control server 4218, routing engine may execute routing logic that may be implemented within routing script 4316, routing logic may take into account sequential, 'round robin', or percent-based allocations to distribute to target or may utilize resource repository 4312, resource repository may include available routing resources including call center agents, traditional IVR, voice portals, AI-driven chatbots or voice portals, non-traditional agent sources including sales personnel, field sales, support specialist or other resources that may be able to interact with customer; may utilize calendar availability 4314, calendar availability may include available time from target routable resources (e.g. sales person, support specialist), calendar systems may in $3^{rd}$ party systems such as MICROSOFT OUTLOOK™, GOOGLE CALENDAR™, LOTUS NOTES™ SALESFORCE™ CRM, SUGAR™ CRM; may utilize analytics data 4322, analytics data may include operational data, sales data, customer data or any other data that may assist with routing decisions; generate target route information 4324, target route information may include resources from business entity traditional call center including but not limited to: traditional phone-based agents, multi-media (including email, chat, text) agents, AI-based or traditional interactive voice response ("IVR") systems, AI-driven chat bots or speech bots; non-traditional resources including but not limited to field sales and support or other resources that have access to user mobile devices 132 or business compute device 152 and may include resource name (e.g. Jim Johnson), title (e.g. car sales advocate), destination address (e.g. 360.867.5309), and any other information that may be useful in delivering interaction; and provide results to interaction control server 4218 to determine optimal target to deliver customer interaction.

In another aspect, routing logic may be implemented within routing script 4316 and use Artificial Intelligence ("AI") techniques known to those skilled in the art including deep learning algorithms and incorporate data resources as listed in previous paragraph along with an array of other factors including but not limited to time-of-day, day-of-week, store hours, resource availability, service level requirements, previous customer interaction and transactions, customer tiering structure, data from $3^{rd}$ party systems including but not limited to CRM systems, location-based services, weather-services and so forth.

Note that this example is simplified for clarity, and that routing system 4300 may employ a much broader set of factors and variables, as described elsewhere herein. The optimization engine 4340 may use any number of optimization algorithms, including machine learning algorithms or others known in the art, to find routing targets to optimize business outcomes based upon a large number of variables presented.

Figure 44:
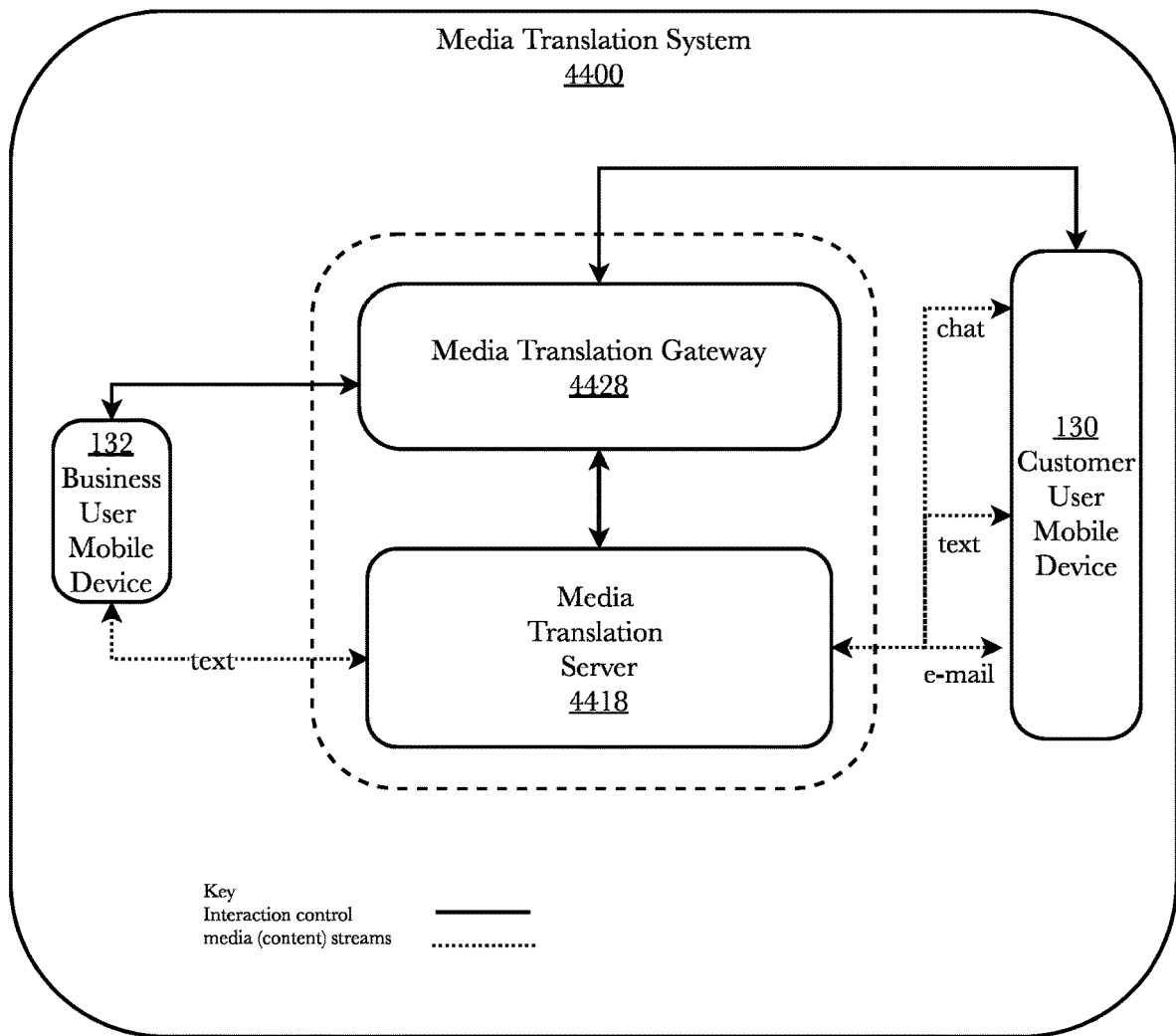
FIG. 44 is a system diagram of a media translation system.

Referring now to FIG. 44 illustrating an exemplary block diagram architecture for a media translation system 4400. According to an aspect, a media translation system 4400 comprises media translation gateway 4418, media translation server 4428. A customer user mobile device 130, other customer compute device 150, or a business user mobile device 132 may connect via a cellular network 122 and establish a bi-lateral data exchange.

In operation, when the media translation gateway 4418 receives call interaction data 4228 from interaction control server 4218, it will establish interaction control legs between business user mobile device 132 and customer user mobile device 130 masking any identifying information of customer or customer user mobile device 130 and of business user mobile device 132 such that neither business user mobile device 132 nor customer user mobile device 130 will know the particular identity of the device. In some aspects, the customer user mobile 130 device or business user mobile device 132 may be allowed to know some information about the user endpoints which may be configurable by users of the system.

In some other aspects, business user mobile device 132 may without changing applications or devices use text messages (e.g. SMS or other protocols known to those skilled in the art) to interact with and respond to customer mobile device 130 or customer user compute device 150 through media translation server 4428 which enables media translation from one electronic form (e.g. SMS) of communications to other electronic forms (e.g. SMS, email, chat).

Figure 1C:
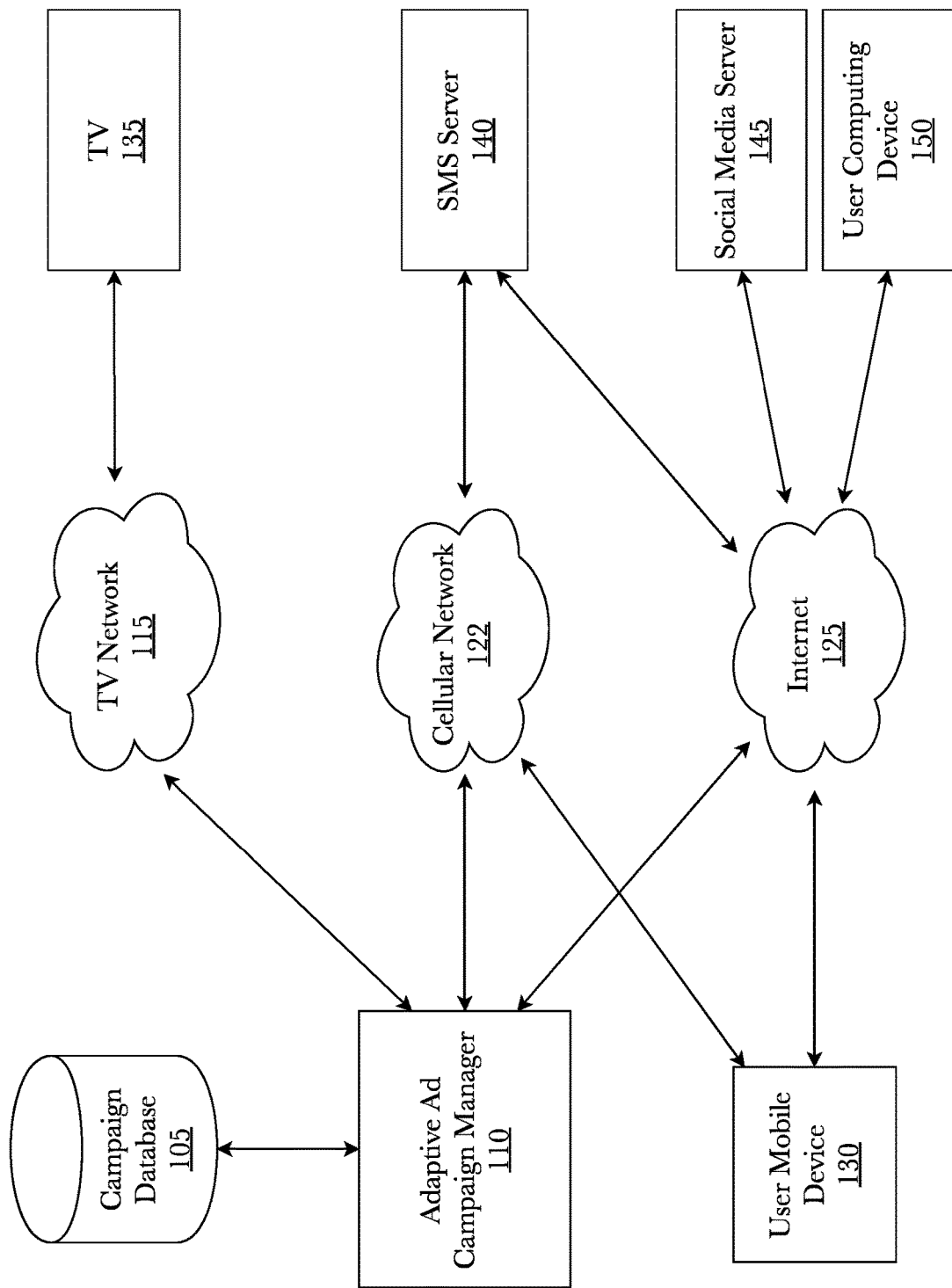
FIG. 1C is a system diagram of an advertisement campaign tracking and management system using an adaptive ad campaign manager.

Now consider FIG. 1C illustrating a system diagram exemplifying an advertisement ("ad") campaign tracking and management system. A campaign database 105 exists which may take the form of a managed or unmanaged database, document-oriented database system, or a SQL database. Examples of types of database software that may operate include MYSQ,L™, ORACLE DATABASE™, MONGODB™, and others. It may exist as a distinct physical device or be operating on another computing device that may perform other functions aside from operating, hosting and serving the campaign database 105. If it is a distinct physical device, the database may be connected over a LAN or WAN, the Internet, a direct physical connection to another device, or some other network connection. A campaign database 105 may operate on a compute device which also operates, or connected to a device which operates, an adaptive ad campaign manager 110, which is a specialized software operating on a compute device such as a personal computer or workstation computer, which may execute software, taking user inputs, and utilizing a network adapter. The operating system of such a computing device may be one of many options available to consumers and businesses. Networks that an adaptive ad campaign manager 110 may connect to may include at least one TV network 115 for the purpose of being able to serve televised advertisements to customer TV devices 135, a Cellular Network 122 for the purpose of receiving phone calls and sending and receiving SMS messages from a user mobile device 130 and from third-party SMS servers 140, and the Internet 125 so as to serve advertisements on social media platforms on a social media server 145 and serve advertisements via email, websites or individual web pages, or through applications, to customer user mobile device 130 and customer user computing devices 150. A user mobile device 130 may be a cellular phone or may be another type of mobile device, such as a tablet, a smartphone or non-smartphone cellular phone, a personal digital assistant, or even a personal computer 150 if the computer possesses a phone number and is capable of receiving phone calls, the user mobile device 130 and computer 150 may then be the same device instead of separate devices as shown. The manner of the advertisements and data sent from the adaptive ad campaign manager 110 to the networks may include audio data, visual data such as video or images, textual data, recipient data, regional specifications, and other common data for advertisements in applications, online, over TV, and over email. Advertisements may be sent to, and reached by, a mobile device 130 or other computing device 150 through the Internet via email, social networks, or internet browsing, or sent to a TV 135 by a TV network 115. The functionality of a TV 135 may be utilized by a mobile device 130 or other computing device 150, or both, and all functionalities—TV viewership, phone call placement, internet browsing, email viewing, and social network access—may be accomplished by a single device over the Internet, or with a combination of Internet, cellular network or Public Switched Telephone Network ("PSTN").

In an aspect, an ad campaign manager 110 may also be part of a redirection server, or operate a redirection service while operating as a server for redirecting phone calls from users, capable of responding to phone calls from a specified phone number with a stored SMS response.

Figure 2:
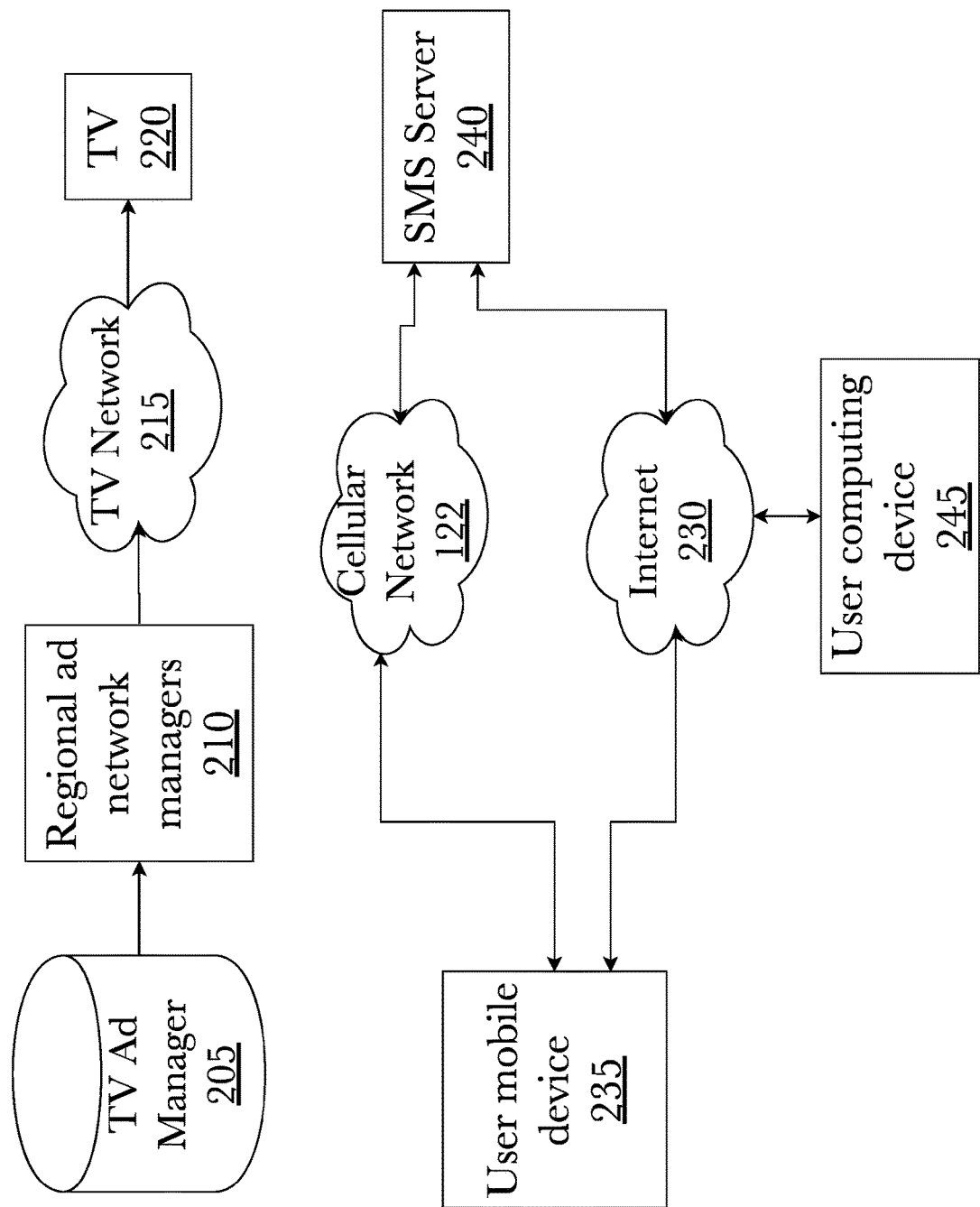
FIG. 2 is a system diagram of a standard TV ad campaign system managed regionally without using an adaptive ad campaign manager.

FIG. 2 is a system diagram of a standard TV ad campaign system managed regionally without using an adaptive ad campaign manager. A TV ad manager 205 may be a computing device with software for the creation and management of TV ads, or this may in some cases be done manually, as television ads have been created since long before the modern Internet or personal computing became widespread and therefore in some implementations this process may be done manually with rolls of film or other video data given to a TV network organization. However, in either case, the advertisement data or content may be sent to at least one regional ad network manager 210, for instance a slightly altered advertisement or version of an advertisement might be run in two different areas of the United States on national television, at which points the ads are run on the TV networks 215 and viewed on user TV's 220. The user may interact with this advertisement on a TV 220 by viewing it, and with their cellular phone 235 or even in some cases a land-line telephone place a phone call over a PSTN 225, or send a text message from a user mobile device 235 over a network such as the Internet 230 or the Cellular Network 122 to an SMS server 240 which handles the data in an SMS message to forward it to the appropriate recipient, in this case being a number seen on a TV advertisement. The recipient may be anything specified by the advertisement, such as a call center or phone line for a call-in TV show, or something else entirely, and moreover the advertisement on the TV 220 may have an email address or website address for a user to navigate to either with a user mobile device 235 or with a computing device 245, to complete a transaction, sign up for a service, partake in a poll, or something else as desired by the advertisement. When a plurality of regional advertisement network managers 210 receive advertisements it is possible for them to differ, for instance different phone numbers may be displayed in otherwise similar advertisements, for regional call centers or regional shipping to be more easily accommodated, or for some other purpose that might be helped by region-specific advertising. In some cases a user may have a mobile device 235 which is capable of viewing televised broadcasts over the internet 230 rather than over a traditional TV network 215, without the use of a TV 220, in which case the advertisement would be broadcast over the internet, if the network managers 210 choose to broadcast the advertisement on the internet 230 as a video and audio stream.

Figure 3:
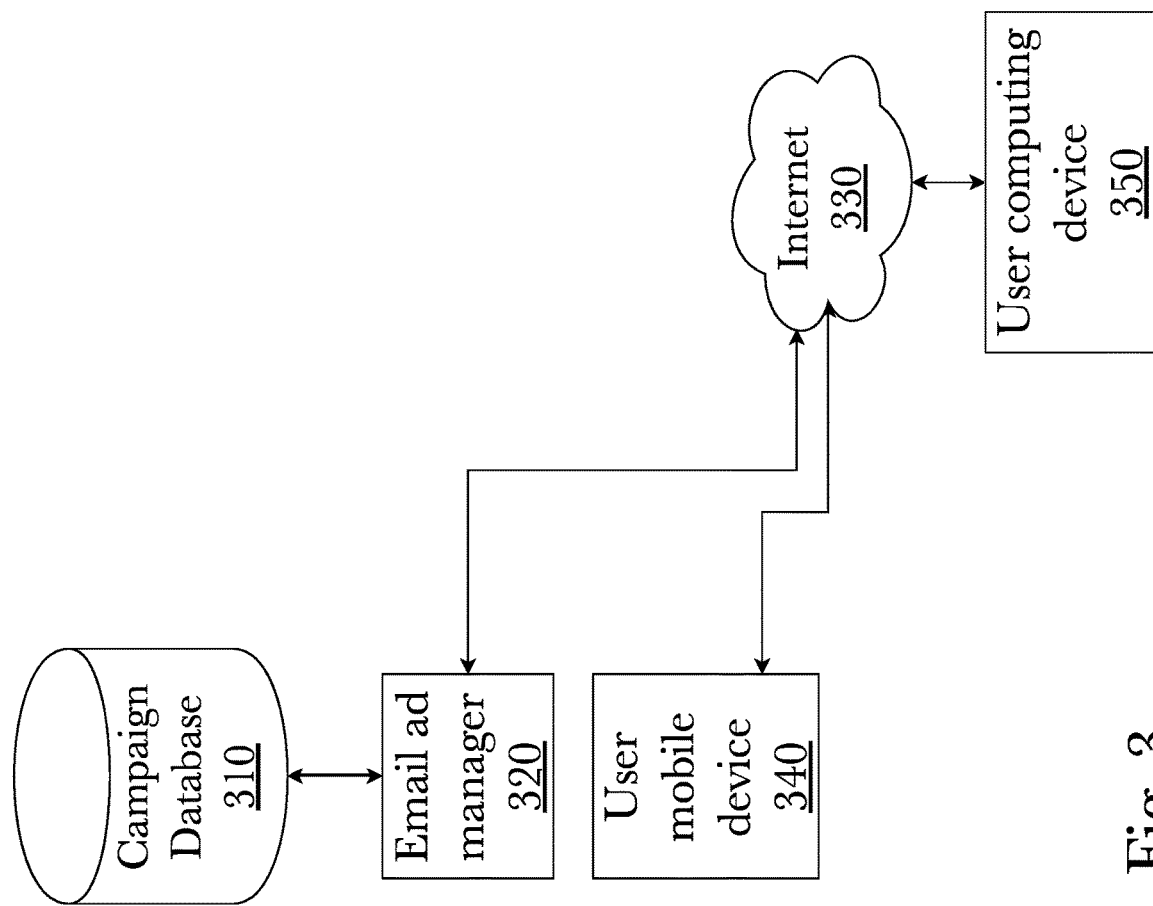
FIG. 3 is a system diagram of an email ad campaign system without using an adaptive ad campaign manager.

FIG. 3 is a system diagram of an email ad campaign system without using an adaptive ad campaign manager. A campaign database 310 exists which may take the form of a managed or unmanaged database, document-oriented database system, or a SQL database. Examples of types of database software that may operate include MYSQ,L™, ORACLE DATABASE™, MONGODB™, and others. It may exist as a distinct physical device or be operating on another computing device that may perform other functions aside from operating, hosting and serving the campaign database 310. If it is a distinct physical device, the database may be connected over a LAN or WAN, the Internet, a direct physical connection to another device, or some other network connection. An email ad manager 320 may communicate with a campaign database 310, the connection being either due to being on the same distinct device or due to a network connection such as a LAN, WAN, an Internet connection, or some other network connection. These communications comprise at least read and write communications from the ad manager 320 to a campaign database 310. An email advertisement may be specified by a user in an ad manager 320 either as a brand-new advertisement or by editing an already-stored advertisement, in either case these advertisements comprising at least an email body, email recipients, and sender address. The body of an email advertisement may include any combination of any of textual, video, image, and audio data, may be sent to multiple addresses at once, and may have dynamic data that changes based on user preferences, status of a user within a subscriber list, user location or IP address, or some other attribute that may be useful for an advertiser to target or alter an ad based on. Email advertisements are sent to an email address or a plurality of email addresses over the Internet 330, whereby an email address recipient may read the email advertisement often with the use of either or both of a mobile device 340 or a computing device 350 such as a personal computer. It is not required that a recipient actually read the email, rather than deleting or ignoring an advertisement, nor is it required that an advertisement in this embodiment avoid being marked as "spam" by filters in an email service, nor is it required that a specific email address recipient be a valid email address. It is not required in this embodiment that the status of an email as being read or not be able to be tracked by an ad campaign manager 320. However, it is possible for the opening of an email to be tracked, for instance through the use of a single-pixel image hosted by a server which tracks both the opening and the IP address of the opener, as is done in some email campaigns.

Figure 4:
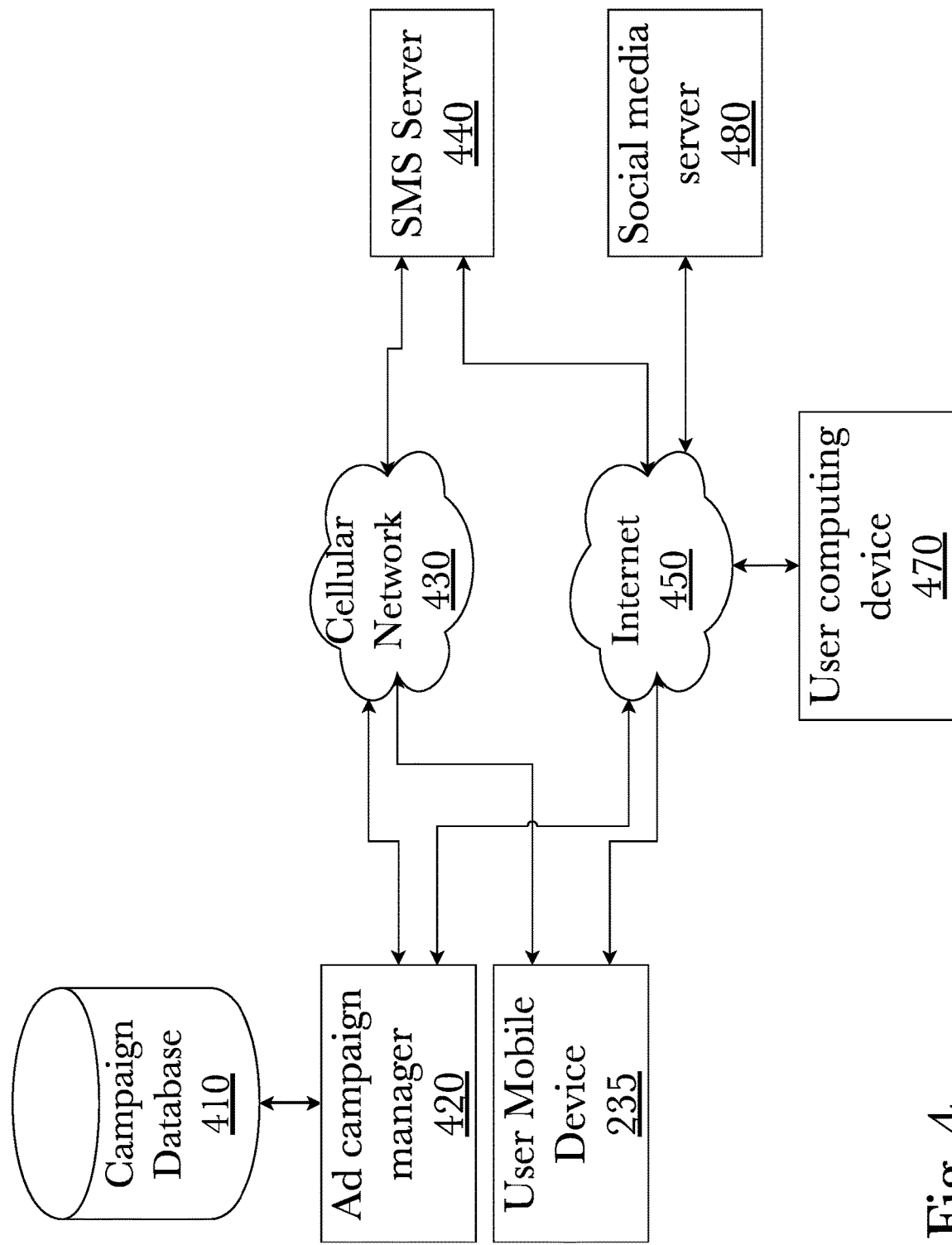
FIG. 4 is a system diagram of a social media ad campaign system without using an adaptive ad campaign manager.

FIG. 4 is a system diagram of a social media ad campaign system without using an adaptive ad campaign manager. A campaign database 410 exists which may take the form of a managed or unmanaged database, document-oriented database system, or a SQL database. Examples of types of database software that may operate include MYSQL™, ORACLE DATABASE™, MONGODB™, and others. It may exist as a distinct physical device or be operating on another computing device that may perform other functions aside from operating, hosting and serving the campaign database 410. If it is a distinct physical device, the database may be connected over a LAN or WAN, the Internet, a direct physical connection to another device, or some other network connection. An ad campaign manager 420 connects to the campaign database 410, either on the same device or over a connection to a separate device, to perform at least read and write operations on the database, for the purposes of reading stored campaign data, and writing new campaign data, including both editing a campaign or creating an entirely new ad campaign. Social media advertisement campaigns may be generated and utilized through a combination of, or only one of, a Cellular Network 430 and the Internet 450, to deliver advertisements to users via social media platforms such as but not limited to FACEBOOK™, TWITTER™, YOUTUBE™, and others. Such advertisements may appear on web pages on social media platforms, or in videos, or even sent to users via SMS through the use of an SMS server 440. Another use for an SMS server is for user responses to advertisements, as certain advertisements on social media platforms, and certain functionality of social media platforms, utilize SMS messaging either for user verification, or for user options to be set, or for purchases, feedback, and other communication with an advertising campaign manager 420. A customer may view these advertisements through the use of either or both of a user mobile device 460 or a computing device 470 such as a tablet, PC, or hand-held computing device. A social media server 480 is the server which operates the social network that advertisements may operate on, and may be any server operated by any social network, so long as it provides a method for advertisements to be uploaded and displayed to the social media platform, for instance FACEBOOK™ allows businesses and individuals to take out advertisements, and in such an embodiment the ad campaign manager 420 may be a third-party device or software, or it may be the interface offered by FACEBOOK™ to create, edit, and track advertisement campaigns on their platform. A plurality of different social networks may be utilized for this form of advertisement, including FACEBOOK™, YOUTUBE™, TWITCH TV™, MYSPACE™, TWITTER™, and others, and such advertisements may further take place in video streams rather than solely on social media feeds. Social media advertisements often take the form of pre-recorded video and audio recordings played before or during a broadcast, as commonly seen on YOUTUBE™ and TWITCH TV™ platforms, but not only limited to those platforms.

Figure 53:
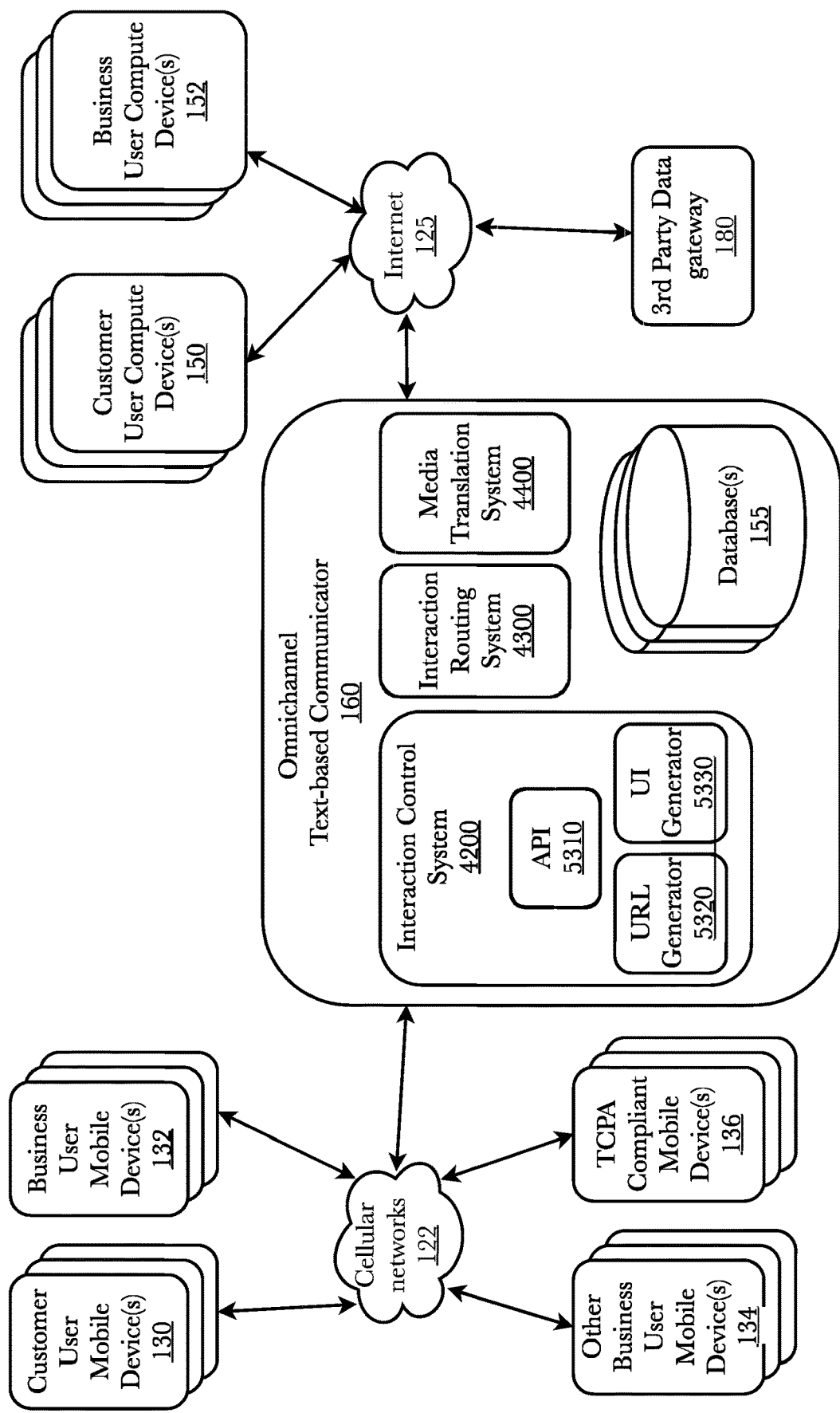
FIG. 53 is a system diagram of an omni-channel text-based communicator platform comprising an API and URL/UI generator.

FIG. 53 is a system diagram of an omni-channel text-based communicator platform 160 comprising an API 5310 and URL/UI generator 5320/5330. This embodiment of an omni-channel text-based communicator platform 160 adds an application programming interface (API) 5310 that is used by third-party ad campaign management platforms such as GOOGLE ADS™, FACEBOOK ADS™, and others like them. It allows third-party ad campaign management platforms to integrate the communication initiator and functions thereof into an ad campaign setup process. For example, businesses using GOOGLE ADS™ and FACEBOOK ADS™ for advertising campaigns are instructed to use each platform's step-by-step process to set up an advertisement. The business fills out a series of fields and options for each product or service during the process. During one step of the process, a business is instructed to type a URL leading to the product's or service's webpage hosted on the business's domain, i.e., the link for which the ad is targeted. The business's domain may, however, be hosted by GOOGLE MY BUSINESS™ and others like it. The aforementioned step is now appended by a function call of the API 5310, whereby a URL generator 5320 takes the input URL and produces a new URL that redirects an ad click through an omni-channel text-based communicator platform 160, essentially intercepting the ad click before forwarding the user to the original input URL. The purpose of the intercepted ad click is to provide a means for implementing routing and conversion of omni-channel communications.

In more detail, the API backend 5310 receives a request via the Internet 125 from a user 150/152. This user can be person who has chosen to use the API 5310 and correctly implements the function calls. The request includes the user's original URL that points to the specific product or service the request is for. The URL generator 5320 generates a new and unique redirect URL and associates both the original and redirect URLs together and stores them in memory, i.e., a database 155. In the case where domain-level restrictions are enforced, boiler-plate HTML code with a script pointing the redirect URL is generated; the HTML code allows for the domain-restricted user to redirect to an authorized domain before the user is automatically forwarded by the script to the redirect URL. The API 5310 then returns the redirect URL, or HTML code to the user. Users may then integrate the redirect URL or HTML code as desired and wait for a customer to interact with the URL link. Upon initiation triggered by a customer, i.e., clicking or pressing on the redirect URL link or HTML coded webpage, the desired method of communication between the customer (the one who clicked or pressed on the link) and the user (the one who created the advertisement with the requested redirect URL) is facilitated by the interaction routing system 4300 and media translation system 4400.

In other words, the advertisement would allow a user on the frontend to have the option to text, webchat, or email a business or sales representative directly from the advertisement itself. On the backend, businesses using third-party ad campaign management platforms would now be presented with an option during advertisement set up to allow this omni-channel communication on each advertisement. In particular, each individual product and service may comprise a distinct URL redirect that specifically allows or limits one or more types of communication or the conversion thereof, directs to a specific salesperson, or other feature of the omni-channel text-based communicator platform 160 as laid out in other present figures as disclosed herein.

Another aspect of the embodiment allows for specific communicator initiator buttons inside product or service pages hosted on third-party websites, not necessarily a third-party ad campaign. For example, AMAZON™ is a third-party seller of thousands of products, all of which could have a unique redirect URL allowing customer's to inquiry about a product on the website with either an AMAZON™ representative or the manufacture of the product without ever leaving amazon.com. While amazon.com is arguably the most visited North American e-commerce website, any e-commerce website, or any website for that matter, may use the API 5310 to host call-to-action buttons (i.e., communicator initiators).

Figure 55:
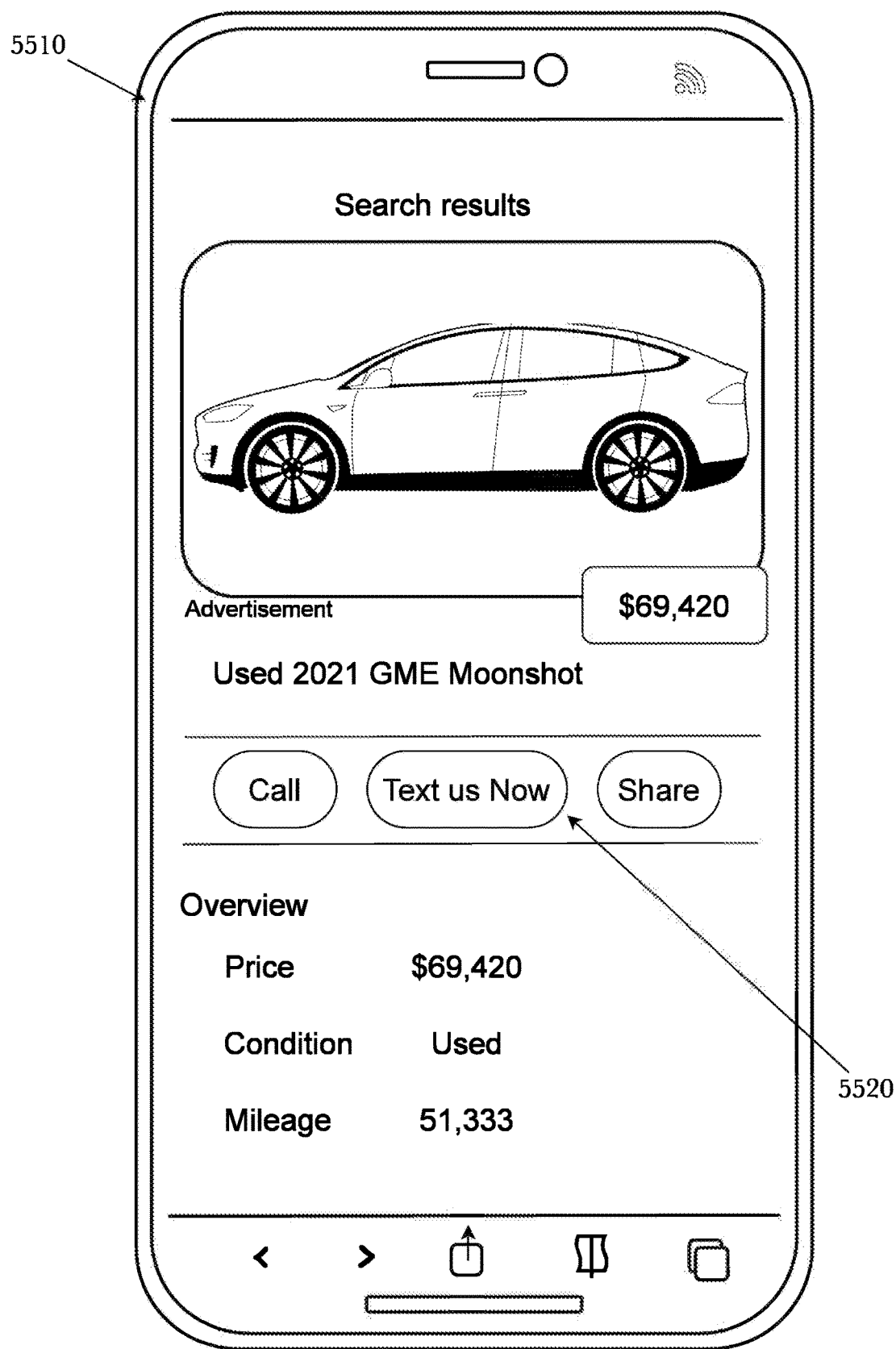
FIG. 55 is a diagram of a customer's mobile device showing an advertisement with a call-to-action communication initiator.

One generic use case is the auto sales industry. Each vehicle may have a unique advertisement with a unique redirect URL containing information about the specific ad, that when a customer clicks to communicate with the business, the business receives that information and is ever-more prepared to close the sale. A specific use case within the auto sales industry is a customer interested in a specific used vehicle. During an Internet search on his or her mobile device 5510 for that vehicle, an advertisement for the vehicle is displayed, the advertisement comprising a "text us now" button 5520, i.e., link, as shown in FIG. 55. The customer clicks the "text us now" button and his or her default mobile messaging application opens with (or without according to one aspect) a default message prepopulated. The default message may be along the lines of "Hi, I'm interested in specific vehicle." Wherein the "specific vehicle" is the vehicle from the advertisement. Now, depending on how the business set up the omni-channel text-based communicator platform 160, the incoming text message may go into a round-robin process looking for an available salesperson, or may be converted into an email or webchat, or any combination of communication technologies. The customer never had to leave the advertisement to communicate about the product or service advertised.

One optional aspect of various embodiment comprises a UI generator 5330. This aspect allows a business to stipulate the desired dimensions, colors, text, and other features of the communication initiator, i.e., call-to-action button, during the third-party ad campaign management platforms advertisement set up procedure. This is made possible by another API 5310 function call and a UI generator 5330.

Figure 54:
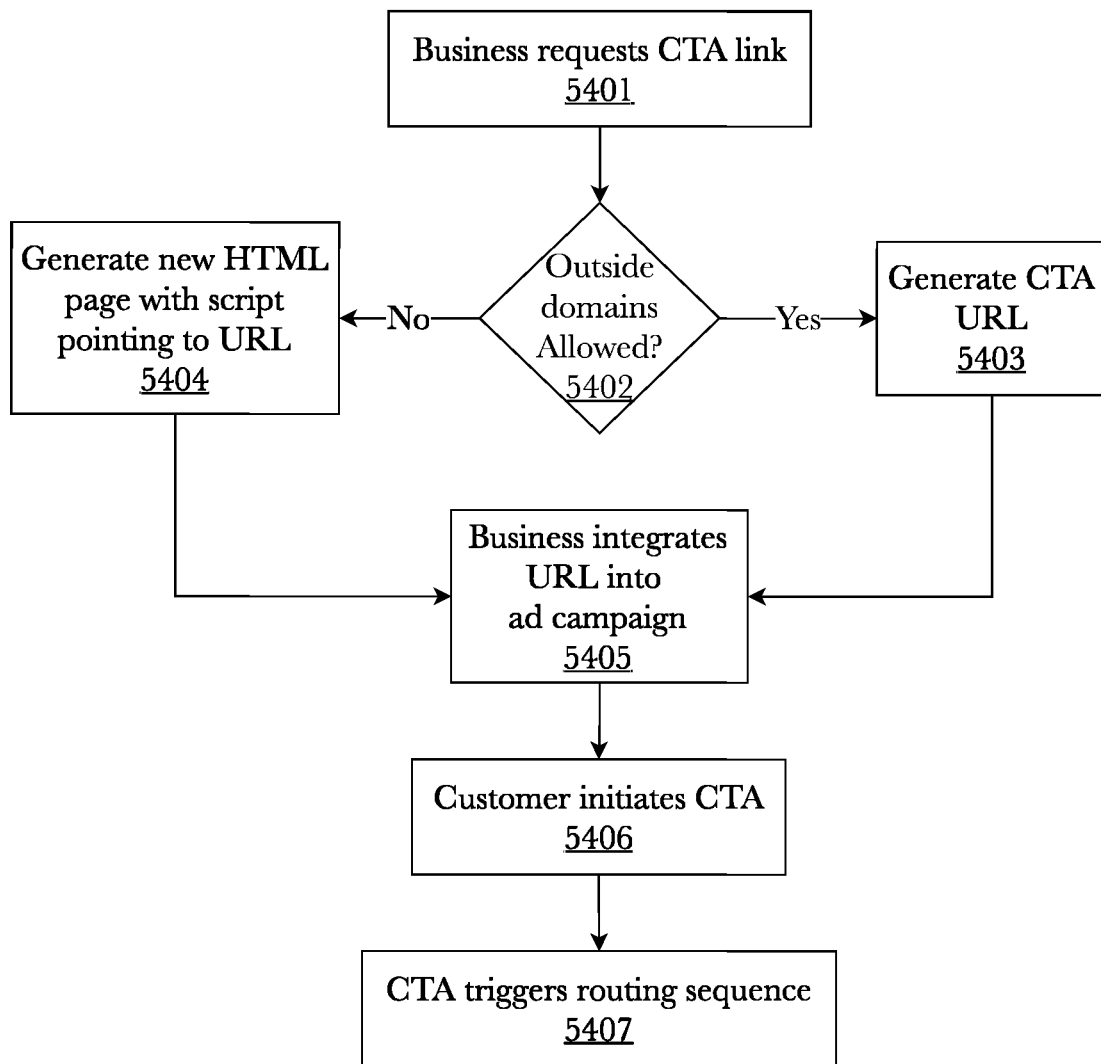
FIG. 54 is a method diagram illustrating omni-channel text-based communicator platform integration with third-party ad campaigns.

FIG. 54 is a method diagram illustrating omni-channel text-based communicator platform integration with third-party ad campaigns. In the first step 5401, an omni-channel text-based communicator platform receives a request for a call-to-action (CTA) link, and optionally, a corresponding UI graphic from a third-party ad campaign management platform or other entity. Then a check is performed if links to outside domains are allowed by the third-party ad campaign platform 5402. If the request comes from an entity that enforces domain-level restrictions, i.e., links may not point outside specified domains, then the omni-channel text-based communicator platform will generate HTML code complete with a script pointing to the generated redirect URL 5404. Otherwise, no HTML code or script is necessary, and a CTA redirect URL is generated 5403. Both steps lead to the generated content being returned to the origination of the request via the API, whereby the content is inserted, integrated, or otherwise implemented into the requesting party's advertisement 5405. The entity requesting the redirect URL may automate the importing of the redirect URL into the advertisement or it may be done manually. Subsequently, after the advertisement comprising the CTA link is live, meaning Internet users may see and interact with the advertisement, and an Internet user then interacts with the advertisement 5406, the omni-channel text-based communicator platform will trigger the appropriate communication conversions and routing 5407.

Figure 56:
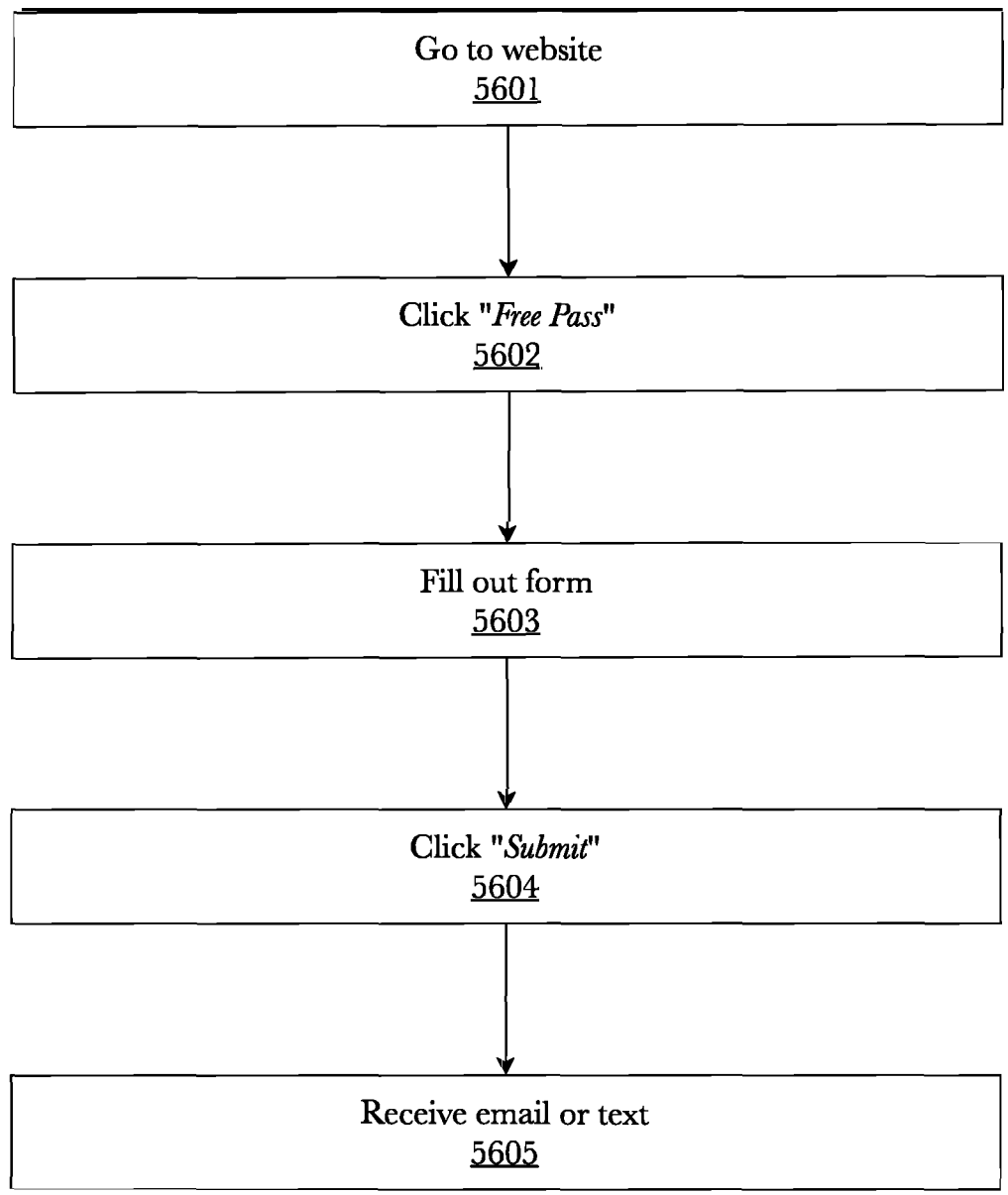
FIG. 56 (PRIOR ART) is a flow diagram of current methods used to receive a digital coupon from a business using a website.

FIG. 56 (PRIOR ART) is a flow diagram of current methods used to receive a digital coupon from a business using a website. This diagram is an example of current methods in the art to give coupons, free trials, and vouchers to customer's via email or text. A customer visits a business's website 5601, and sees a button, advertisement, or link for a coupon, free trial, or vouchers. The customer must click on such a link, an example may be a "free pass" link 5602. Typically, the customer is then taken to a webpage to fill out a lengthy form to include fields such as first name, last name, address, zip code, email, phone number, among other fields 5603. The customer must then click submit 5604 and wait for an email or text 5605.

Figure 57:
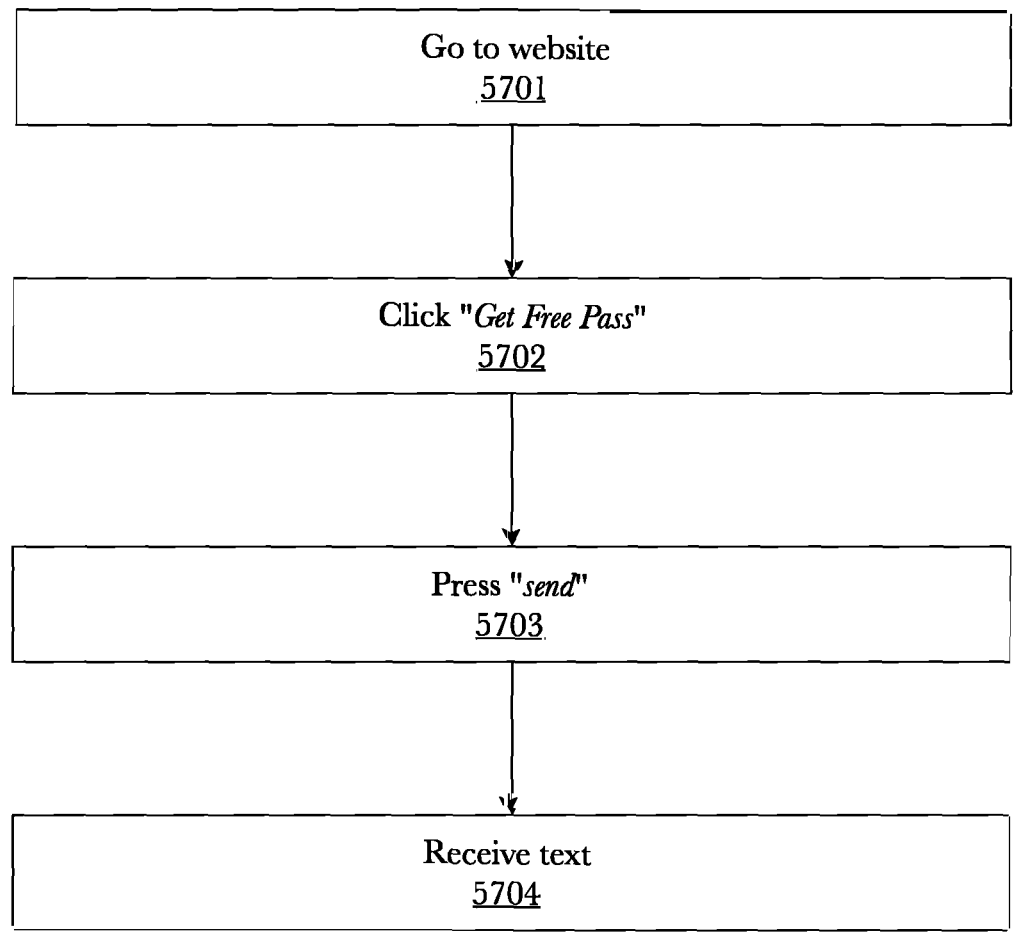
FIG. 57 is a flow diagram of an exemplary method used to receive a digital coupon from a business using a tap-to-text button on a website.

FIG. 57 is a flow diagram of an exemplary method used to receive a digital coupon from a business using a tap-to-text button on a website. According to one embodiment, a customer visits a business's website 5701 and sees a call-to-action button, i.e., tap-to-text button, for a coupon, free trial, or voucher. The tap-to-text button may be replaced with other words or graphics such as "Get free pass" button or link 5702. The link automatically opens the customer's mobile text messaging application with a prepopulated text message to the business, whereby the customer must simply press "send" 5703. The sent text message triggers a return text message 5704 generated by the system comprising some form of the coupon, free trial, or voucher. The form may be a graphic sent over multimedia messaging service (MMS), a uniform resource locator (URL) link, a QR code, an alphanumeric code, text, or any other type of media possible to send over a messaging service.

The system by which this method takes place uses the system as laid out in FIG. 1A and other figures. The coupon, free trial, or voucher text message may be stored in a database 155 and be sent out via the omnichannel text-based communicator 160 upon receipt of the text message sent by the customer's mobile device 130/150. Additionally, once the text message from the customer is received by the omnichannel text-based communicator 160, follow up text messages may be automatically sent to the customer asking for additional information such as zip code, name, and email address. Links to open the map application or a website with a map embedded may be sent to the customer as well in order to show locations of interest related to the coupon, free trial, or voucher. Reminders to use the coupon, free trial, or voucher may also be automatically sent to the customer's mobile device as desired by setting configuration files within the omnichannel text-based communicator 160. The call-to-action button on the business's website may be implemented manually by adding programming code, or by using the system and method disclosed in FIGS. 53-55, utilizing the API and a redirect URL.

Detailed Description of Exemplary Aspects

Figure 5:
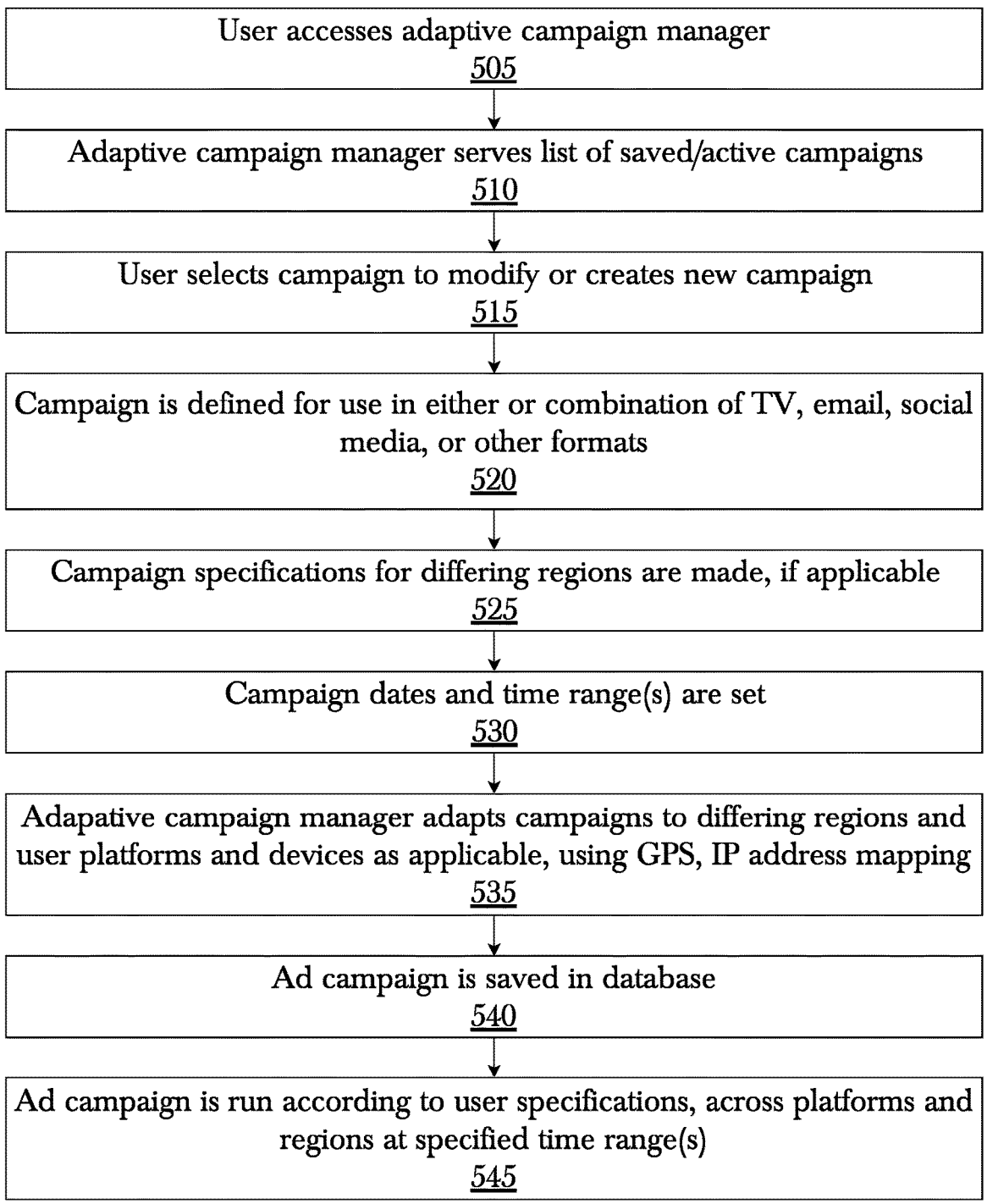
FIG. 5 is a method diagram illustrating steps for defining, altering, and executing ad campaigns on multiple platforms and mediums using an adaptive ad campaign manager.

FIG. 5 is a method diagram illustrating steps for defining, altering, and executing ad campaigns on multiple platforms and mediums using an adaptive ad campaign manager. First, a user accesses an adaptive campaign manager 505, which is a software on a computational device that is connected to a PSTN, the Internet, and has an interface to at least one TV network in order to manage approved TV advertisements on a given television channel. With the use of an ad campaign database or datastore, which may be one of many database types including MONGODB™, SQL™, ORACLEDB™, or others, the adaptive campaign manager serves the user a list of saved/active campaigns 510, if any. If any are available to the user, the user may select a campaign or campaigns to modify or may create a new campaign 515. Creation of a new campaign, or editing of a previous campaign, requires that an adaptative ad campaign manager have read and write permissions to an advertisement database, and requires that the user have access to these functionalities. Through either editing of a campaign or creation of a new campaign by a user, a campaign is defined for use in any of or a combination of TV, email, social media, or other formats 520, with campaign specifications allowing for alterations or dynamic portions of an advertisement based on region, if applicable 525. In this way, for instance, an advertisement may be made for different regions based on IP address, or user account name on a social media platform, or email address name, or region of their TV network, to provide for differing images, text, video, or audio, or some combination thereof. An example may be region-specific phone numbers for more local contact centers, warehouses, or stores, in a TV advertisement. After region settings, if any, are specified by a user, the campaign dates and time range(s) are set 530, for instance an advertisement on social media platforms that coincides with a certain political election season but turns off outside of the election season, or an advertisement for a new TV show that stops airing on TV networks after a certain date when the show is released. The adaptive campaign manager may adapt campaigns to differing regions and user platforms and devices as applicable, using GPS, IP address mapping 535, as mentioned, and store these alterations along with the rest of the campaign data, saving the ad campaign in the database 540. Finally, the ad campaign may then be run according to user specifications, across the specified platforms and regions at the specified times and time range(s) 545.

Figure 6:
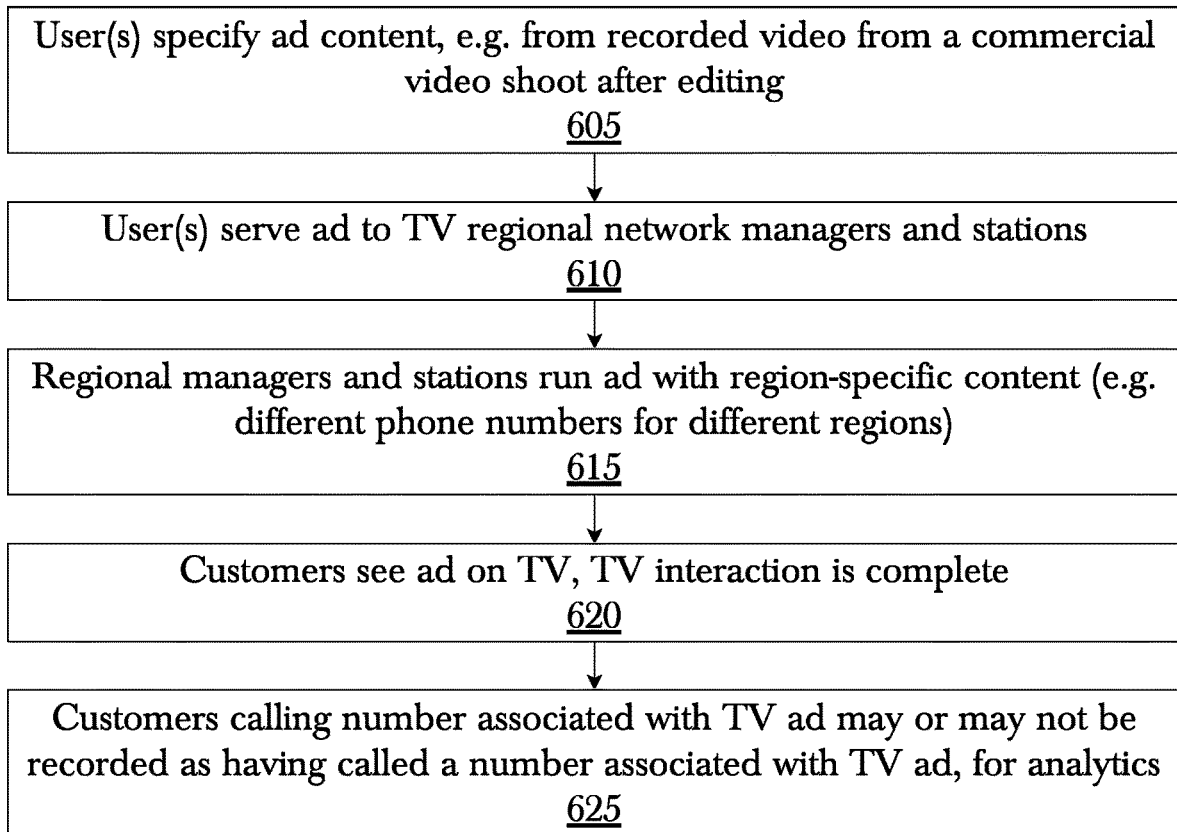
FIG. 6 is a method diagram illustrating steps for specifying a TV ad campaign using an adaptive ad campaign manager, according to a preferred aspect.
Figure 9:
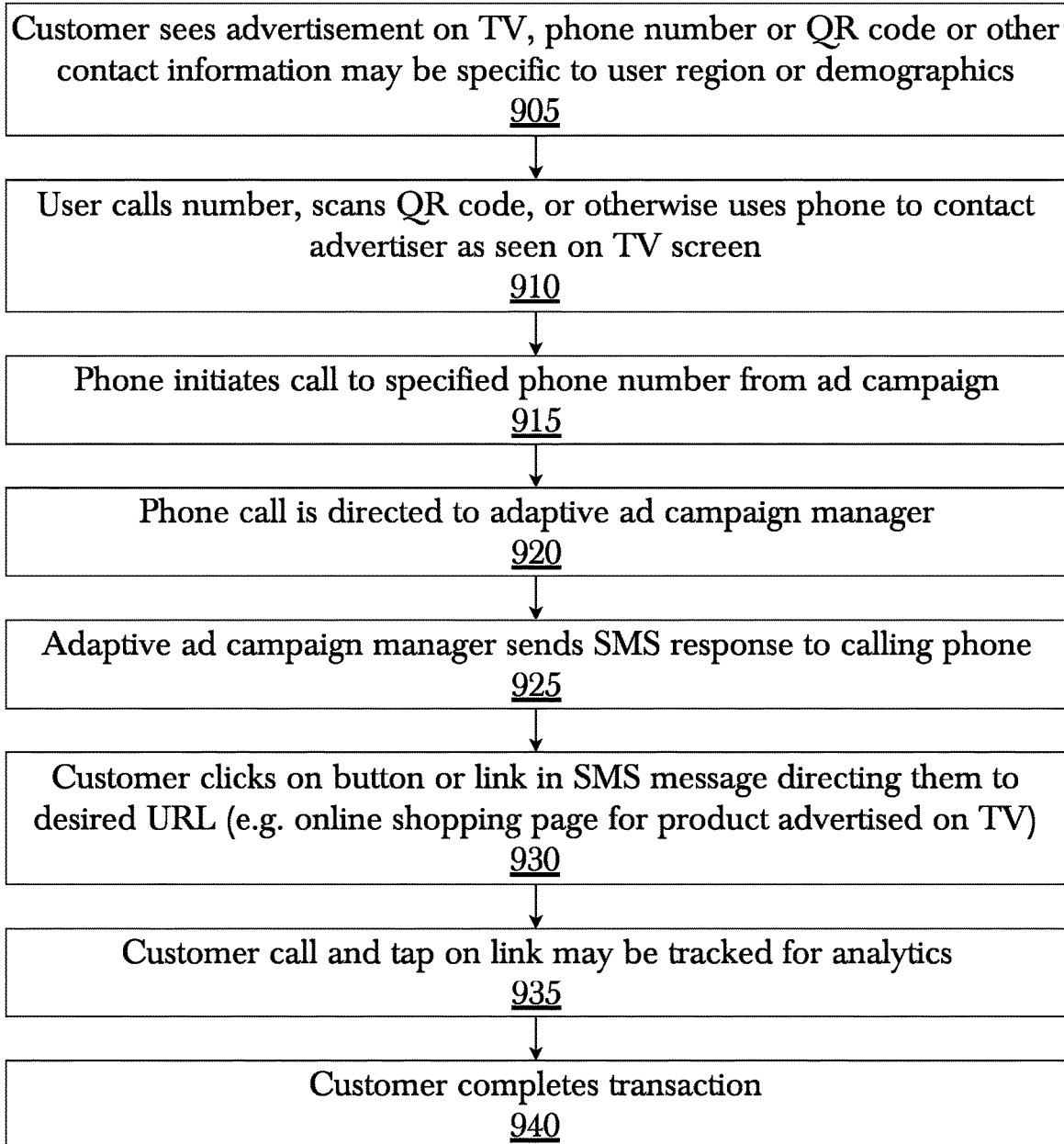
FIG. 9 is a method diagram illustrating users interacting with TV ads using an adaptive ad campaign manager, according to a preferred aspect.

FIG. 6 is a method diagram illustrating steps for specifying a TV ad campaign using an adaptive ad campaign manager, according to a preferred aspect. First a user or multiple users specify ad content, e.g. from recorded video from a commercial video shoot after editing 605, but the advertisement content may be from other sources as well, for instance it may be designed in video creation software, photo editing software, text editing software, some combination of these, or some other source entirely, as the format of the advertisement is always able to at worst be recorded manually if it is in an otherwise unsupported format by a TV network's standards. Either the finished formatted advertisement, or the unformatted raw advertisement data, or both, may be specified by the user. The user or users may then serve the ad to a single or plurality of TV networks or regional network managers and stations 610, either for distribution to an entire network or for altered or dynamic advertisements to be distributed to different regions or locales for advertising, such as a phone number that is different for specific regions where the advertisement appears. Television networks, regional managers and stations, or both, run the specified ad or ads with region-specific content (e.g. different phone numbers for different regions) 615 at the specified times or time ranges, as necessary, and when the customers see the ad on TV, the base interaction with the TV advertisement is complete 620. Further interaction such as calling a phone number, visiting a website, downloading an app, going to a physical location such as a retail outlet, or more, may be possible, but is not required or standardized across television advertisements as far as specifying the advertisement itself is concerned. However, according to an embodiment, customers may call a number associated with a TV ad made and utilized in this way, which may or may not be a region-specific phone number or advertisement as previously specified, and may be recorded as having called a number associated with TV ad, for analytics 625. As shown in FIG. 9, the phone number is utilized to simplify user interaction and provide more complete analytics on users influenced or taking action due to an advertisement, according to a preferred embodiment. It is possible for television to be viewed on a mobile device or other computing device, and as such a television in this embodiment may be understood as any device capable of viewing television broadcasts or television broadcasts viewed over the internet or any other network on a computing device.

Figure 7:
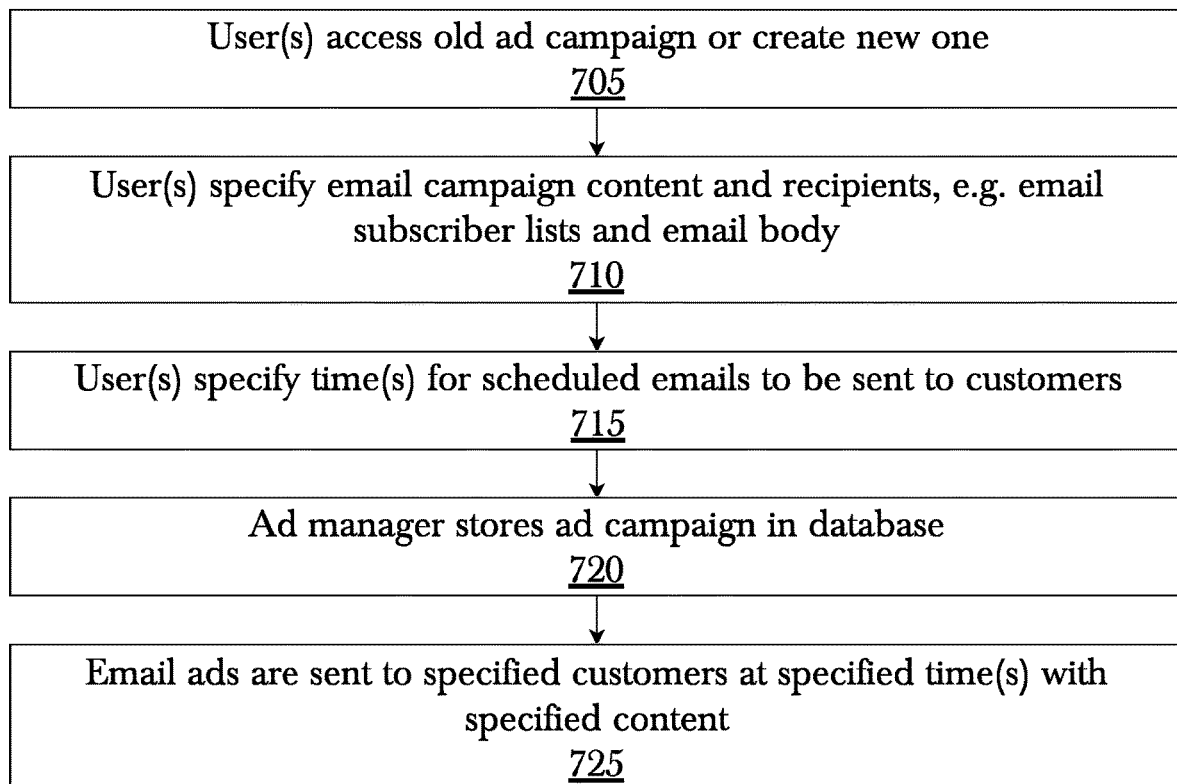
FIG. 7 is a method diagram illustrating steps for specifying an email ad campaign using an adaptive ad campaign manager, according to a preferred aspect.

FIG. 7 is a method diagram illustrating steps for specifying an email ad campaign using an adaptive ad campaign manager, according to a preferred aspect. First a user may access an already-created advertisement campaign in an advertisement campaign database, or create a brand new advertising campaign 705. Examples of types of database software that may operate include MYSQL™, ORACLE DATABASE™, MONGODB™, and others. It may exist as a distinct physical device or be operating on another computing device that may perform other specified functions aside from operating, hosting and serving the campaign database. If it is a distinct physical device, the database may be connected over a LAN or WAN, the Internet, a direct physical connection to another device, or some other network connection. Once an ad campaign is read from the database and prepared for editing, or a new campaign is created and ready for editing, the user or users may specify email campaign content and recipients, e.g. email subscriber lists and email body 710, such that the content will comprise at least an email header and subject, body, any relevant attachments, recipients either in a "to:" field, a "CC:" field, or "BCC:" field, or some other label for a recipient field. Not only are email recipients and content specified, but further, a user or users may then specify a time or times for scheduled emails to be sent to customers 715, which may further be specified in reaction to some API call or other action. For instance, email advertisements made in this way may be specified to run at particular dates and times, or may be specified to run if an email is sent to a connect email address, or even a third-party process such as a web-crawler may search a website or websites for content, and if content matching a given set of parameters is found, the ad campaign is sent out as specified. Regardless of whether a campaign is executed immediately or for some future date, or specified for execution in response to a certain set of conditions, the ad campaign manager stores the ad campaign in an advertisement campaign database 720 or databases, as applicable in a given implementation. Eventually or immediately, the specified email ads are sent to specified customers at specified times or in response to the specified conditions, with the specified content 725.

Figure 8:
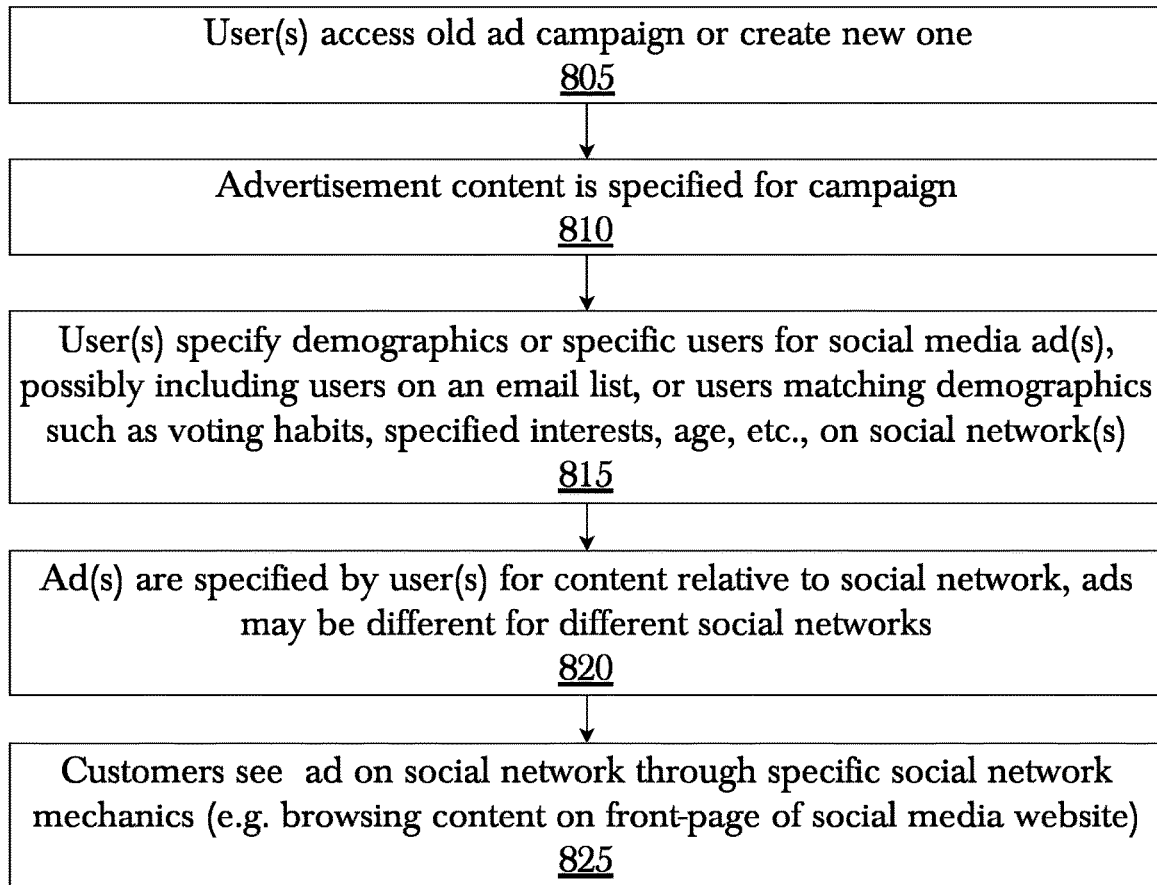
FIG. 8 is a method diagram illustrating steps for specifying a social media ad campaign using an adaptive ad campaign manager, according to a preferred aspect.

FIG. 8 is a method diagram illustrating steps for specifying a social media ad campaign using an adaptive ad campaign manager, according to a preferred aspect. First a user may access an already-created advertisement campaign in an advertisement campaign database, or create a brand new advertising campaign 805. Examples of types of database software that may operate include MYSQL™, ORACLE DATABASE™, MONGODB™, and others. It may exist as a distinct physical device or be operating on another computing device that may perform other specified functions aside from operating, hosting and serving the campaign database. If it is a distinct physical device, the database may be connected over a LAN or WAN, the Internet, a direct physical connection to another device, or some other network connection. Once an ad campaign is read from the database and prepared for editing, or a new campaign is created and ready for editing, the user or users may specify ad content and demographics or target audience, e.g. email subscriber lists or user nationalities being possible choices, and specifying the actual content of the advertisement 810, 815. Advertisements on social media may be specified to be posted not only for specific demographics and customer audience groups, but also for specific time and date ranges, or in response to certain conditions being met. Regardless of whether a campaign is executed immediately or for some future date, or specified for execution in response to a certain set of conditions, the advertisements may be dynamic or specifically designed to be different for differing audiences based on region, demographics, or other factors that may be possible to assess of a customer, much like a TV advertisement may look different or have a different listed phone number in some regions using this system 820. Eventually or immediately, the specified advertisements are visible to customers on the specified social media platform or platforms at specified times or in response to the specified conditions, with the specified content, whether dynamically altered or static for all users 825. A plurality of different social networks may be utilized for this form of advertisement, including FACEBOOK™, YOUTUBE™, TWITCH TV™, MYSPACE™, TWITTER™, and others, and such advertisements may further take place in video streams rather than solely on social media feeds. Social media advertisements often take the form of pre-recorded video and audio recordings played before or during a broadcast, as commonly seen on YOUTUBE™ and TWITCH TV™ platforms, but not only limited to those platforms.

FIG. 9 is a method diagram illustrating users interacting with TV ads using an adaptive ad campaign manager, according to a preferred aspect. After a television advertisement is specified and executed, a customer may see the advertisement on TV, which contains one or multiple of a phone number or QR code or other contact information which may be specific to user region or demographics 905, allowing a user to call the number, scan the QR code, or otherwise use their phone to contact the advertiser as seen on the TV screen 910. For instance, an advertisement may appear to customers in New York state and Washington State, for some store that operates only in these two states, but in these states has a moderate presence and wishes to grow. An advertisement that is mostly the same may air over several television channels in both states, but with different phone numbers for users to call if they are interested in the store and their products. After this step, a user initiates a phone call to specified phone number from ad campaign 915, either from the number on the screen, from the code scanned, or some other method of transmitting a phone number to a user. After a user initiates a phone call from the number on-screen or resulting from a scanned QR code or some other method (such as a URL on the TV showing them the phone number), the phone call is directed to the adaptive ad campaign manager 920 which uses an SMS server to respond to the user's phone call 925 with a link, or button, allowing them to complete a transaction, view a website or web page, or perform some other CTA 930. Alternatively, a call may be redirected to a redirect server, which handles the phone redirection and SMS response containing the CTA, rather than the call being directed to the adaptive campaign manager. Further, it is possible to have the adaptive campaign manager operate as part of such a redirect server in yet another implementation. The customer may then call or tap on the link, button, or other CTA, which is tracked for analytics 935 due to the fact that it is a CTA served directly by the ad campaign and which knows the phone number and accompanying data of the user, and allows the customer to complete the transaction as designed 940. This interaction may be monitored for the purposes of analytics, allowing the user's initial interaction with the advertisement, their call to the campaign manager or redirect server, and their completion of a purchase or service-use or other CTA fulfillment, may all be monitored for analytics purposes, allowing for a more complete analytics report on the use of these advertisements. The phone number displayed to a user may be dependent on the region of the broadcast, and as such further offers analytics tracking for users based on region and specific broadcasts. It is possible for television to be viewed on a mobile device or other computing device, and as such a television in this embodiment may be understood as any device capable of viewing television broadcasts or television broadcasts viewed over the internet or any other network on a computing device.

An example of a dynamic and tracked TV advertisement which interacts with a user in this way is provided. A television advertisement campaign may be specified for a product that is only legal in certain states of the United States of America, and which requires separate shipping options for customers in different states in the United States of America. Using the enclosed method, an otherwise typical TV advertisement may display different phone numbers to users in the different states, if desired. When a user calls the displayed number, their call is automatically captured by the advertisement campaign manager and an SMS text message is sent to the customer's phone, containing a link to an AMAZON™ or other web-portal for purchase fulfillment. The phone call the user initially placed, the SMS response, and their tap on the link or button from the SMS message, as well as whether or not they finish the transaction, are all able to be tracked, unlike with traditional TV advertising where it is not guaranteed how many individuals see the advertisement and are swayed to use a product or visit a store or restaurant or similar. The user, after being directed to a web-portal for purchase such as AMAZON™, may then finish the transaction, the entire string of events from the customer's perspective being to watch an advertisement, call a phone number, then click on a link from a text message and purchase the item from the online shopping portal, requiring no navigation of a phone system, website, travel to a brick and mortar store, and the entire interaction being trackable for analytics purposes.

Figure 10:
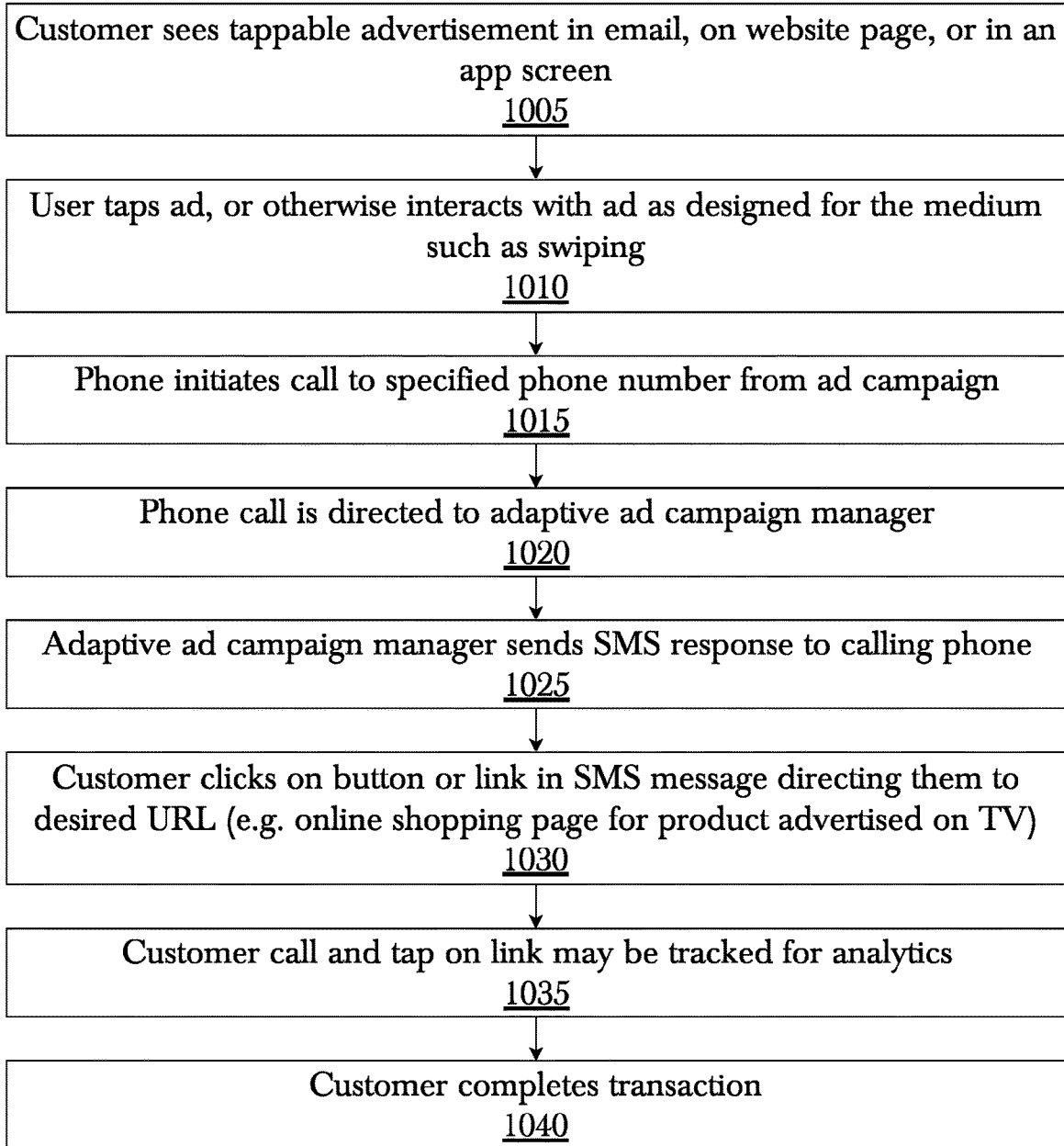
FIG. 10 is a method diagram illustrating users interacting with email ads using an adaptive ad campaign manager, according to a preferred aspect.

FIG. 10 is a method diagram illustrating users interacting with email ads using an adaptive ad campaign manager, according to a preferred aspect. After an email advertisement campaign is specified and executed, a customer or customers may see the advertisements through their email providers, which contain one or multiple of a phone number, QR code, tappable link or button or image, or other contact information or interactive design which may be specific to the customer's region or demographics 1005, allowing a user to call the number, scan the QR code, tap the link or image or button, or otherwise use their phone to contact the advertiser as seen in the email screen 1010. For instance, an advertisement may appear to customers who signed up for an email subscriber list and listed their locations in New York state and Washington State, for some store that operates only in these two states, but in these states has a moderate presence and wishes to grow. An advertisement that is mostly the same may be sent over email to users in both states, but with tappable image links that go to different URL's for users in the different states if they are interested in the store and their products. After this step, the interaction initiates a phone call to a specified phone number from the ad campaign 1015, either from the number on the screen, from the code scanned, from the tapped image or link or button, or some other method of transmitting a phone number to a user. After a user initiates a phone call from the number on-screen or resulting from a scanned QR code or some other method, the phone call is directed to the adaptive ad campaign manager 1020 which uses an SMS server to respond to the user's phone call 1025 with a link, or button, allowing them to complete a transaction, view a website or web page, or perform some other CTA 1030. Alternatively, a call may be redirected to a redirect server, which handles the phone redirection and SMS response containing the CTA, rather than the call being directed to the adaptive campaign manager. Further, it is possible to have the adaptive campaign manager operate as part of such a redirect server in yet another implementation. The customer may then call or tap on the link, button, or other CTA, which is tracked for analytics 1035 due to the fact that it is a CTA served directly by the ad campaign and which knows the phone number and accompanying data of the user, and allows the customer to complete the transaction as designed 1040.

Figure 11:
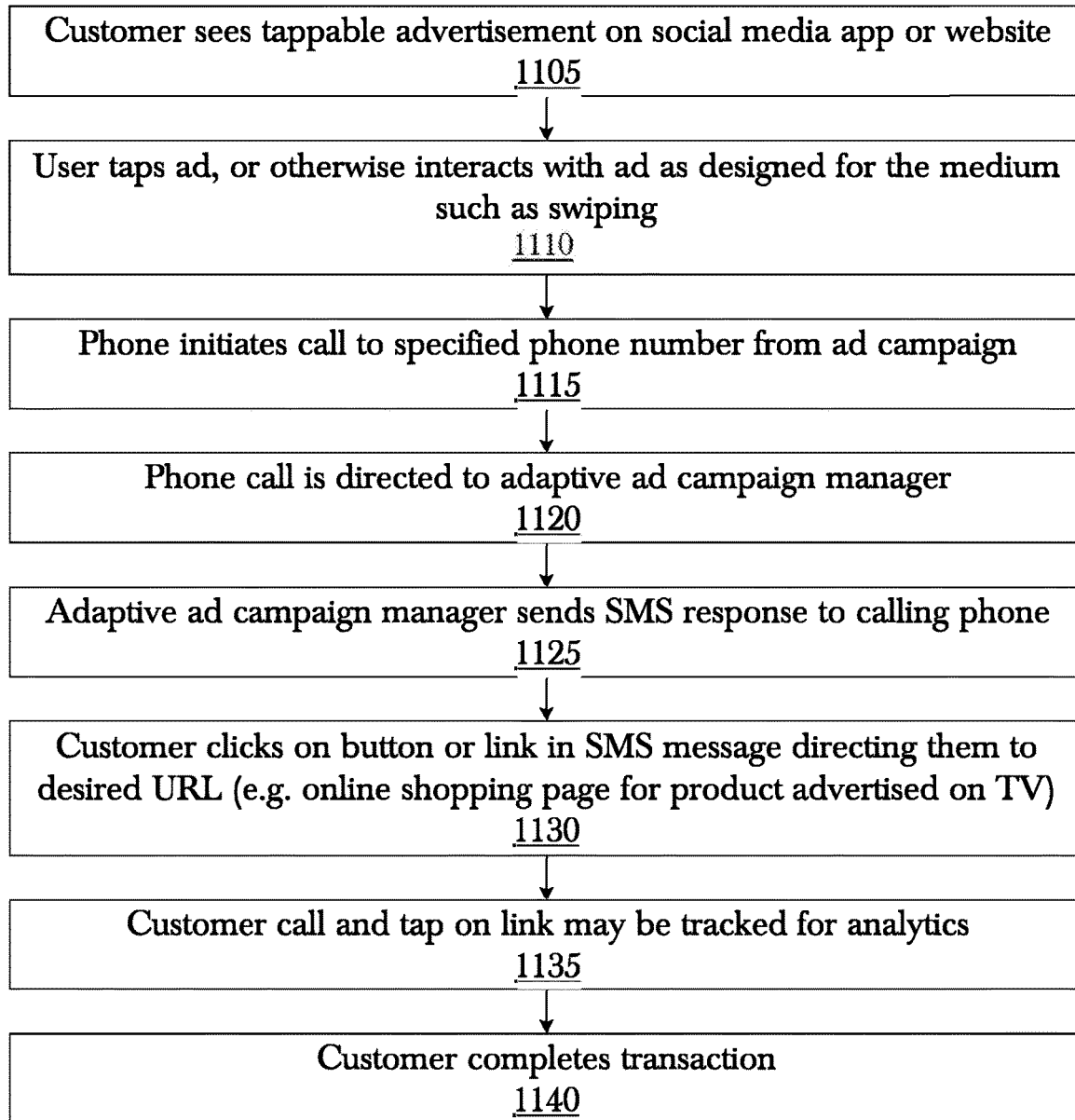
FIG. 11 is a method diagram illustrating users interacting with social media ads using an adaptive ad campaign manager, according to a preferred aspect.

FIG. 11 is a method diagram illustrating users interacting with social media ads using an adaptive ad campaign manager, according to a preferred aspect. After a social media advertisement campaign is specified and executed, a customer or customers may see the advertisements with their social media accounts, the advertisements containing one or multiple of a phone number, QR code, tappable link or button or image, or other contact information or interactive design which may be specific to the customer's region or demographics 1105, allowing a user to call the number, scan the QR code, tap the link or image or button, or otherwise use their phone to contact the advertiser as seen on the social media platform 1110. For instance, an advertisement may appear to customers who "follow" a business' page on a social media platform, allowing them to receive updates and ads from them, and listed their locations in New York State and Washington State, if the store operates only in these two states. An advertisement that is mostly the same may be visible to users in both states, but with tappable image links that go to different URL's for users in the different states if they are interested in the store and their products, if this is supported by the social media platform, otherwise the advertisements will be uniform. After this step, the interaction initiates a phone call to a specified phone number from the ad campaign 1115, either from the number on the screen, from the code scanned, from the tapped image or link or button, or some other method of transmitting a phone number to a user. After a user initiates a phone call from the number on-screen or resulting from a scanned QR code or some other method, the phone call is directed to the adaptive ad campaign manager 1120 which uses an SMS server to respond to the user's phone call 1125 with a link, or button, allowing them to complete a transaction, view a website or web page, or perform some other CTA 1130. Alternatively, a call may be redirected to a redirect server, which handles the phone redirection and SMS response containing the CTA, rather than the call being directed to the adaptive campaign manager. Further, it is possible to have the adaptive campaign manager operate as part of such a redirect server in yet another implementation. The customer may then call or tap on the link, button, or other CTA, which is tracked for analytics 1135 due to the fact that it is a CTA served directly by the ad campaign and which knows the phone number and accompanying data of the user, and allows the customer to complete the transaction as designed 1140.

Figure 12:
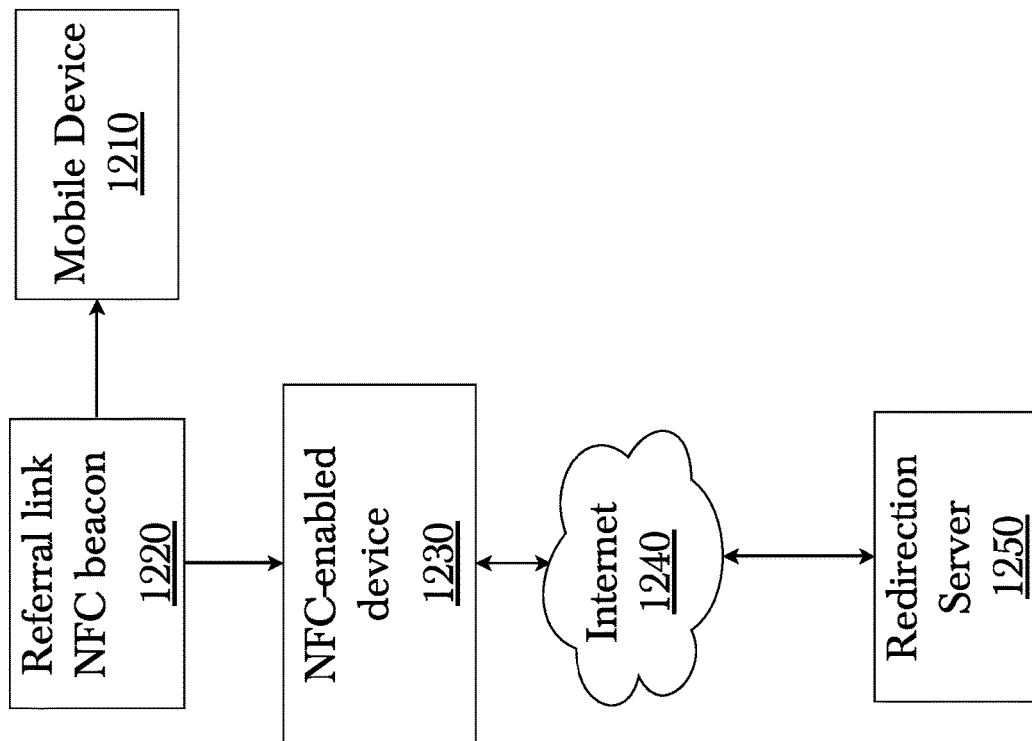
FIG. 12 is a system diagram illustrating a Near-Field Communications ("NFC") device broadcasting a referral link programmed into it, according to an aspect.

FIG. 12 is a system diagram illustrating a NFC device broadcasting a referral link programmed into it, according to an aspect. A mobile device 1210 such as a smartphone, operates an operating system (OS) such as ANDROID™ or IOS™, although other OSs are possible. A mobile device may be a tablet or other device aside from a smartphone as well. Mobile devices of these sorts may run software applications, commonly referred to as an "app" (short for "application"), for a variety of purposes, and a mobile device 1210 may or may not contain communications other than or instead of cellular communications, including wireless internet capabilities, BLUETOOTH™ communications, and NFC capabilities. With a mobile device 1210 possessing such NFC capabilities, a referral link NFC beacon 1220 may communicate with such a mobile device 1210, the beacon 1220 being operated as part of an NFC-enabled device 1230. Such a device may be any number of possible objects including a home appliance such as a toaster, refrigerator, blender, oven, television, laptop computer, or something else such as a coffee mug, piece of furniture such as a table or bed, or any number of other objects that may have NFC technology on or inside of them. A referral link that may be broadcast by such a beacon 1220 would refer over the internet 1240 to a redirection server 1250, for the purpose of forwarding a customer a page to buy a similar product, the same product, view a manufacturer's website, or any number of other possible CTA's that may be desired.

Figure 13:
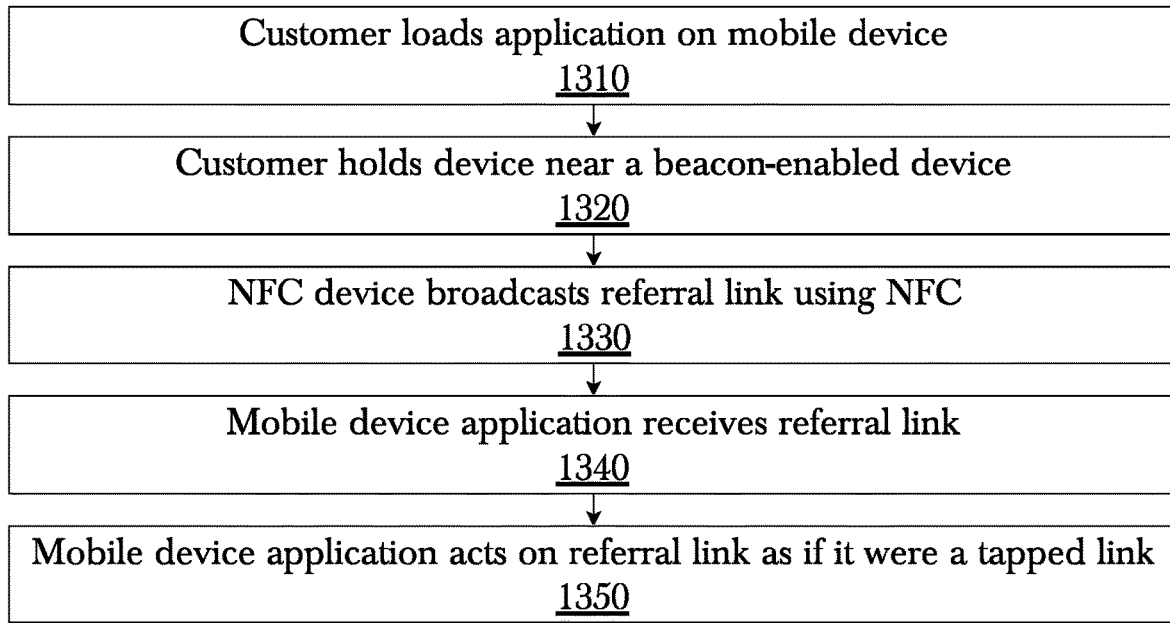
FIG. 13 is a method diagram illustrating methods for a NFC device to broadcast a referral link programmed into it and a mobile device act on the received link, according to an aspect.

FIG. 13 is a method diagram illustrating methods for a NFC device to broadcast a referral link programmed into it and a mobile device act on the received link, according to an aspect. First a customer may load an appropriate application on their mobile device 1310, the application or "app" being one which specifically communicates over NFC beacons to find referral links to initiate a call from a user's mobile device, at which point the call is redirected appropriately to send an SMS message to a user to complete a CTA. After initiating the application on a mobile device 1310, a customer may hold the mobile device near a beacon-enabled device 1320, the NFC beacon-enabled device broadcasting a referral link using NFC 1330 which may be received by a mobile device application 1340. Upon reception in the mobile device application, the mobile device application acts on the referral link as if it were a tapped link 1350 as shown in other embodiments, whereby the tapped link results in a phone call being initiated by a mobile device, the phone call being captured and redirected and responded to with an SMS message containing the CTA for a user to complete. A CTA may be a link to an online retail portal, a referral to a producer's website or directions to a store, or something else of use to the hosting business.

Figure 14:
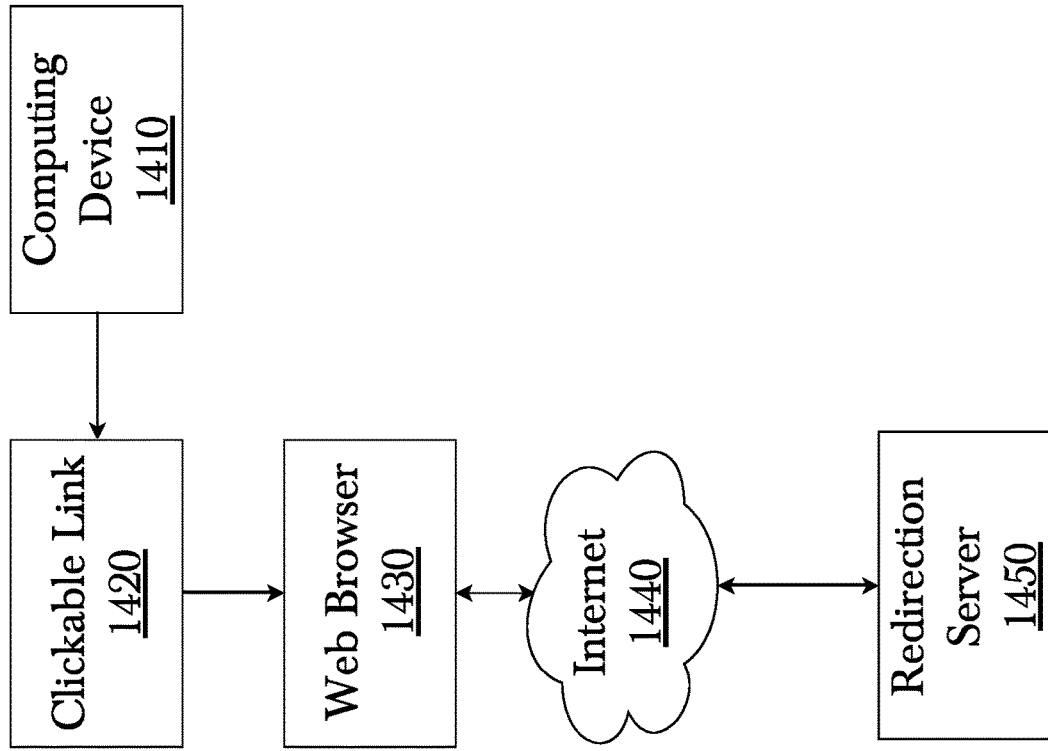
FIG. 14 is a system diagram illustrating a computer device such as a laptop, desktop, or mobile phone, utilizing a referral link, for the purposes of a mobile device detection system to differentiate between mobile phones and non-mobile devices, such as personal computers, according to a preferred aspect.

FIG. 14 is a system diagram illustrating a computer device such as a laptop, desktop, or mobile phone, utilizing a referral link, for the purposes of a mobile device detection system to differentiate between mobile phones and non-mobile devices, such as personal computers, according to a preferred aspect. A computing device 1410 such as a smartphone, personal computer, tablet, or other computing device, operates an operating system (OS) such as ANDROID™, IOS™, WINDOWS™, MAC OS™, or some other operating system. Computing devices of these sorts may run software applications, commonly referred to as an "app" (short for "application"), for a variety of purposes, and a computing device 1410 may or may not contain communications capabilities including cellular communications, wired and wireless internet capabilities, BLUETOOTH™ communications, and NFC capabilities. With a computing device 1410, a customer may access a clickable link 1420 through a web browser 1430. Such a browser may be any number of possible applications including INTERNET EXPLORER™, MICROSOFT EDGE™, GOOGLE CHROME™, SAFARI™, or other web browsers, including mobile web browsers for mobile devices or devices operating mobile operating systems such as ANDROID™. A referral link 1420 that may be tapped or clicked with such a browser 1430 would refer over the internet 1440 to a redirection server 1450, for the purpose of forwarding a customer a page to buy a similar product, the same product, view a manufacturer's website, or any number of other possible CTA's that may be desired. The purpose of such a system is for a redirection server 1450 to determine, based on the type of browser request sent when the link 1420 is clicked, whether a customer device is a mobile device such as a smartphone or tablet, or if it is a non-mobile device such as a laptop or desktop computer.

Figure 15:
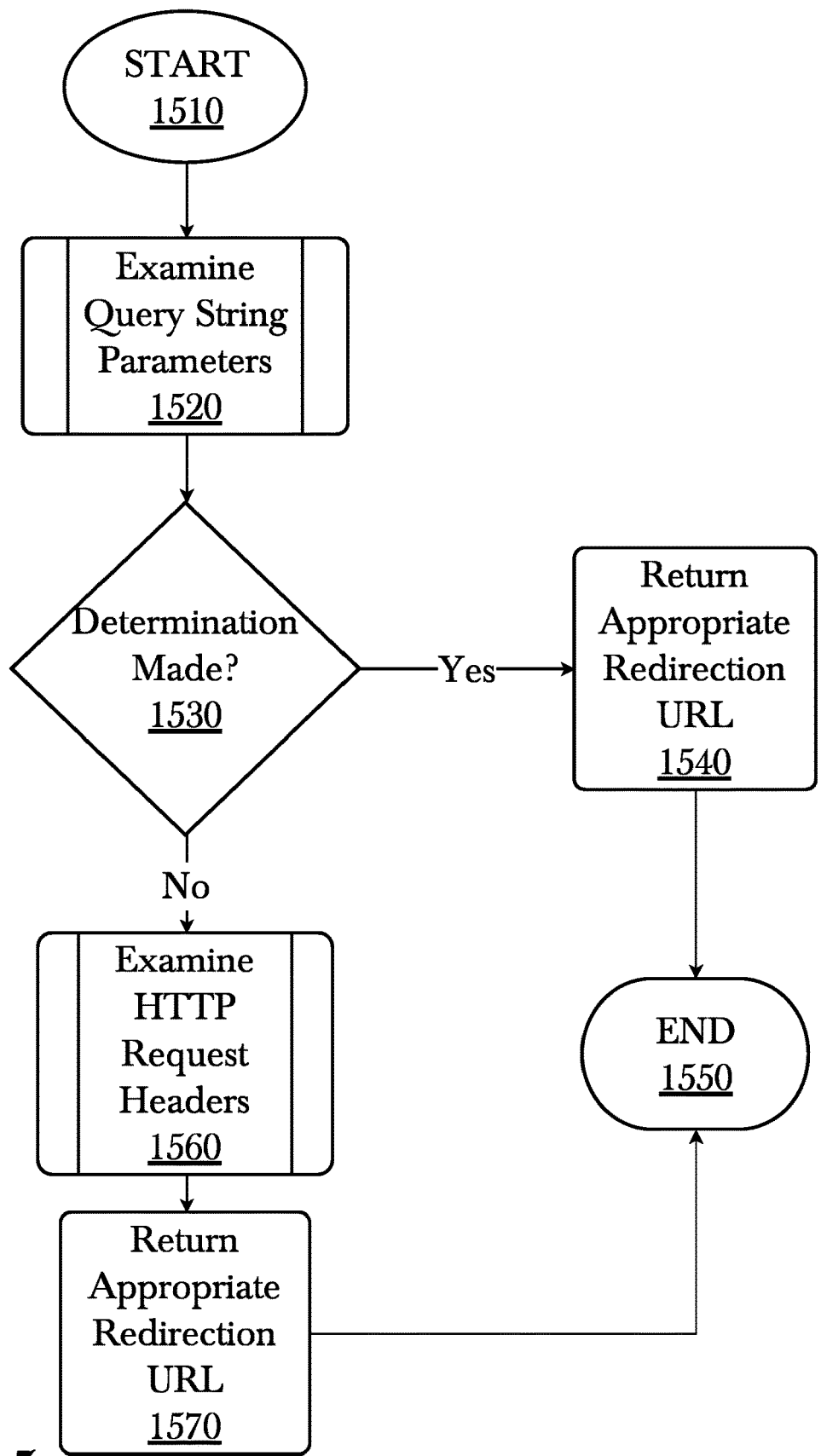
FIG. 15 is a flowchart illustrating steps for a computer device such as a laptop, desktop, or mobile phone, utilizing a referral link, being categorized so that an appropriate referral link is sent to the requesting device, according to a preferred aspect.

FIG. 15 is a flowchart illustrating steps for a computer device such as a laptop, desktop, or mobile phone, utilizing a referral link, being categorized so that an appropriate referral link is sent to the requesting device, according to a preferred aspect. The flowchart enters 1510 when a user clicks on a referral link, from any device, on a web browser, causing a redirection server to examine query string parameters 1520. A determination may be made 1530, as to what manner of device—a mobile device or something else, such as a personal computer—has sent the request. If a determination has already been made, the appropriate redirection URL is returned 1540, and the flowchart ends 1550. If a determination has not been made however, the HTTP headers are examined 1560 to determine the user-agent or similar field of an HTTP request from a customer's device. A user-agent field is frequently present in an HTTP request header indicating the product and version, and platform, used to make the request, and based on the result, the appropriate redirection URL is returned 1570, before the flowchart ends 1550.

Figure 20:
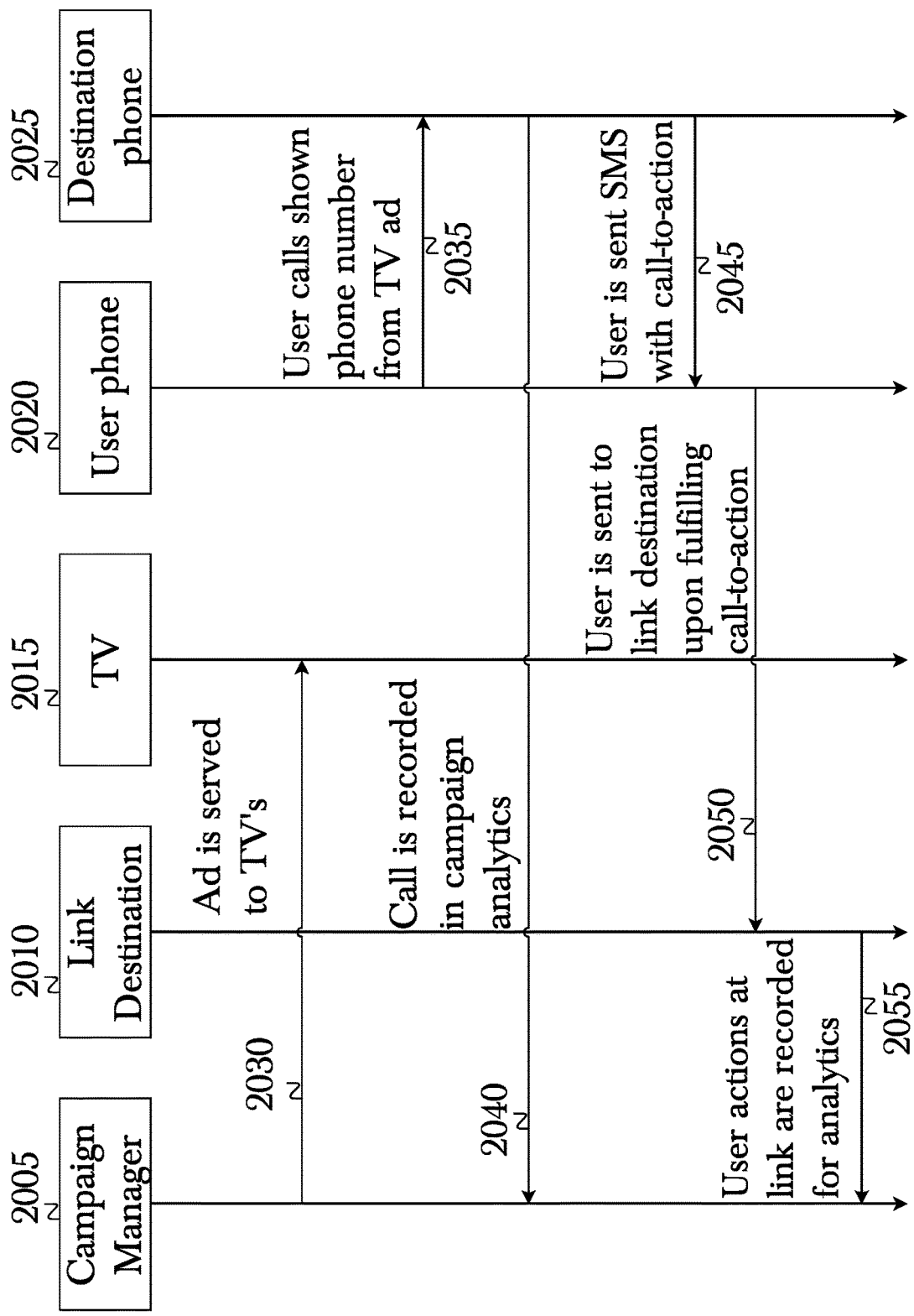
FIG. 20 is a message flow diagram illustrating the flow of messages and operations from a campaign manager specifying and serving a television advertisement, to a user completing all interactions with that advertisement and all intermediate steps, according to an embodiment of the invention.

FIG. 20 is a message flow diagram illustrating the flow of messages and operations from a campaign manager specifying and serving a television advertisement, to a user completing all interactions with that advertisement and all intermediate steps, according to an embodiment. A campaign manager 2005, which may be an adaptive campaign manager or a specialized campaign manager for television advertisements depending on the implementation, communicates over a network which may be the Internet, a PSTN, television networks, or some other network capable of transmitting to a television set 2015, to serve an advertisement 2030. The advertisement may be instead served to a television network manager or provider, which then may serve the advertisement to individual television sets 2030. A user who sees the television 2015 advertisement may use a mobile phone 2020 to call a number shown on the screen, for instance a phone number shown for ordering a specific computer part that a user may want. A user may call this number 2035 and be sent to a destination phone number 2025, whereupon the call is recorded in campaign analytics that are sent to the campaign manager 2040, 2005 over either the Internet or some other appropriate network for delivering data across devices. An alternative embodiment of this process may be to have the campaign manager be the destination phone number itself, effectively behaving as a redirect server by recording the received call on its own datastore and then cancelling or otherwise handling the incoming call, and responding with an SMS instead, redirecting the user. After a user calls a destination phone number 2035 and the analytics are recorded 2040, a response is provided to a user in the form of an SMS message 2045, which may communicate with the user's phone or with an application provided on their phone to provide a CTA. Such a CTA may be a tappable or clickable link, button, referral, or other similar CTA fulfillment method for phones, should other or newer methods arise. The CTA is such an implementation that the user, upon completion of the CTA, is directed to a link destination 2010 over a network such as the Internet 2050, for example to complete purchase of a product or take a survey. A combination of the user's access of the destination link 2010 and their actions upon reaching the link (such as completion of a purchase, or not) may be recorded in analytics 2055. For example, using this method, a user may see an advertisement on a TV screen, call the phone number, have the call be canceled and responded to with an SMS that contains a tappable or clickable or otherwise actionable link to a product landing page, and may then purchase the product on their mobile device right away depending on the user interface of the destination link, while having their initial call and their action with the CTA contained in the SMS, as well as possibly their action on the destination such as a landing page itself, all recorded in analytics. In this way, a more complete customer analytics profile may be formed.

Figure 21:
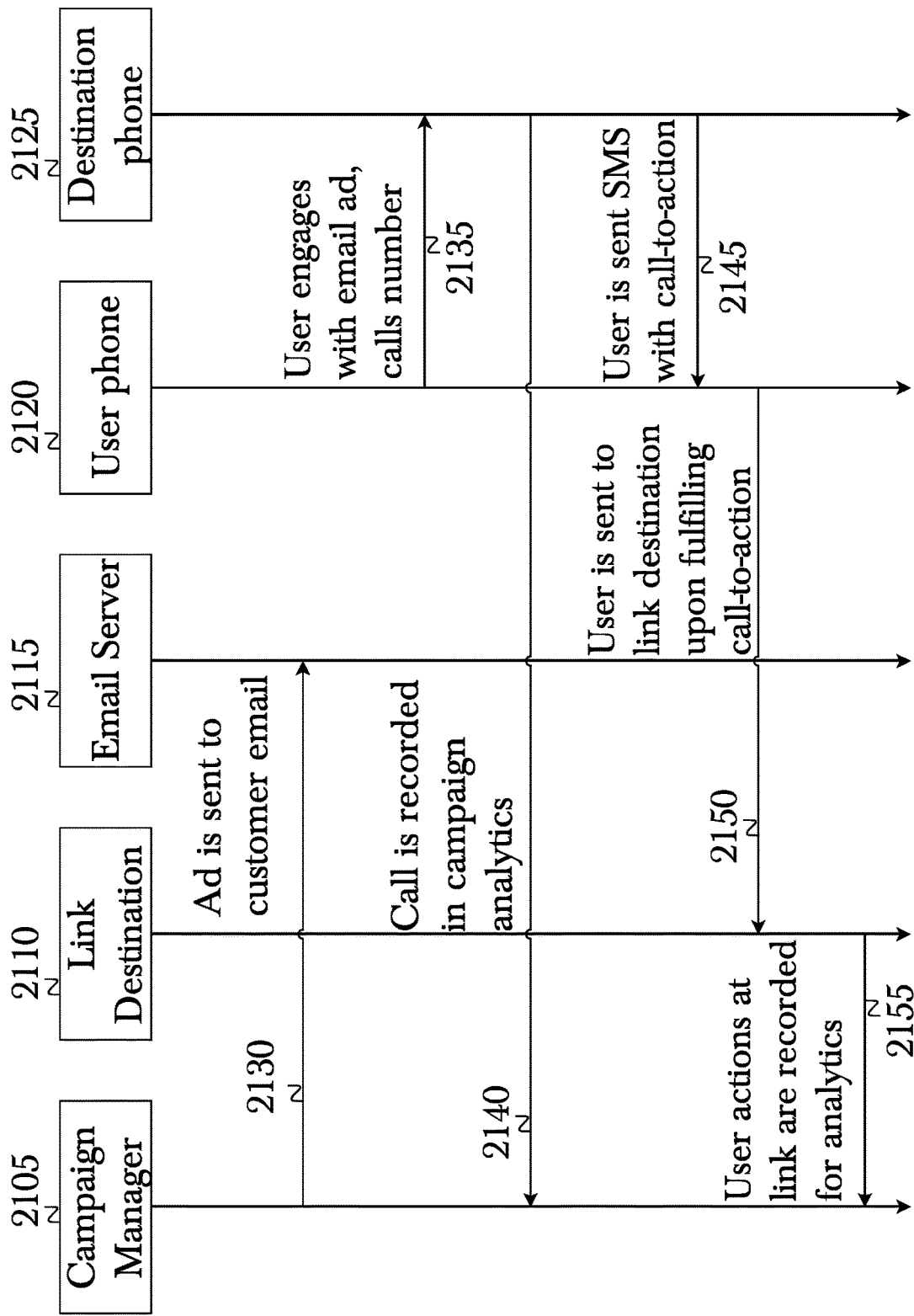
FIG. 21 is a message flow diagram illustrating the flow of messages and operations from a campaign manager specifying and serving an email-based advertisement, to a user completing all interactions with that advertisement and all intermediate steps, according to an embodiment of the invention.

FIG. 21 is a message flow diagram illustrating the flow of messages and operations from a campaign manager specifying and serving an email-based advertisement, to a user completing all interactions with that advertisement and all intermediate steps, according to an embodiment. A campaign manager 2105, which may be an adaptive campaign manager or a specialized campaign manager for the purposes of sending emails and email advertisements depending on the implementation, communicates over a network which may be the Internet, a PSTN, or some other network capable of sending emails to customer emails hosted by any common email service providers such as GOOGLE™ or YAHOO™ 2115, to serve an advertisement 2130. This advertisement may be in the form of a subscription newsletter, may be solicited or unsolicited as allowed by law, or any other sort of email-based advertisement. The advertisement may be instead served to a service or network which manages and executes such emails which may be mass-sent rather than individually sent, and which then may serve the advertisement to a customer's email address 2130. A user who sees the email advertisement may use a mobile phone 2120 to call a number shown on the screen or tap an image or button that uses the phone to call a phone number, for instance a phone number shown for ordering a specific computer part that a user may want, or a specific service in their area. A user may call this number 2135 and be sent to a destination phone number 2125, whereupon the call is recorded in campaign analytics that are sent to the campaign manager 2140, 2105 over either the Internet or some other appropriate network for delivering data across devices. An alternative embodiment of this process may be to have the campaign manager be the destination phone number itself, effectively behaving as a redirect server by recording the received call on its own datastore and then cancelling or otherwise handling the incoming call, and responding with an SMS instead, redirecting the user. After a user calls a destination phone number 2135 and the analytics are recorded 2140, a response is provided to a user in the form of an SMS message 2145, which may communicate with the user's phone or with an application provided on their phone to provide a CTA. Such a CTA may be a tappable or clickable link, button, referral, or other similar CTA fulfillment method for phones, should other or newer methods arise. The CTA is such an implementation that the user, upon completion of the CTA, is directed to a link destination 2110 over a network such as the Internet 2150, for example to complete purchase of a product or take a survey. A combination of the user's access of the destination link 2110 and their actions upon reaching the link (such as completion of a purchase, or not) may be recorded in analytics 2155. For example, using this method, a user may register with a newsletter or subscribe to an organization's promotional advertisements via email, and see an advertisement on a received email for a car part on sale, call the phone number, have the call be canceled and responded to with an automated SMS that contains a tappable or clickable or otherwise actionable link to a product landing page, and may then purchase the product on their mobile device right away depending on the user interface of the destination link, while having their initial call and their action with the CTA contained in the SMS, as well as possibly their action on the destination such as a landing page itself, all recorded in analytics. In this way, a more complete customer analytics profile may be formed.

Figure 22:
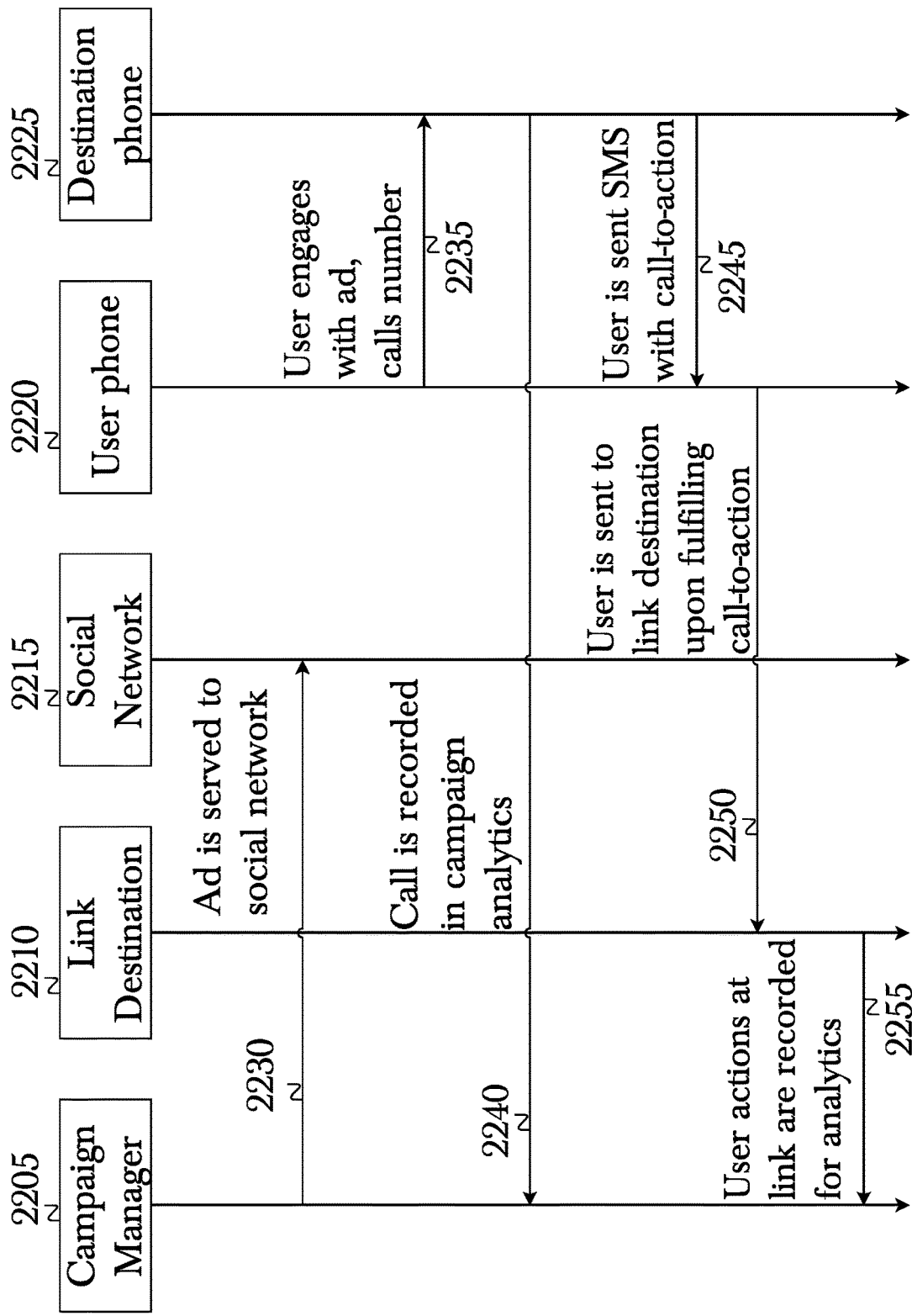
FIG. 22 is a message flow diagram illustrating the flow of messages and operations from a campaign manager specifying and serving a social media advertisement, to a user completing all interactions with that advertisement and all intermediate steps, according to an embodiment of the invention.

FIG. 22 is a message flow diagram illustrating the flow of messages and operations from a campaign manager specifying and serving a social media advertisement, to a user completing all interactions with that advertisement and all intermediate steps, according to an embodiment. A campaign manager 2205, which may be an adaptive campaign manager or a specialized campaign manager for the purposes of specifying and purchasing social media advertisement space and time depending on the implementation, communicates over a network which may be the Internet, a PSTN, or some other network capable of communicating with social networks such as FACEBOOK™ or MYSPACE™ but which may be another social network that allows any advertisements to be procured on the platform 2215, to serve an advertisement 2230. This advertisement may be in the form of a video embedded in a user's social network feed, may be solicited or unsolicited as allowed by law, may be utilized with user data such as purchase history or any other available data if applicable, or any other sort of social media advertisement as may be or become common in the art. A user who sees the advertisement may use a mobile phone 2220 to tap or click the advertisement which may use the phone's functionality to call a phone number, or manually call a number shown on the screen, for instance a phone number shown for ordering a specific piece of furniture that a user may want, or a specific service provided in their area. A user may call this number 2235 and be sent to a destination phone number 2225, whereupon the call is recorded in campaign analytics that are sent to the campaign manager 2240, 2205 over either the Internet or some other appropriate network for delivering data across devices. An alternative embodiment of this process may be to have the campaign manager be the destination phone number itself, effectively behaving as a redirect server by recording the received call on its own datastore and then cancelling or otherwise handling the incoming call, and responding with an SMS instead, redirecting the user. After a user calls a destination phone number 2235 and the analytics are recorded 2240, a response is provided to a user in the form of an SMS message 2245, which may communicate with the user's phone or with an application provided on their phone to provide a CTA. Such a CTA may be a tappable or clickable link, button, referral, or other similar CTA fulfillment method for phones, should other or newer methods arise. The CTA is such an implementation that the user, upon completion of the CTA, is directed to a link destination 2210 over a network such as the Internet 2250, for example to complete purchase of a product or take a survey. A combination of the user's access of the destination link 2210 and their actions upon reaching the link (such as completion of a purchase, or not) may be recorded in analytics 2255. For example, using this method, a user may perform online shopping such as with (but not limited to) AMAZON™, whereby information regarding their shopping habits is recorded, and a social media advertisement is specified to target users with similar shopping history, such as those who have purchased coffee tables recently. A user may see the advertisement on their preferred social network, call the phone number, have the call be canceled and responded to with an automated SMS that contains a tappable or clickable or otherwise actionable link to a product landing page, and may then purchase the product on their mobile device right away depending on the user interface of the destination link, while having their initial call and their action with the CTA contained in the SMS, as well as possibly their action on the destination such as a landing page itself, all recorded in analytics. In this way, a more complete customer analytics profile may be formed.

Figure 23:
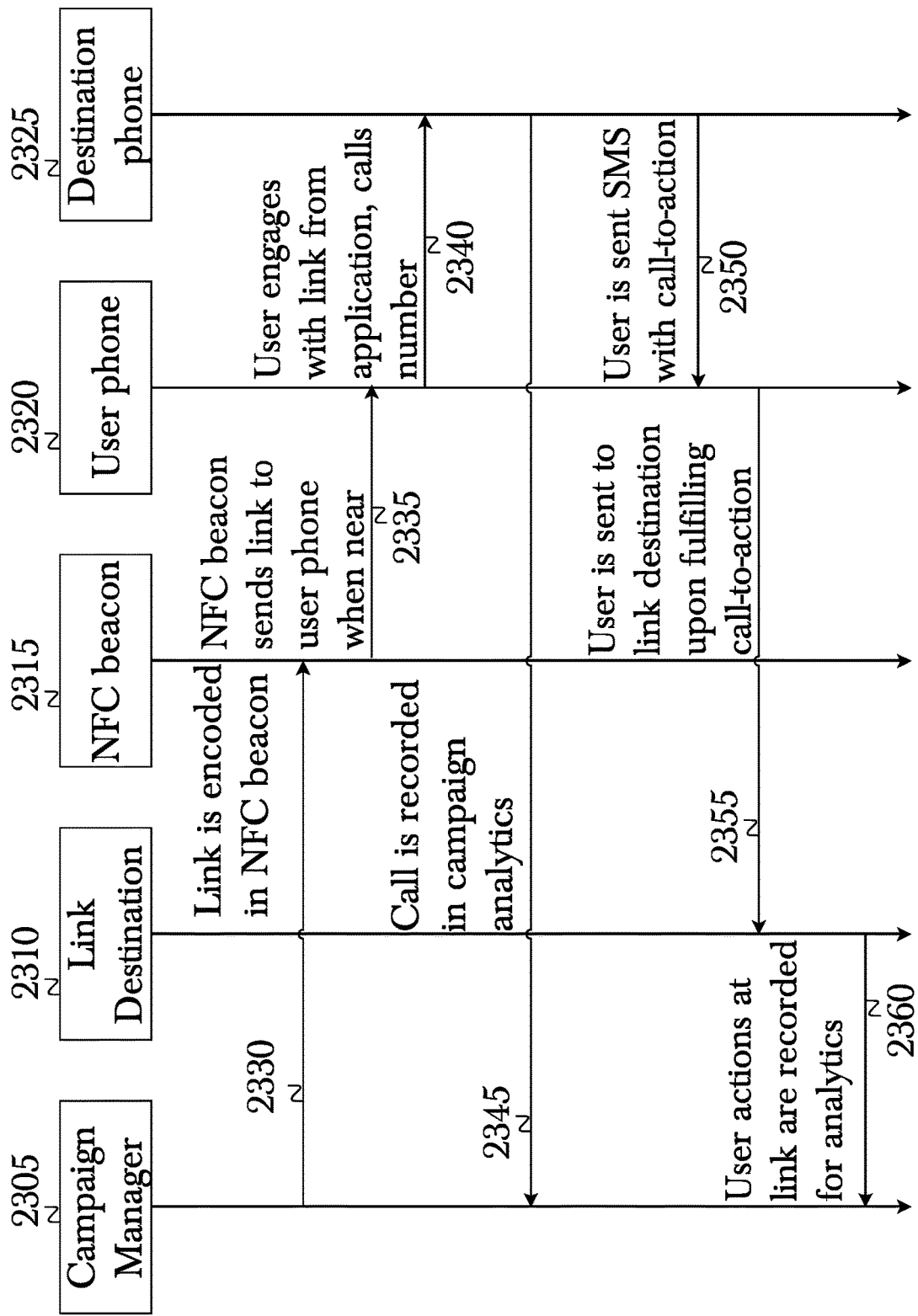
FIG. 23 is a message flow diagram illustrating the flow of messages and operations from a campaign manager specifying and embedding a referral link in an NFC beacon, to a user completing all interactions with that link and all intermediate steps, according to an embodiment of the invention.

FIG. 23 is a message flow diagram illustrating the flow of messages and operations from a campaign manager specifying and embedding a referral link in an NFC beacon, to a user completing all interactions with that link and all intermediate steps, according to an embodiment. A campaign manager 2305, which may be an adaptive campaign manager or a specialized campaign manager for the purposes of specifying a link destination 2310 to direct users to, and embedding this link in a NFC beacon 2315 such as a sticker or small device on or inside of, or operating as part of, a product 2330, which may be utilized by a customer to receive the programmed link destination 2310 for a variety of possible purposes. A user who is delivered the link or advertisement by an NFC beacon 2315 may use a mobile phone 2320 to tap or click the advertisement which may use the phone's functionality to call a phone number, or manually call a number shown on the screen, for instance a phone number shown for ordering a specific piece of furniture that a user may want, or a specific service provided in their area. An NFC beacon 2315 may deliver the notification 2335, link, or similar, via a specialized application residing on and operating on the user's phone 2320, according to some embodiments. A user may call a shown number or utilize a shown button or call link 2340 and be sent to a destination phone number 2325, whereupon the call is recorded in campaign analytics that are sent to the campaign manager 2345, 2305 over either the Internet or some other appropriate network for delivering data across devices. An alternative embodiment of this process may be to have the campaign manager be the destination phone number itself, effectively behaving as a redirect server by recording the received call on its own datastore and then cancelling or otherwise handling the incoming call, and responding with an SMS instead, redirecting the user. After a user calls a destination phone number 2340 and the analytics are recorded 2345, a response is provided to a user in the form of an SMS message 2350, which may communicate with the user's phone or with an application provided on their phone to provide a CTA. Such a CTA may be a tappable or clickable link, button, referral, or other similar CTA fulfillment method for phones, should other or newer methods arise. The CTA is such an implementation that the user, upon completion of the CTA, is directed to a link destination 2310 over a network such as the Internet 2355, for example to complete purchase of a product or take a survey. A combination of the user's access of the destination link 2310 and their actions upon reaching the link (such as completion of a purchase, or not) may be recorded in analytics 2360. For example, using this method, a user may have a product in their home built with this method, that has an NFC beacon on or inside of it, and the user wishes to know more about the product, or purchase another or a similar product, or view the manufacturer's website, or anything similar. The user may simply start an application for this purpose if necessary, and regardless of whether a specialized application is utilized, move the phone close to the NFC beacon location, receiving data from the NFC beacon which could be the form of a link or a phone number to call. A user may see a phone number on the shown website, or perhaps be delivered a phone number to call directly from the NFC beacon, call the phone number, have the call be canceled and be responded to with an automated SMS that contains a tappable or clickable or otherwise actionable link to a product landing page, and may then purchase the product on their mobile device right away depending on the user interface of the destination link, while having their initial call and their action with the CTA contained in the SMS, as well as possibly their action on the destination such as a landing page itself, all recorded in analytics. In this way, a more complete customer analytics profile may be formed.

Figure 24:
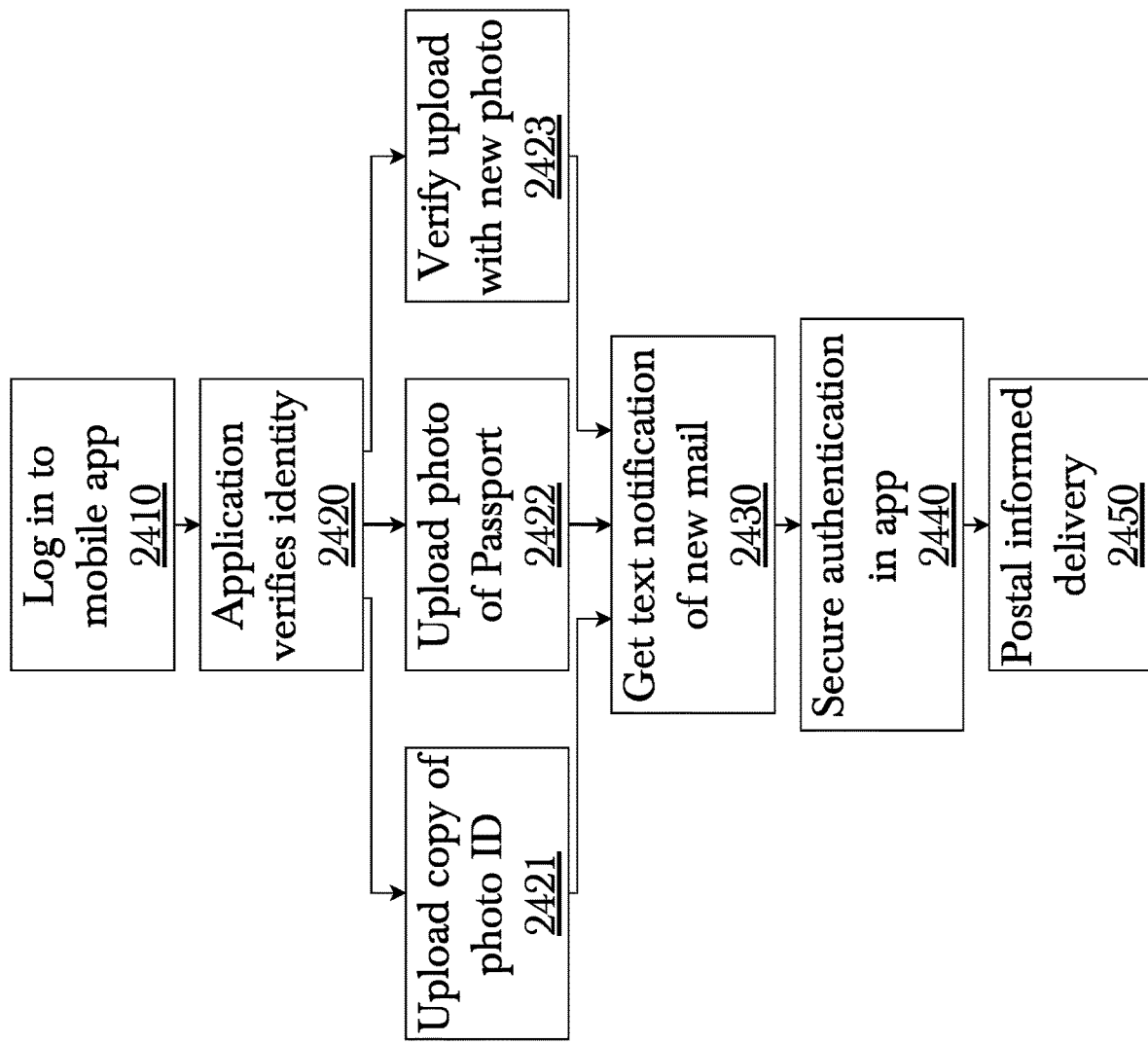
FIG. 24 is a method diagram illustrating the function of an application capable of providing enhanced identity verification, according to an embodiment.

FIG. 24 is a method diagram illustrating the function of an application capable of providing enhanced identity verification, according to an embodiment. A user may utilize on a mobile device, such as a mobile phone, an application or "app" that enables enhanced identity verification for purposes including detailed shipping updates such as for products purchased, allowing a user to sign up and log in to the mobile app 2410, over the Internet or another network suitable for such. User login information may be stored off-site or on-site depending on the application implementation, whereby information may be stored using a datastore including SQL, NoSQL such as MONGODB™, or other forms of data storage. Logging into an application is an understood procedure by which a user provides a recognized username and password, whether the username is user-defined or some identifier such as their email address, to confirm user identity. The application then verifies the identity 2420 of a user, through a process utilizing an uploaded copy of photo ID 2421 which may be their driver's license or state-issued photo identification, a photo copy of their passport 2422 including their photo in their passport, and an of a new facial photo (sometimes referred to as a "selfie") 2423. Using machine learning and image parsing, the authentication can make use of the information on the driver's license or state ID, as well as look for signs of the photo being doctored, in addition to checking for signs of the passport image being doctored, determine if the passport template matches the official template of the country of origin, check version numbers against the standards available, ensure letters and numbers all align and do not appear doctored, check font size and type, validate the attributes on the document along with the state ID or driver's license, and compare the images along with the "selfie" or new self-photograph of the face, to attempt to ensure the identity of the user. When the user has new mail arriving, they may get a text notification of new mail 2430 through the application, and if their identity is securely identified through the app 2440 they may view further information about their package through the USPS™ INFORMED DELIVERY™ system 2450, or a similar system by which citizens may receive advance notice and data about mail coming to them before it actually arrives, for denizens of other countries.

Figure 25:
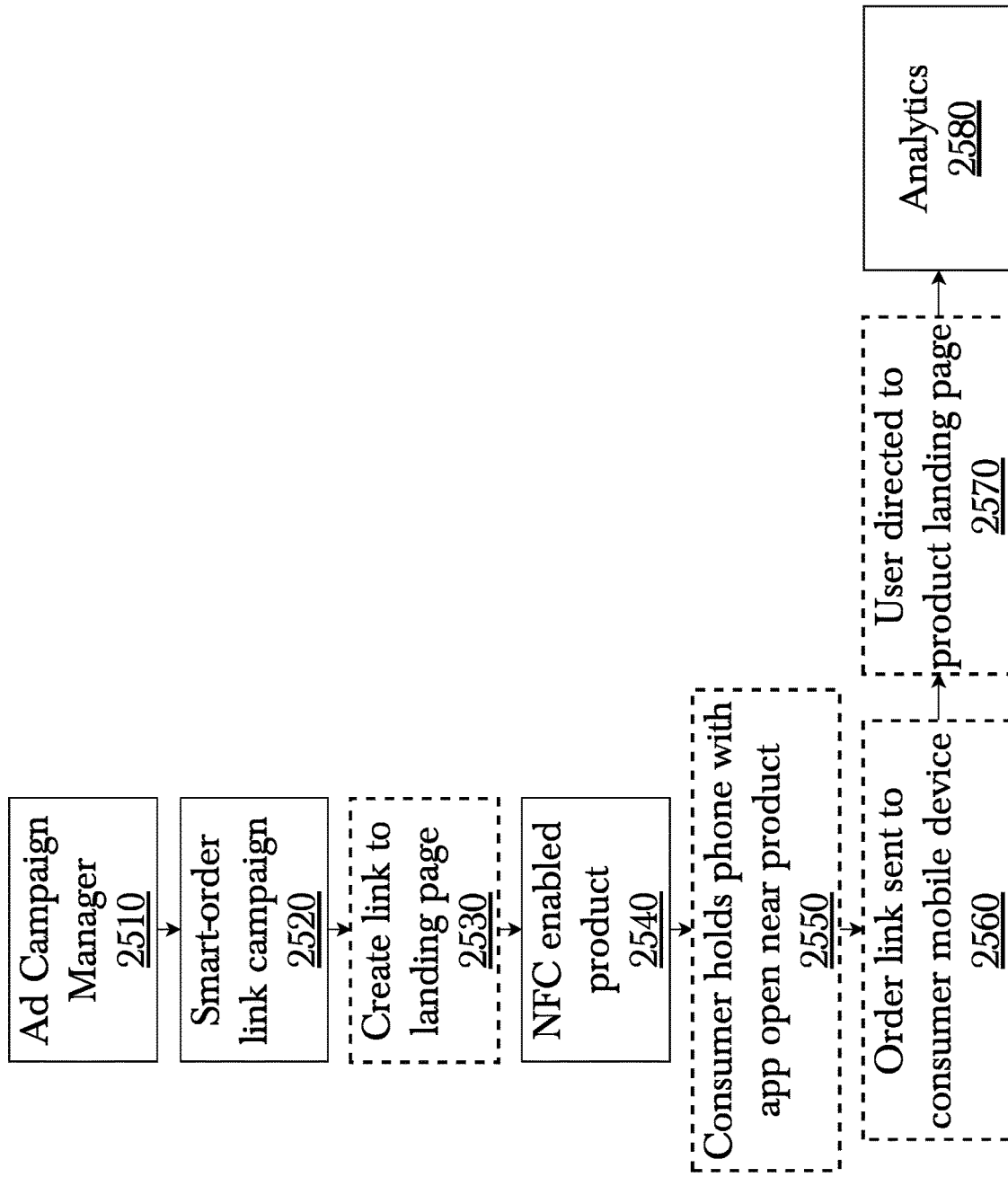
FIG. 25 is a diagram illustrating the function of an NFC beacon smart order link, according to an embodiment.

FIG. 25 is a diagram illustrating the function of an NFC beacon smart order link, according to an embodiment. An ad campaign manager 2510 is present as either a computer system or service operating on a computer system, and which may be a multiplatform adaptive ad campaign manager or which may be a more specialized service or computing system, capable of allowing a user to specify and create a smart-order link campaign 2520. A smart-order link campaign is an advertisement campaign wherein a smart-order link is generated for a product ordering page or landing page 2530, for instance a link to an online retailer's page for a product or a class of products or similar, and which may be a dynamic link which is capable of changing based on specified parameters from the campaign administrator. For example, URL's that refer to different pages, or which pass different data to the page such as through URL parameters, depending on parameters such as customer region, region of the product, or other possible selections. Whether or not the smart-order link is dynamic or not, the link is sent to an NFC-enabled product 2540, or embedded in a sticker or other attachable device for the product, so that the product can broadcast the NFC data and smart-order link to NFC receivers. This may be an adhesive sticker, an embedded chip or component in a product, or any other implementation that may successfully allow an NFC signal to be broadcast from the product effectively. When this is completed, and the product is shipped, a consumer may hold their phone or other mobile device with a receiver app operating, near the product 2550, so that the smart-order link is sent to the consumer mobile device 2560. Upon receiving the smart-order link, a customer may then be directed to product landing page 2570, where they may purchase or learn more about a product, or alternatively they may be directed to another URL for information or services depending on the implementation of the system. The smart-order link destination may be monitored for user access to provide basic analytics 2580 capabilities to the system operator as well, including data about the specific product that broadcast the link over NFC, the customer device or identity if available, and any available location data if available, though other possibilities for analytics with this system exist and may be extended in some implementations.

Figure 26:
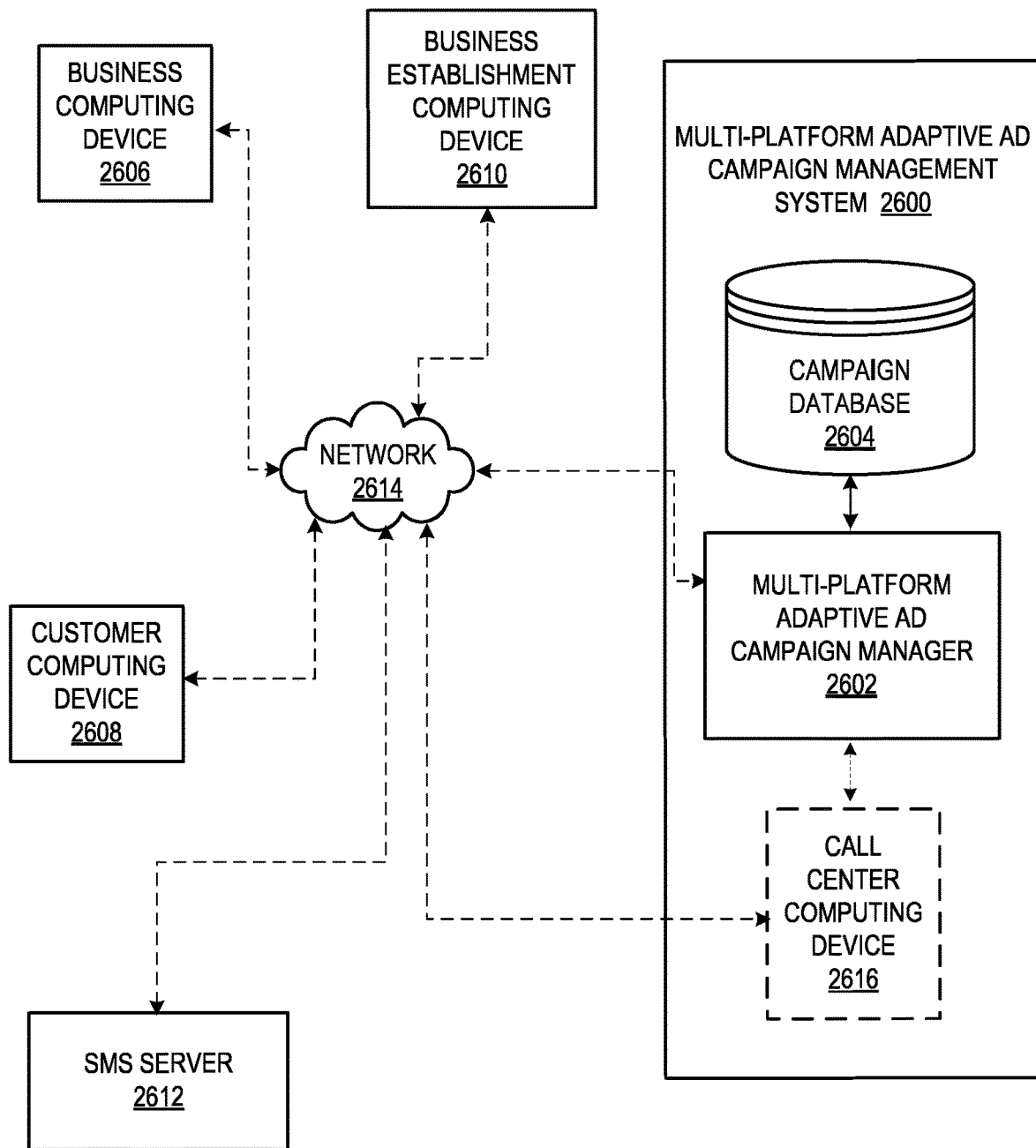
FIG. 26 is a block diagram representation of an example of an environment for use with an embodiment of an adaptive ad campaign management system.

Referring to FIG. 26, an example of an environment for use with an embodiment of an adaptive ad campaign management system 2600 is shown. The adaptive ad campaign management system 2600 includes an adaptive ad campaign manager 2602 and a campaign database 2604. The adaptive ad campaign management system 2600 is configured to be communicatively coupled to at least one business computing device 2606, at least one customer computing device 2608, at least one business establishment computing device 2610, and an SMS server 2612 via a network 2614. In an embodiment, the adaptive ad campaign management system 2600 includes at least one call center computing device 2616.

In an embodiment, the adaptive ad campaign manager 2602, includes software operating on a computing device. Examples of computing devices include, but are not limited to, a personal computer and a workstation computer. The adaptive ad campaign manager 2602 is configured to execute the software, receive user inputs, and utilize a network adapter. The operating system of the computing device may be one of many options available to consumers and businesses.

The campaign database 2604 may take the form of a managed or unmanaged database, document-oriented database system, or a SQL database. Examples of types of database software that may operate include MYSQL™, ORACLE DATABASE™, MONGODB™, and others. The campaign database 2604 may exist as a distinct physical device or be operating on another computing device that may perform other functions aside from operating, hosting and serving the campaign database 2604. If the campaign database 2604 is a distinct physical device, the database may be connected over a LAN or WAN, the Internet, a direct physical connection to another device, or some other network connection. The campaign database 2604 may be a centralized database system. The campaign database 2604 may be a distributed database system.

Examples of customer computing devices 2608 include, but are not limited to, a mobile computing device, a personal computer, a cellular phone, a tablet, a smartphone, a non-smartphone cellular phone, a laptop, and a personal digital assistant. The customer computing devices 2608 are configured to be communicatively coupled to the adaptive ad campaign manager 2602 via the network 2614. In an embodiment, the customer computing devices 2608 are configured to transmit/receive text messages. In an embodiment, the customer computing devices 2608 are configured to transmit/receive phone calls. In an embodiment, the customer computing devices 2608 are configured to both transmit/receive text messages and transmit/receive phone calls.

Examples of business computing devices 2606 include, but are not limited to, a mobile computing device, a workstation, and a personal computer. The business computing devices 2606 are configured to be communicatively coupled to the adaptive ad campaign management system 2600. Examples of business establishment computing devices 2610 include, but are not limited to, a mobile computing device, a workstation, and a personal computer. The business establishment computing devices 2610 are configured to be communicatively coupled to the adaptive ad campaign management system 2600. Examples of call center computing devices 2616 include, but are not limited to, a mobile computing device, a workstation, and a personal computer.

The call center computing devices 2616 are configured to be communicatively coupled to the adaptive ad campaign manager 2602. The call center computing devices 2616 are configured to receive phone calls and text messages.

In an embodiment, SMS texts are stored at the SMS server 2612. The adaptive ad campaign manager 2602 retrieves SMS texts from the SMS server 2612 to generate responses for transmission to customer computing devices 2608 in a manner that is described in further detail below. In an embodiment, the SMS server 2612 is a third-party server. In an embodiment the SMS server 2612 is a component of the adaptive ad campaign management system 2600.

The network 2614 may include one or more of the following types of networks. The adaptive ad campaign management system 2600 may be configured to be communicatively coupled to at least one TV network for the purpose of being able to serve televised advertisements to customer computing devices 2608, a PSTN for the purpose of receiving phone calls and sending and receiving SMS messages from customer computing devices 2608 and from third-party SMS servers 2612, and the Internet so as to serve advertisements on social media platforms on a social media server and serve advertisements via email, websites or individual web pages, or through applications, to the customer computing devices 2608.

The manner of the advertisements and data sent from the adaptive ad campaign manager 2604 to the network 2614 may include audio data, visual data such as video or images, textual data, recipient data, regional specifications, and other common data for advertisements in applications, online, over TV, and over email. Advertisements may be sent to, and reached by, the customer computing devices 2608 through the Internet via email, social networks, or internet browsing. The functionality of a TV may be utilized by the customer computing devices 2608 and all functionalities—TV viewership, phone call placement, internet browsing, email viewing, and social network access—may be accomplished by the customer computing devices 2608 over the Internet, or with the Internet and PSTN.

Figure 27:
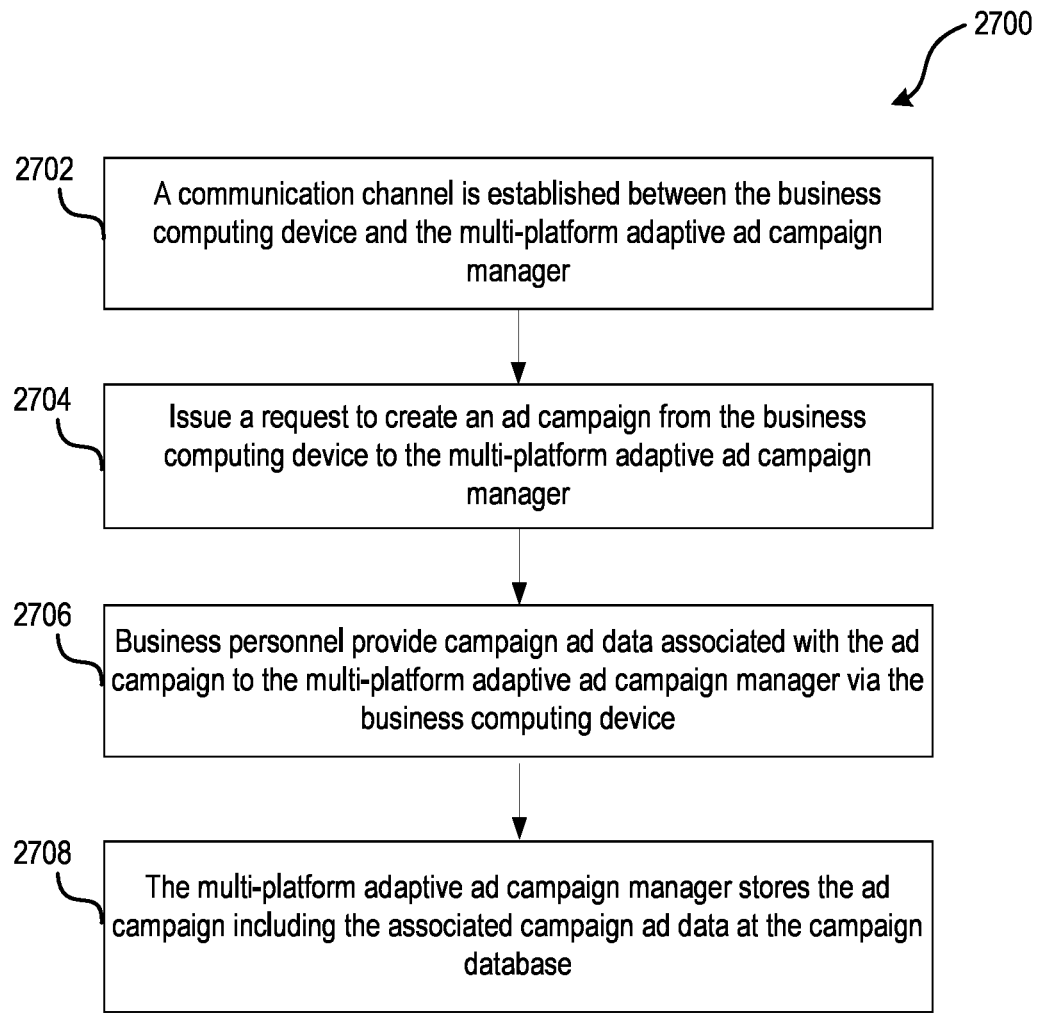
FIG. 27 is a flow chart representation of a method of using an embodiment of an adaptive ad campaign management system to create an ad campaign.

Referring to FIG. 27, a flow chart representation of a method 2700 of using an embodiment of an adaptive ad campaign management system 2600 to create an ad campaign is shown. At 2702 business personnel at a business use the business computing device 2606 to establish a communication channel with the adaptive ad campaign manager 2602. In an embodiment, the business is in the automotive industry. In alternative embodiments, the business may be associated with different industries.

At 2704, the business personnel issues a request to the adaptive ad campaign manager 2602 to create an ad campaign via the business computing device 2606. In an embodiment, the ad campaign is an automotive ad campaign. In alternative embodiments, the ad campaign may be associated with different industries.

The business personnel provide campaign ad data associated with the ad campaign to the adaptive ad campaign manager 2602 via the business computing device 2606 at 2706. The business may have one or more business establishments. The business establishments maintain inventories of the products offered for sale by the business. For example, the automotive industry business may have multiple automobile dealerships.

In an embodiment, the ad campaign data includes one or more of ad campaign details, business establishment specific product inventories, and business establishment specific data. Examples of ad campaign details include, but are not limited to, an ad campaign start date, an ad campaign end date, and ad campaign configuration details. An example of business establishment specific product inventory includes, but is not limited to, identification data associated with specific products available in the product inventory at the business establishment.

In an embodiment, the business establishment is an automobile dealership and the business establishment specific product inventory includes automobile dealership specific product inventory. The automobile dealership specific automobile inventory includes vehicle details pages (VDP) identification data associated with automobiles available for sale at the automobile dealership, vehicle identification data associated with specific automobiles available for sale at the automobile dealership, and VDPs directed to specific types of automobiles available for sale at the automobile dealership. The VDP is an electronic ad for automobiles that includes one or more of the brand of the automobile, advertising slogan(s) associated with the brand of the automobile, sales offers, financing offers, an image of the automobile, and a communication initiator. The function of the communication initiator will be described in greater detail below.

Examples of the business establishment specific data include, but are not limited to, a toll-free number and an email address for the business establishment. In an embodiment, the business establishment is an automobile dealership and the business establishment specific data is automobile dealership specific data. The automobile dealership specific data includes one or more of a toll-free number for the automobile dealership, the email address for the automobile dealership, and the BDC number for the automobile dealership.

At 2708, the adaptive ad campaign manager 2602 stores the ad campaign including the associated ad campaign data at the ad campaign database 2604. In an embodiment, the adaptive ad campaign manager 2602 stores the automotive ad campaign including the associated the automobile ad campaign data at the campaign database 2604.

The adaptive ad campaign manager 2602 manages the ad campaign in accordance with the ad campaign data provided by the business. In an embodiment, the ad campaign data specifies the different media platforms that will be used to broadcast the ad campaign. The adaptive ad campaign manager 2602 is configured to broadcast the ad campaign via a number of different media platforms. Examples of the different media platforms include, but are not limited to, a social media platform, an email platform, televised advertisement platform, and other types of Internet based platforms.

As mentioned above, the ad campaign data for an ad campaign includes a product description page for the advertised product. The adaptive ad campaign manager 2602 is configured to transmit the product description page via one or more of a number of different media platforms for display on one or more customer computing devices 2608. In an embodiment, the ad campaign is an automotive ad campaign and the product description page is a VDP. The product description page includes a communication initiator. A customer is provided with the option of expressing an interest in the product advertised in the product description page by seeking to contact a business establishment that sells the advertised product via the adaptive ad campaign management system 2600 by activating the communication initiator. Upon the activation of the communication initiator by the customer at the customer computing device 2608, the adaptive ad campaign management system 2600 coordinates the engagement between the customer and a business establishment. In an embodiment, the adaptive ad campaign management system 2600 tracks and coordinates the collection of analytics based on interactions between the customer and the business establishment.

In an embodiment, the communication initiator is a call initiator. Upon activation of the call initiator by the customer via the customer computing device 2608, the customer computing device 2608 places a call associated with the product description page to the adaptive ad campaign management system 2600. In an embodiment, the communication initiator is a text message initiator. Upon activation of the text message initiator by the customer via the customer computing device 2608, the customer computing device 2608 sends a text message associate with the product description page to the adaptive ad campaign management system 2600.

Figure 28:
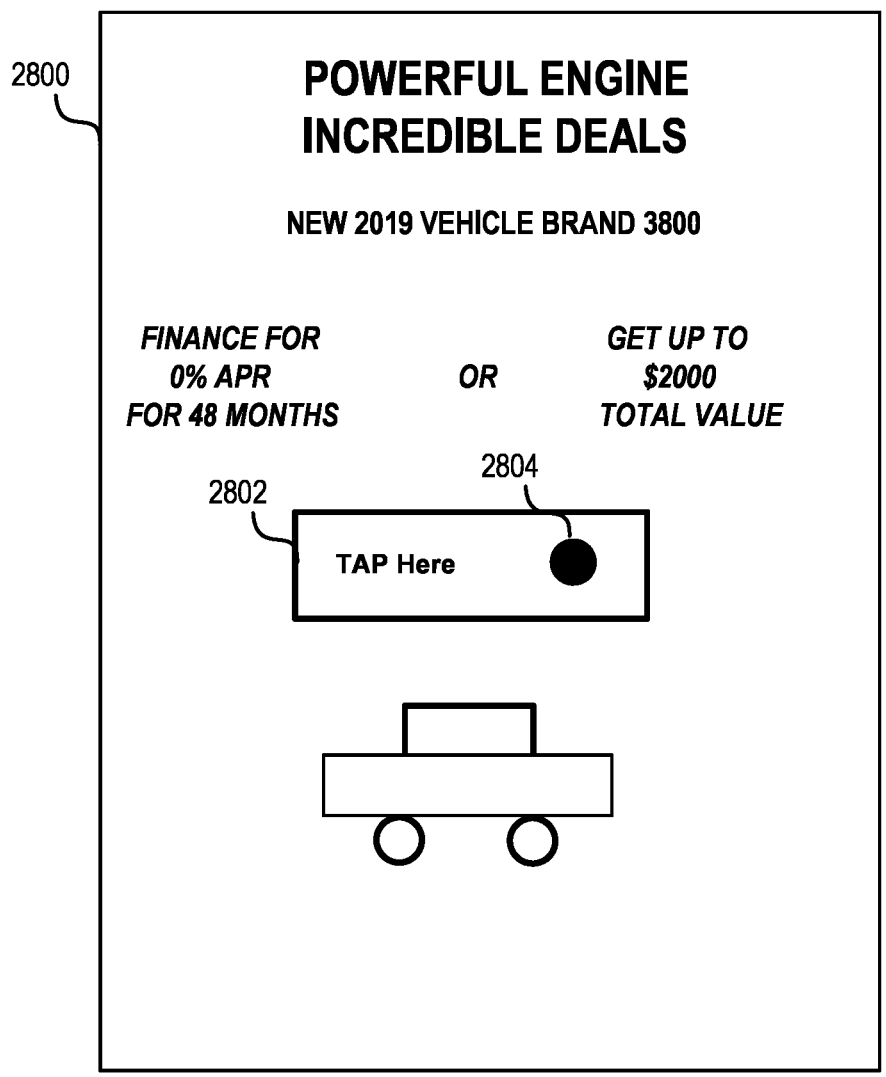
FIG. 28 is an illustration of an example of a Vehicle Details Page ("VDP") generated by an embodiment of an adaptive ad campaign management system for display on a customer computing device including an embodiment of a tap button indicator.

Referring to FIG. 28, an illustration of an example of a VDP 2800 generated by the adaptive ad campaign manager 2602 for display on a customer computing device 2608 including an example of a communication initiator 2802 is shown. The example communication initiator 2802 includes a generic tap button 2804. When the VDP 2800 is displayed on the customer computing device 2608, the customer is provided with the option engaging with a business establishment where the advertised product is available for sale. The customer initiates the process by activating the communication initiator 2802. In the illustrated example, the customer initiates the process by "tapping" on the generic tap button 2804. In an embodiment, upon the activation of the communication initiator 2802, the customer computing device 2608 initiates the process by placing a call to the adaptive ad campaign management system 2600. In an embodiment, upon the activation of the communication initiator 2802, the customer computing device 2608 initiates the process by sending a text message to the adaptive ad campaign management system 2600.

Figure 29:
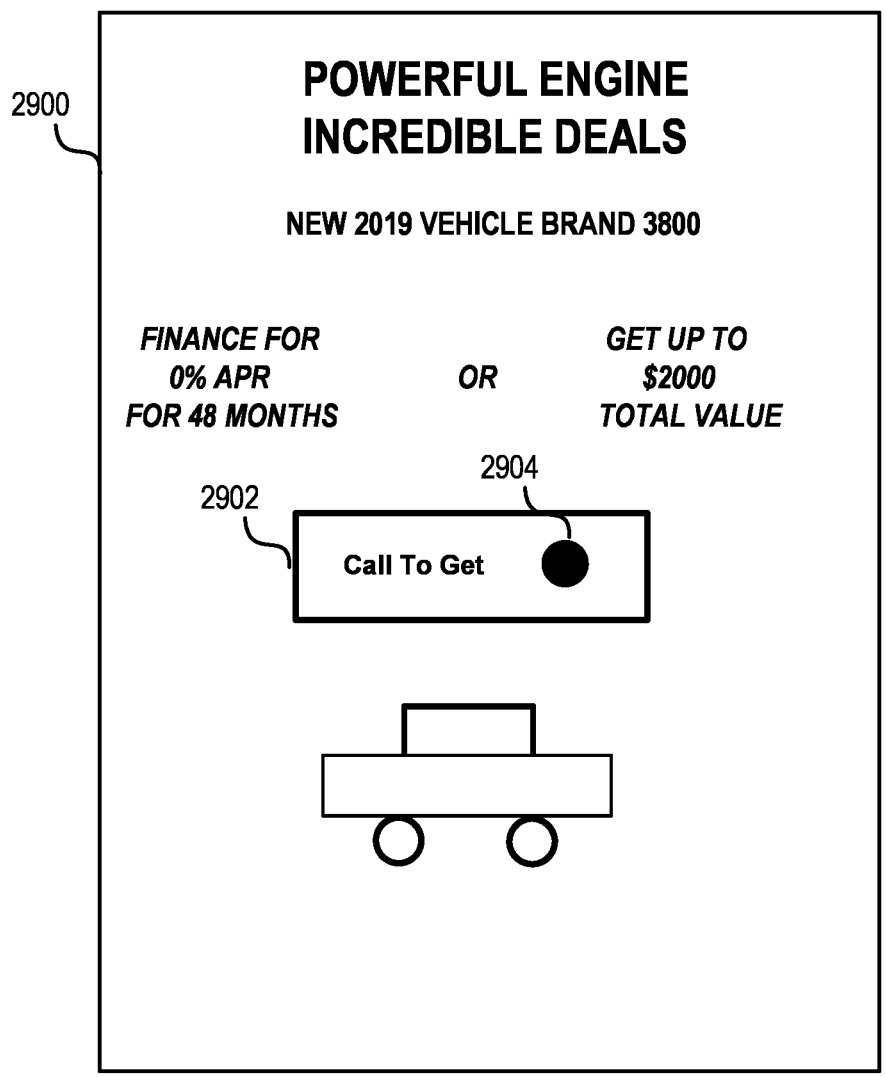
FIG. 29 is an illustration of an example of a VDP generated by an embodiment of an adaptive ad campaign management system for display on a customer computing device including an embodiment of a call initiator.

Referring to FIG. 29, an illustration of an example of a VDP 2900 generated by the adaptive ad campaign manager 2602 for display on a customer computing device 2608 including an example of a communication initiator 2902 is shown. In an embodiment, the communication initiator 2902 is a call initiator. The example communication initiator 2902 includes a call tap button 2904. When the VDP 2900 is displayed on the customer computing device 2608, the customer is provided with the option engaging with a business establishment where the advertised product is available for sale. The customer initiates the process by activating the communication initiator 2902. In the illustrated example, the customer initiates the process by "tapping" on the call tap button 2904. Upon the activation of the communication initiator 2902, the customer computing device 2608 initiates the process by placing a call to the adaptive ad campaign management system 2600.

Figure 30:
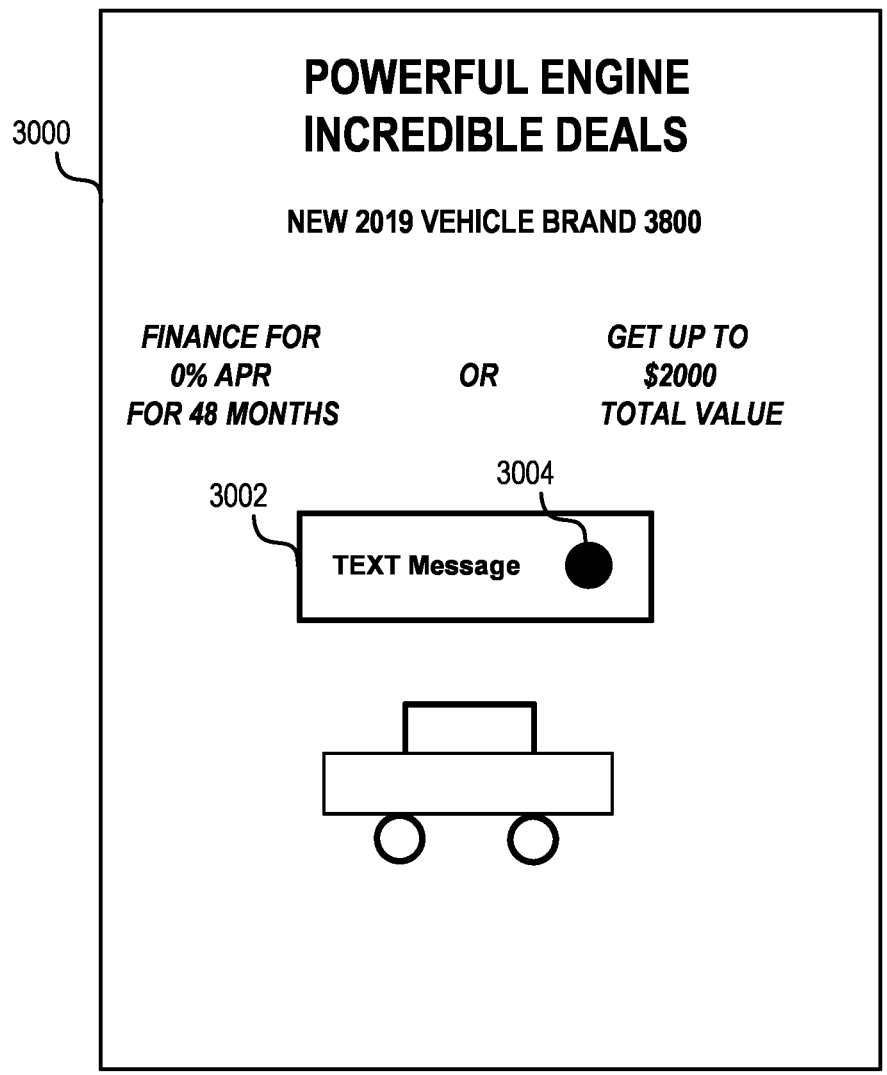
FIG. 30 is an illustration of an example of a VDP generated by an embodiment of an adaptive ad campaign management system for display on a customer computing device including an embodiment of a text message initiator.

Referring to FIG. 30, an illustration of an example of a VDP 3000 generated by the adaptive ad campaign manager 2602 for display on a customer computing device 2608 including an example of a communication initiator 3002 is shown. In an embodiment, the communication initiator 3002 is a text message initiator. The example communication initiator 3002 includes a text message tap button 3004. When the VDP 3000 is displayed on the customer computing device 2608, the customer is provided with the option engaging with a business establishment where the advertised product is available for sale. The customer initiates the process by activating the communication initiator 3002. In the illustrated example, the customer initiates the process by "tapping" on the text message tap button 3004. Upon the activation of the communication initiator 3002, the customer computing device 2608 initiates the process by sending a text message to the adaptive ad campaign management system 2600.

In an embodiment, the product description page includes a communication initiator that through cycles through a generic tap button 2802, a call tap button 2902, and a text message tap button 3003. In this embodiment, the display of the generic tap button 2802 identifies the existence of a tap button. When the call tap button 2904 is displayed, "tapping" on the call tap button 2904 causes the customer computing device 2608 to place a call to the adaptive ad campaign management system 2600. When the text message tap button is displayed, "tapping" on the text message tap button 2904 causes the customer computing device 2608 to transmit a text message to the adaptive ad campaign management system 2600. In an embodiment, the generic tap button 2804, the call tap button 2904, and the text message tap button 3004 are sequentially displayed for a pre-defined period of time.

In an embodiment, the product description page included a communication initiator that through cycles through a call tap button 2902, and a text message tap button 3003. When the call tap button 2904 is displayed, the "tapping" on the call tap button 2904 causes the customer computing device 2608 to place a call to the adaptive ad campaign management system 2600. When the text message tap button is displayed, the "tapping" on the text message tap button 2904 causes the customer computing device 2608 to transmit a text message to the adaptive ad campaign management system 2600. In an embodiment, the call tap button 2904, and the text message tap button 3004 are each displayed for a pre-defined period of time.

In an embodiment, the call tap button 2904, and the text message tap button 3004 are simultaneously displayed in different areas of a product description page. While the generic tap button 2804, the call tap call button 2904, and the text message tap button 3002 have been illustrated as spherical buttons, one or more of the generic tap button 2804, the call tap button 2904, and the text message tap button 3002 may have a different shape.

Figure 31:
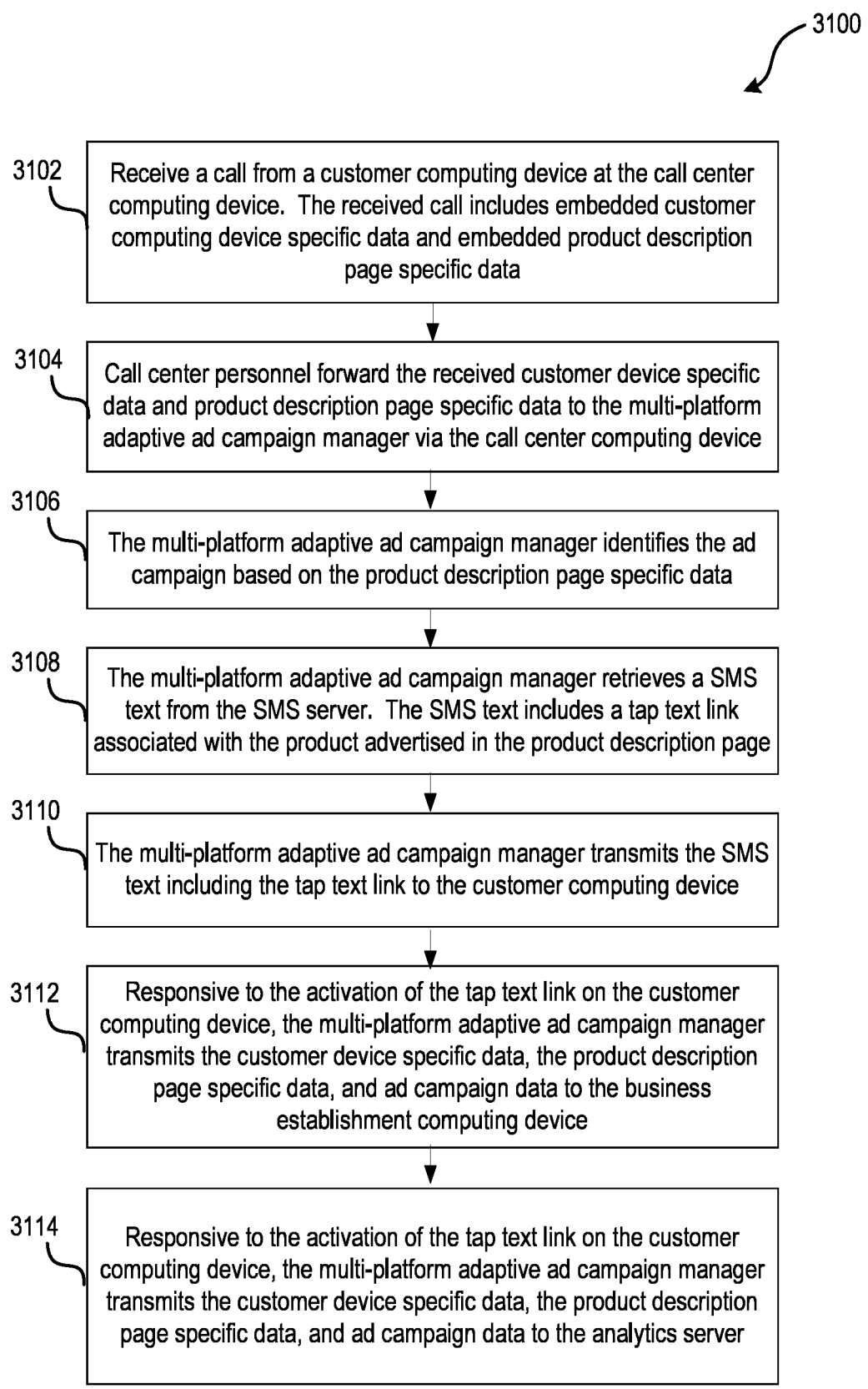
FIG. 31 is a flow chart representation of an example of a method of responding to an activation of a call initiator on a product description page displayed on a customer computing device using an embodiment of an adaptive ad campaign management system.

FIG. 31 is a flow chart representation of an example of a method 3100 of responding to an activation of a call initiator on a product description page at a customer computing device 2608 using an embodiment of an adaptive ad campaign management system 2600. The adaptive ad campaign management system 2600 transmits the product description page for display on one or more customer computing devices 2608 via one of the platforms designated by the business. In an embodiment, the product description page includes a call initiator. If the customer wishes to obtain additional information regarding a product advertised on the product description page displayed on the customer computing device 2608, the customer activates the call initiator. In an embodiment, the call initiator is a call tap button 2902 and the customer taps the call tap button to activate the call initiator. In an embodiment, the product description page is a VDP for an automobile.

The customer computing device 2608 responds to the activation of the call initiator by placing a call from the customer computing device 2608 to the adaptive ad campaign management system 2600. In an embodiment, the call is received at a call center computing device 2616 at a call center. In an embodiment, the call center computing device 2616 is a component of the adaptive ad campaign management system 2600. In an embodiment, the call center computing device 2616 is external to the adaptive ad campaign management system 2600.

At 3102, the call placed by the customer computing device 2608 is received at the call center computing device 2616. The received call includes embedded customer computing device specific data and product description page specific data. An example of the customer computing device specific data is a customer computing device phone number. Examples of the product description specific data include, but are not limited to, a product description page identifier identifying the product description page displayed on the customer computing device 2608 and a product description page link associated with the displayed product description page.

In an embodiment, the product description page specific data is VDP specific data associated with a VDP displayed on the customer computing device 2608. Examples of the VDP specific data include, but are not limited to, a VDP identifier identifying the VDP displayed on the customer computing device 2608 and a VDP link associated with the displayed VDP.

At 3104, call center personnel forward the received customer computing device specific data and product description page specific data to the adaptive ad campaign manager 2602 via the call center computing device 2616. In an embodiment, call center personnel forward the received customer computing device specific data and the VDP specific data to the adaptive ad campaign manager 2602 via the call center computing device 2616.

At 3106, the adaptive ad campaign manager 2602 identifies the ad campaign based on the received product description page specific data. In an embodiment, the adaptive ad campaign manager 2602 identifies the automotive campaign ad based on the received VDP specific data.

At 3108, the adaptive ad campaign manager 2602 retrieves a SMS text from the SMS server 2612. In an embodiment, a tap text link associated with the product advertised in the product description page is included the SMS text. In an embodiment, the adaptive ad campaign manager 2602 adds the tap text link to the retrieved SMS text. At 3110, the adaptive ad campaign manager 2602 transmits the SMS text including the tap text link to the customer computing device 2608.

The SMS text message including the tap text link is received at the customer computing device 2608. Clicking on the tap text link enables a customer to complete a CTA associated with the product advertised on the product description page. Examples of CTA include, but are not limited to, engage in a transaction associated with the product advertised on the product description page and view a website associated with the product advertised on the product description page. In an embodiment, by clicking on the tap text link, the customer consents to allow the adaptive ad campaign management system 2600 to track and collect customer action data associated with the advertised product for analytics. In an embodiment, the customer is provided with an option to disable the tracking feature.

At 3112, responsive to the activation of the tap text link, the adaptive ad campaign manager 2602 transmits the customer computing device specific data, the product description page specific data, and ad campaign data to a business establishment computing device 2610 associated with a business establishment that is suited to enable the customer to purchase the advertised product. In an embodiment, the adaptive ad campaign manager 2602 identifies one or more of the city, state, and zip code associated with the customer based on the customer computing device specific data and transmits the identified one or more of the city, state, and zip code associated with the customer to the business establishment computing device 2610. The business establishment may use the received customer computing device specific data to contact the customer to discuss a potential sale of the advertised product with the customer. In an embodiment, the advertised product is an automobile and the business establishment is a automobile dealership.

At 3114, responsive to the activation of the tap text link, the adaptive ad campaign manager 2602 transmits the customer computing device specific data, product description page specific data, the ad campaign data, and all tracked customer actions to the analytics server thereby enabling the collection and analysis of ad campaign specific data.

Figure 32:
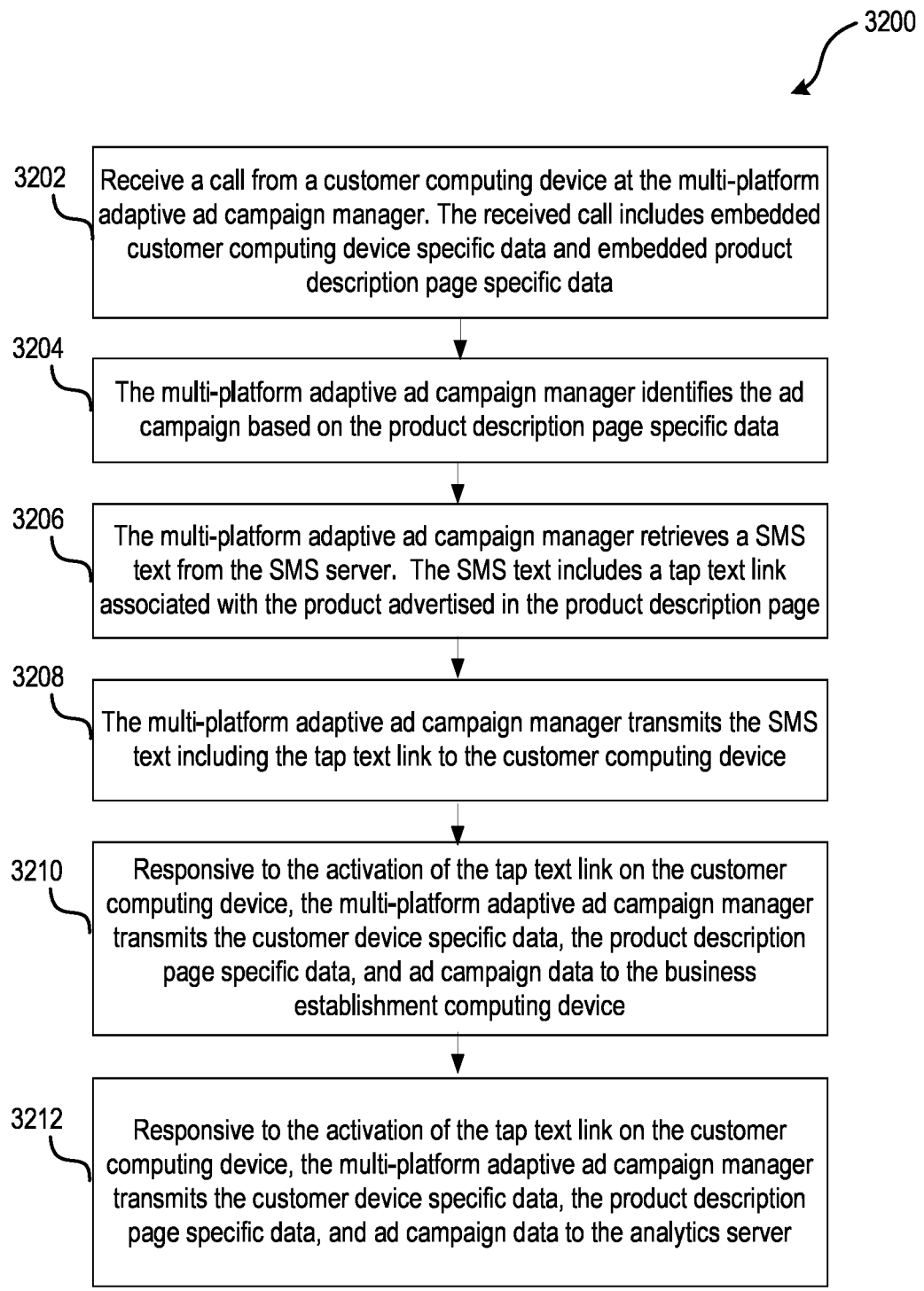
FIG. 32 is a flow chart representation of an example of a method of responding to an activation of a call initiator on product description page displayed on a customer computing device using an embodiment of an adaptive ad campaign management system.

Referring to FIG. 32, a flow chart representation of an example of a method 3200 of responding to an activation of a call initiator on product description page displayed on a customer computing device 2608 using an embodiment of an adaptive ad campaign management system 2600 is shown. The adaptive ad campaign management system 2600 transmits the product description page for display on one or more customer computing devices 2608 via one of the platforms designated by the business. In an embodiment, the product description page includes a call initiator. If the customer wishes to obtain additional information regarding a product advertised on the product description page displayed on the customer computing device 2608, the customer activates the call initiator. In an embodiment, the call initiator is a call tap button 2902 and the customer taps the call tap button to activate the call initiator. In an embodiment, the product description page is a VDP for an automobile.

The customer computing device 2608 responds to the activation of the call initiator by placing a call from the customer computing device 2608 to the adaptive ad campaign management system 2600. At 3202, the call placed by the customer computing device 2608 is received by adaptive ad campaign manager 2602. The received call includes embedded customer computing device specific data and product description page specific data. An example of the customer computing device specific data is a customer computing device phone number. Examples of the product description specific data include, but are not limited to, a product description page identifier identifying the product description page displayed on the customer computing device 2608 and a product description page link associated with the displayed product description page.

In an embodiment, the product description page specific data is VDP specific data associated with a VDP displayed on the customer computing device 2608. Examples of the VDP specific data include, but are not limited to, a VDP identifier identifying the VDP displayed on the customer computing device 2608 and a VDP link associated with the displayed VDP.

At 3204, the adaptive ad campaign manager 2602 identifies the ad campaign based on the received product description page specific data. In an embodiment, the adaptive ad campaign manager 2602 identifies the automotive campaign ad based on the received VDP specific data.

At 3206, the adaptive ad campaign manager 2602 retrieves a SMS text from the SMS server 2612. In an embodiment, a tap text link associated with the product advertised in the product description page is included in the SMS text. In an embodiment, the adaptive ad campaign manager 2602 adds the tap text link to the retrieved SMS text. At 3208, the adaptive ad campaign manager 2602 transmits the SMS text including the tap text link to the customer computing device 2608.

The SMS text message including the tap text link is received at the customer computing device 2608. Clicking on the tap text link enables a customer to complete a CTA associated with the product advertised on the product description page. Examples of CTA include, but are not limited to, engage in a transaction associated with the product advertised on the product description page and view a website associated with the product advertised on the product description page. In an embodiment, by clicking on the tap text link, the customer consents to allow the adaptive ad campaign management system 2600 to track and collect customer action data associated with the advertised product for analytics. In an embodiment, the customer is provided with an option to disable the tracking feature.

At 3210, responsive to the activation of the tap text link, the adaptive ad campaign manager 2602 transmits the customer computing device specific data, the product description page specific data, and ad campaign data to a business establishment computing device 2610 associated with a business establishment that is suited to enable the customer to purchase the advertised product. In an embodiment, the adaptive ad campaign manager 2602 identifies one or more of the city, state, and zip code associated with the customer based on the customer computing device specific data and transmits the identified one or more of the city, state, and zip code associated with the customer to the business establishment computing device 2610. The business establishment may use the received customer computing device specific data to contact the customer to discuss a potential sale of the advertised product with the customer. In an embodiment, the advertised product is an automobile and the business establishment is a automobile dealership.

At 3212, responsive to the activation of the tap text link, the adaptive ad campaign manager 2602 transmits the customer computing device specific data, product description page specific data, the ad campaign data, and all tracked customer actions to the analytics server thereby enabling the collection and analysis of ad campaign specific data.

Figure 33:
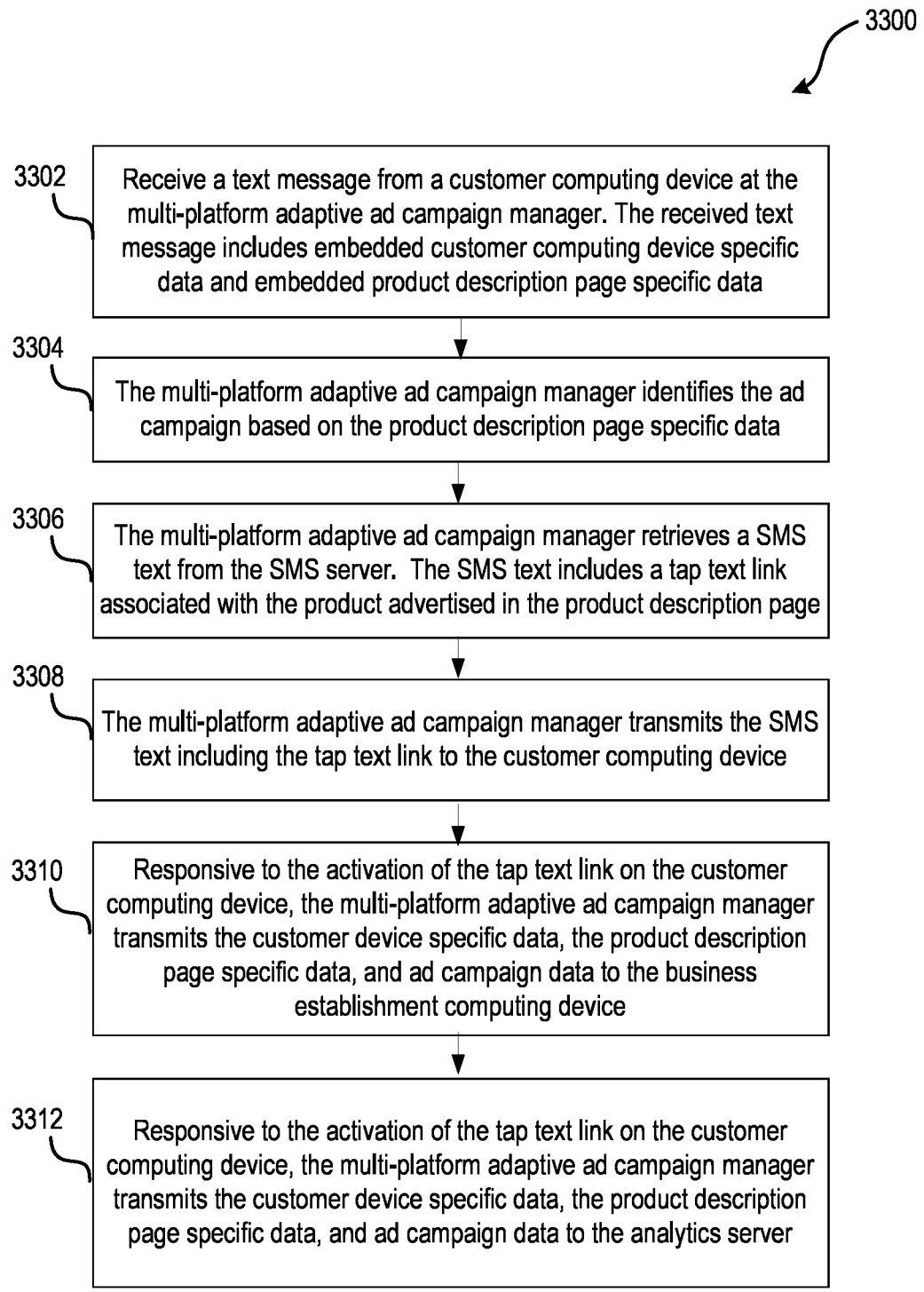
FIG. 33 is a flow chart representation of an example of a method of responding to an activation of a text message initiator on a product description page displayed on a customer computing device using an embodiment of an adaptive ad campaign management system.

Referring to FIG. 33 is a flow chart representation of an example of a method 3300 of responding to an activation of a text message initiator 3002 on a product description page displayed on a customer computing device 2608 using an embodiment of an adaptive ad campaign management system 2600 is shown. The adaptive ad campaign management system 2600 transmits the product description page for display on one or more customer computing devices 2608 via one of the platforms designated by the business. In an embodiment, the product description page includes a text message initiator 3002. If the customer wishes to obtain additional information regarding a product advertised on the product description page displayed on the customer computing device 2608, the customer activates the text message initiator 3002. In an embodiment, the text message initiator 3002 is a text message tap button 3004 and the customer taps the text message tap button 3004 to activate the text message initiator 3002. In an embodiment, the product description page is a VDP for an automobile.

The customer computing device 2608 responds to the activation of the text message initiator by transmitting a text message from the customer computing device 2608 to the adaptive ad campaign management system 2600. At 3302, the text message transmitted by the customer computing device 2608 is received by adaptive ad campaign manager 2602. The received text message includes embedded customer computing device specific data and product description page specific data. An example of the customer computing device specific data is a customer computing device phone number. Examples of the product description specific data include, but are not limited to, a product description page identifier identifying the product description page displayed on the customer computing device 2608 and a product description page link associated with the displayed product description page.

In an embodiment, the product description page specific data is VDP specific data associated with a VDP displayed on the customer computing device 2608. Examples of the VDP specific data include, but are not limited to, a VDP identifier identifying the VDP displayed on the customer computing device 2608 and a VDP link associated with the displayed VDP.

At 3304, the adaptive ad campaign manager 2602 identifies the ad campaign based on the received product description page specific data. In an embodiment, the adaptive ad campaign manager 2602 identifies the automotive campaign ad based on the received VDP specific data.

At 3306, the adaptive ad campaign manager 2602 retrieves a SMS text from the SMS server 2612. In an embodiment, a tap text link associated with the product advertised in the product description page is included the SMS text. In an embodiment, the adaptive ad campaign manager 2602 adds the tap text link to the retrieved SMS text. At 3308, the adaptive ad campaign manager 2602 transmits the SMS text including the tap text link to the customer computing device 2608.

The SMS text message including the tap text link is received at the customer computing device 2608. Clicking on the tap text link enables a customer to complete a CTA associated with the product advertised on the product description page. Examples of CTA include, but are not limited to, engage in a transaction associated with the product advertised on the product description page and view a website associated with the product advertised on the product description page. In an embodiment, by clicking on the tap text link, the customer consents to allow the adaptive ad campaign management system 2600 to track and collect customer action data associated with the advertised product for analytics. In an embodiment, the customer is provided with an option to disable the tracking feature.

At 3310, responsive to the activation of the tap text link, the adaptive ad campaign manager 2602 transmits the customer computing device specific data, the product description page specific data, and ad campaign data to a business establishment computing device 2610 associated with a business establishment that is suited to enable the customer to purchase the advertised product. In an embodiment, the adaptive ad campaign manager 2602 identifies one or more of the city, state, and zip code associated with the customer based on the customer computing device specific data and transmits the identified one or more of the city, state, and zip code associated with the customer to the business establishment computing device 2610. The business establishment may use the received customer computing device specific data to contact the customer to discuss a potential sale of the advertised product with the customer. In an embodiment, the advertised product is an automobile and the business establishment is a automobile dealership.

At 3312, responsive to the activation of the tap text link, the adaptive ad campaign manager 2602 transmits the customer computing device specific data, product description page specific data, the ad campaign data, and all tracked customer actions to the analytics server thereby enabling the collection and analysis of ad campaign specific data.

Figure 34:
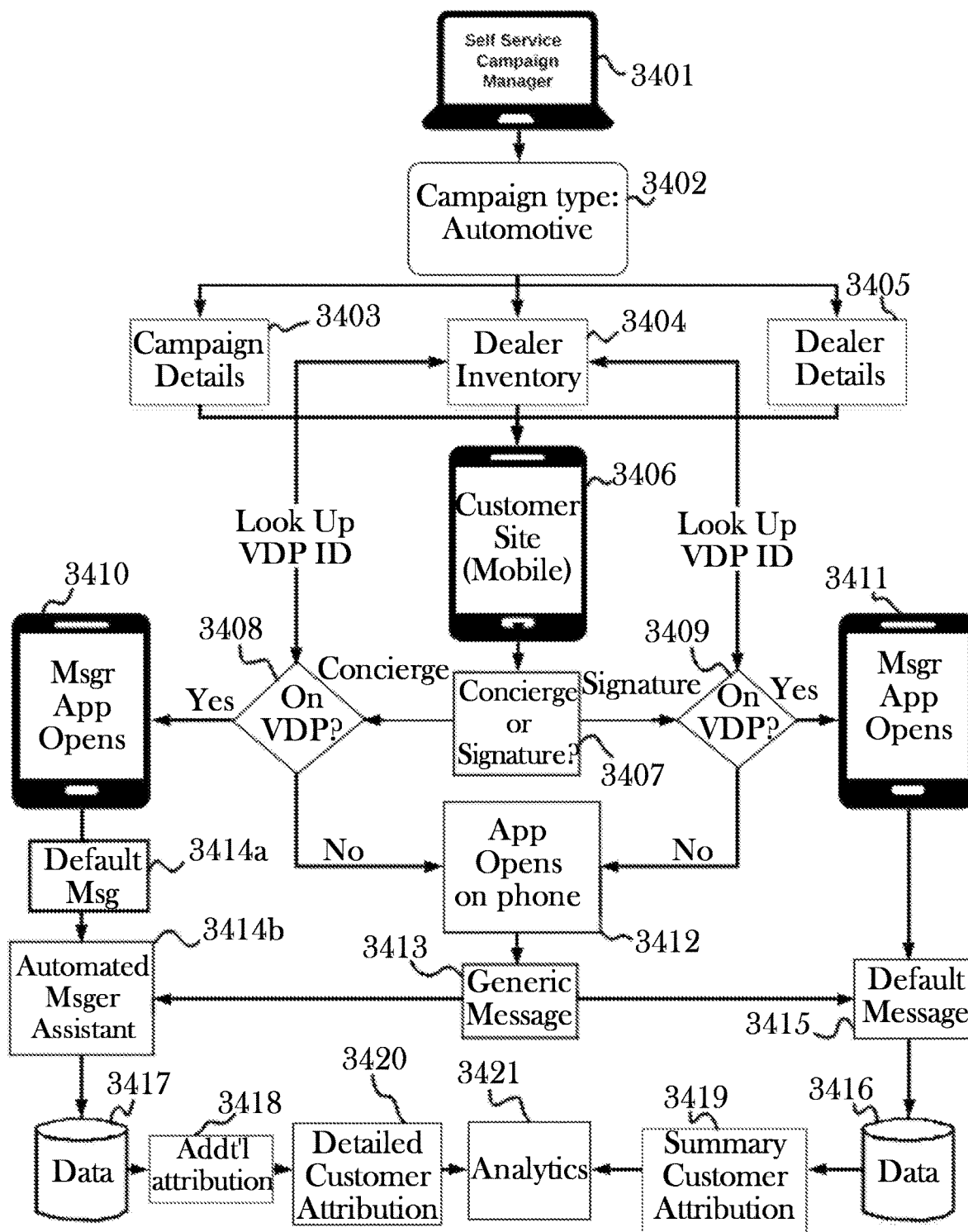
FIG. 34 is a flow chart illustrating the use of an automotive ad campaign being utilized for both generic and highly tailored, user-specific interactions, while generating deep analytics of ad interactivity, according to an embodiment.

FIG. 34 is a flow chart illustrating the use of an automotive ad campaign being utilized for both generic and highly tailored, user-specific interactions, while generating deep analytics of ad interactivity, according to an embodiment.

A campaign manager 3401 as shown is an ad campaign manager as described in various embodiments, where the campaign manager is capable of receiving user input and communicating with at least one network to distribute created ad campaigns to websites or other platforms, and interact with users across networks. In this embodiment, an ad campaign type is specified, in this embodiment as an automotive campaign 3402, which may specify to the system what manner of ads, analytics, and usage it will have, which may be of varying importance depending on system configuration. An ad campaign type does not necessarily have to be specified for the system to operate properly, and may only be utilized in some cases for labelling a campaign for other human users, such as administrators, to understand the analytics and underlying ads being generated. The campaign details 3403 may be specified as well from a campaign manager 3401, along with dealer inventory 3404, and dealer details 3405, for a specific dealer of an automotive product such as a car or truck. These details may be manually input into the system from a campaign manager 3401, or dynamically set, for instance from a call to a database. A customer's mobile website may then be viewed 3406, the operation of which in a specified ad campaign may be different depending on whether it is a "concierge" website or a "signature" website 3407, referring to a website that provides for a messenger assistant 3414*b* for "concierge" websites, or a "signature" website which merely provides for basic information filled from a datastore but does not provide a customized experience with a messenger assistant 3414*b*. In either case, a determination is made as to whether or not a user is on a Vehicle Details Page ("VDP") 3408, 3409, and if a user is not on such a page to view a product's description, a text messenger app is opened on the user's phone 3412, to display a generic message to the user 3413, while if the user is indeed on a VDP, their messenger app opens 3410, 3411 and they are given a more specific message 3414*a*, 3415 regarding the vehicle details, based in part on a lookup of the vehicle's ID in the dealer inventory 3404. It is useful to note that the text messaging applications may be opened due to receiving an internet-initiated SMS text message directed at the user, for instance through the open standard Internet Engineering Task Force ("IETF") RFC 5724, "URI Scheme for Global System for Mobile Communications (GSM) Short Message Service (SMS)." As such, the interaction between a user and the advertisement campaign as shown, may take them form of them merely seeing an advertisement on the mobile website, tapping or clicking it, and the SMS being sent to them, initiating interactions. A user who was not initially on the VDP and was given a generic message 3413 rather than a default informational message 3414*a*, 3415, may be given a more specific message 3415 or may be referred to a messenger assistant 3414*b* for further customization and use with a chatbot or similar system. In either case, the default message 3415 or messenger assistant 3414*b* then may store data 3416, 3417 including customer interactions, any messenger assistant interactions, customer purchases or referrals, location or phone number data, or other relevant data, in datastores, before allowing either a summary customer attribution 3419 in the case of a non-concierge or limited website use, or additional third-party attributions 3418 as well as a more detailed customer attribution if available 3420, to be used for compiling the completed analytics 3421 of the advertisement interactions. Third party attributions 3418 may include attribution of interactions and results regarding the messenger assistant, or any related or referred products or links, during the course of advertisement interaction. Customer attributions may include identifying information about the customer and their selections, as much as permitted by law and desired in the configuration of the system. By contrast, a summary customer attribution 3419 may be a similar attribution but with less or an equivalent amount of interaction and identifying data, without third-party attribution data, due to a smaller amount of interaction.

Figure 35:
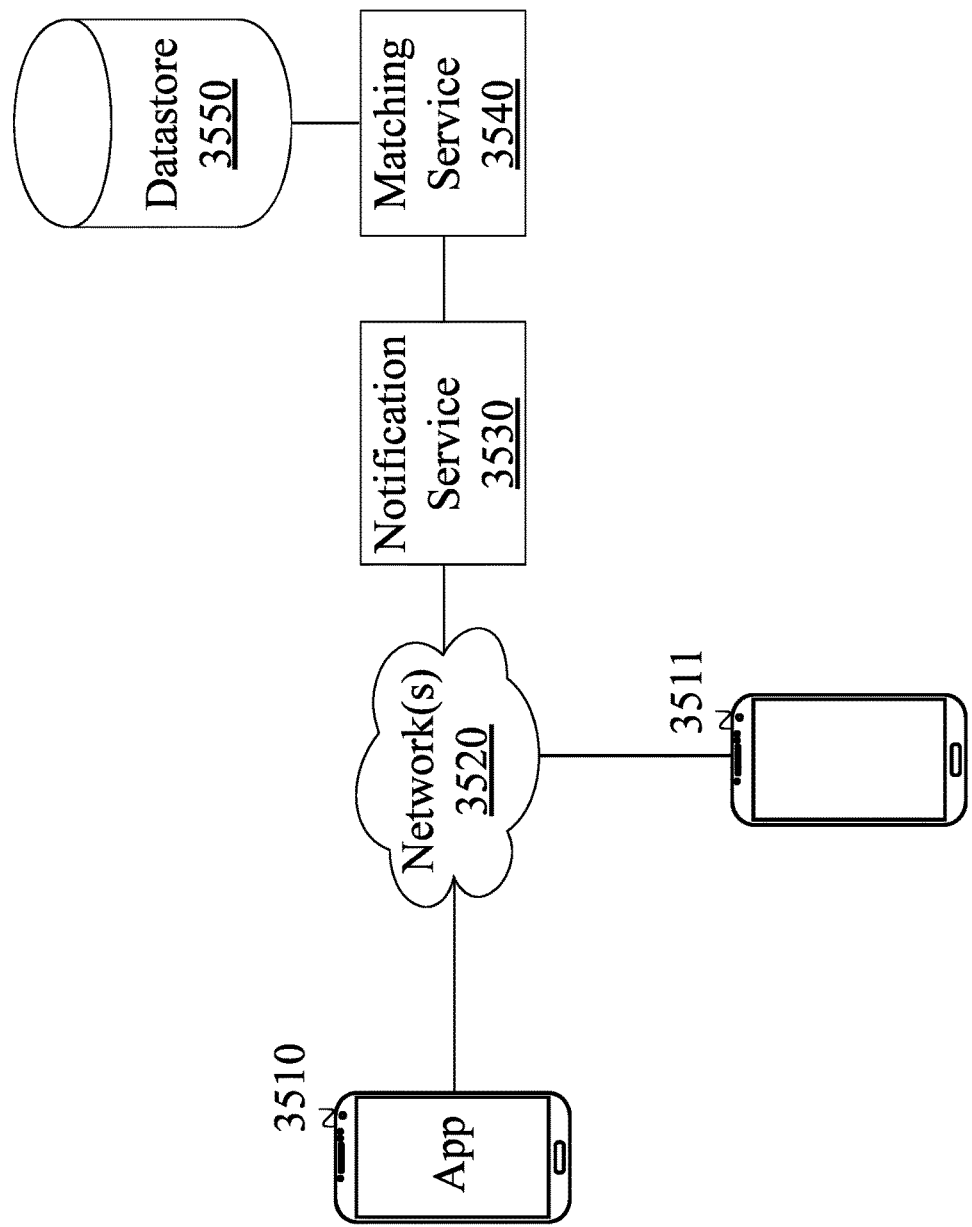
FIG. 35 is a diagram of a system for adaptive advertisement within a mobile application, according to an embodiment.

FIG. 35 is a diagram of a system for adaptive advertisement within a mobile application, according to an embodiment. A user mobile device with a communications and advertising application 3510 exists which may be used by a consumer while connected to a network or multiple networks 3520, such as but not limited to the Internet or a Cellular Network, and which may be a smartphone or other manner of mobile device such as a tablet, or personal computing device. The operating system of such a device may range from such software as ANDROID™, IOS™, WINDOWS™, LINUX™, or others, and a second mobile device 3511 may also operate on at least one of the same networks 3520 as the first mobile device 3510, and may be communicated with over that network or networks 3520 by the first mobile device and application 3510. The application running on a first mobile device 3510 may communicate over the network or networks 3520, such as with the TCP/IP protocol, with a notification service 3530 that manages both incoming and outgoing data to the application, for the purpose of sending notifications such as PUSH notifications to the user, while also allowing a user to input and edit their own data for a matching service 3540, the data being stored in a datastore 3550. The services 3530, 3540 and datastore 3550 may be stored on the same server device, or on some combination of separate or interconnected devices, the specific configuration of which is not limiting to the invention. A matching service 3540 may be used to match a user's inserted preferences and data with stored 3550 data from companies that wish to advertise to such users, for instance it may match a user who has very open preferences for any companies offering advertised deals within a 20 mile radius, in which case the user may get notifications of such offers within his specified distance, from the matching service 3540. If a match is made, the notification service 3530 is used to notify the user and allow them to perform an action based on the notification, within the application.

Figure 36:
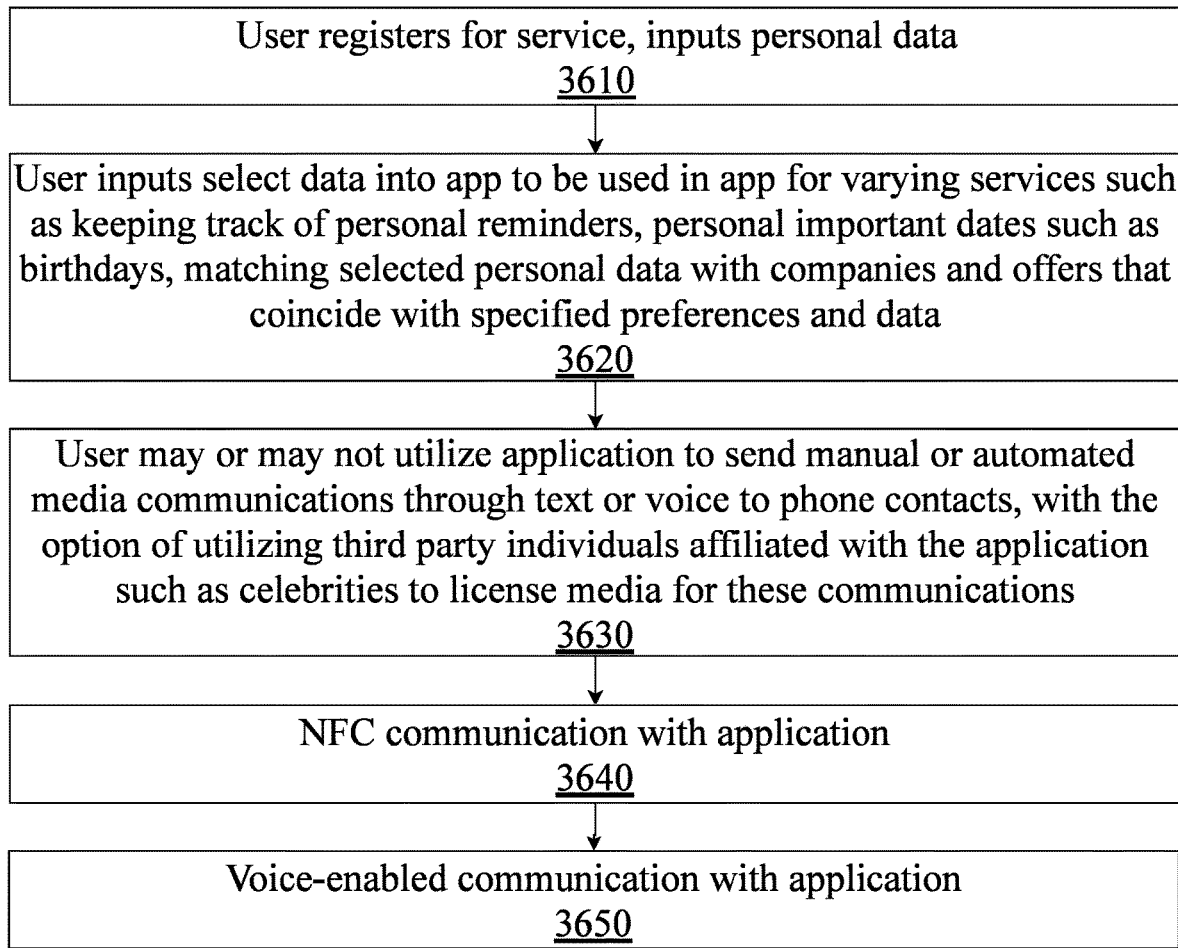
FIG. 36 is a method diagram for a system of adaptive advertisement within a mobile application, according to an embodiment.

FIG. 36 is a method diagram for a system of adaptive advertisement within a mobile application, according to an embodiment. First a user may register with a communications and advertisement application for service, and input their personal data 3610. Personal data may include fields such as date of birth, name, location, gender or sex, sexual orientation, income, or any other data as needed by the communications and advertisement integration application. After a user registers and enters their selected data, a user may input further select data into the application to be used for varying services such as keeping track of personal reminders, keeping track of important dates such as birthdays of loved ones, and matching select personal data with companies and offers that coincide with specified preferences and data 3620, for instance through a variety of menu options, text fields, and more. A user may or may not then utilize the application to send manual or automated media communications through text or voice to phone contacts, with the option of utilizing third party individuals affiliated with the application such as celebrities to license media for these communications 3630. For instance, after a user has registered and entered relevant personal data into the application, they may specify that automated "happy birthday" messages should be sent to their relatives as specified in the application, and may even include an option for third parties such as celebrities or noteworthy figures to send pre-recorded birthday messages, as part of the message sent to the user's relatives. Such third party individuals may require payment, may be part of a subscription package in the application, and may even be other relatives or a self-recorded audio file, rather than a third party individual. NFC communications mentioned earlier may integrate with the application 3640 for the purposes of allowing NFC-enabled products or tags to trigger an offer from an advertiser or seller to appear on a customer's application. Voice-enabled communications with the application 3650 may also be enabled by a user so that they may replace traditional user interface interactivity with voice commands, such as instructing the application, "send happy birthday message to my Aunt Patrice," or some other voice command. Communications sent from a mobile device operating such an application may be received by a recipient device without such an application, and may be received as emails, text SMS messages, phone calls or messages, or other communications methods, techniques and services that may be or may become common in mobile device communications.

Figure 37:
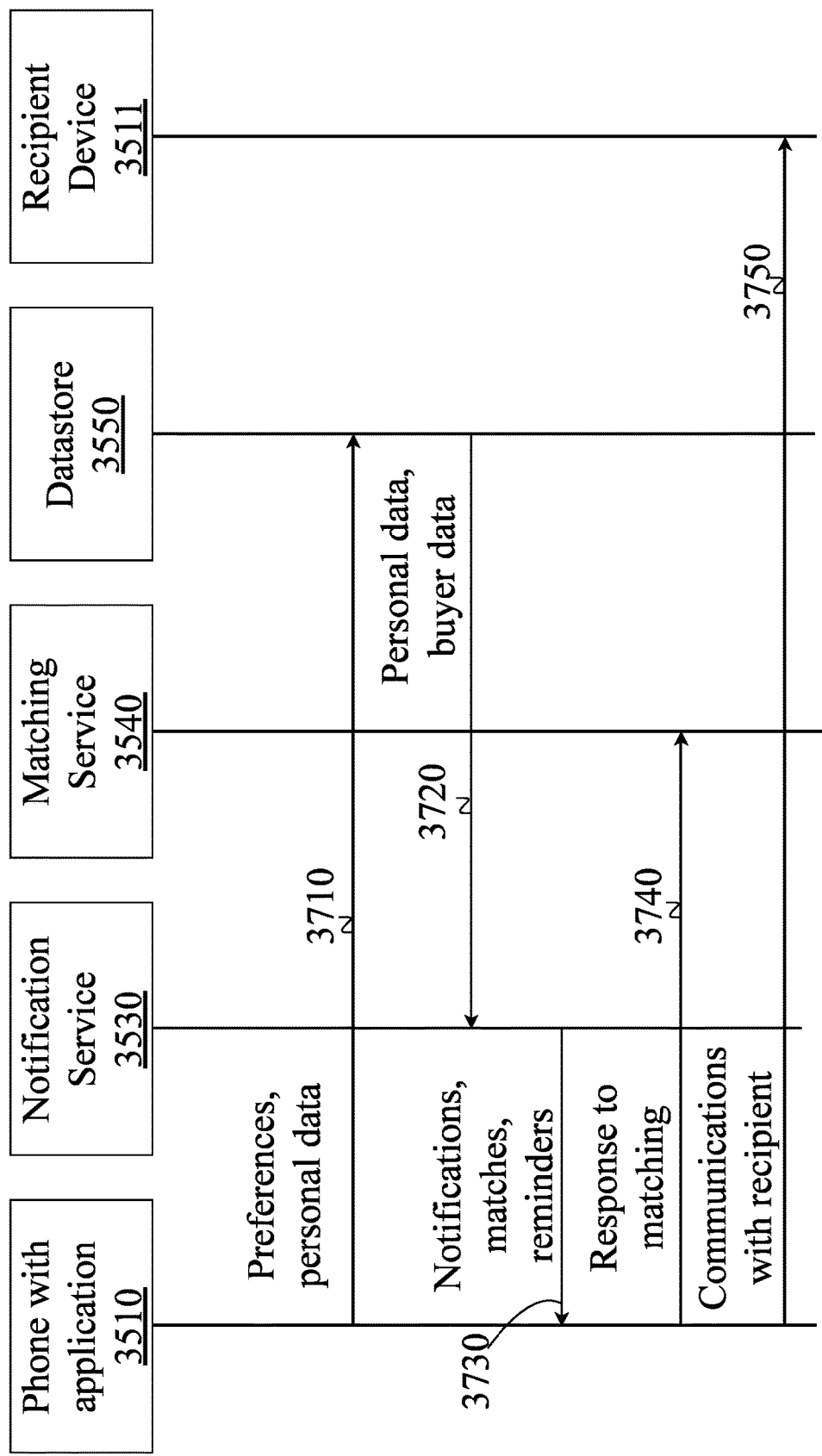
FIG. 37 is a message flow diagram for a system of adaptive advertisement within a mobile application, according to an embodiment.

FIG. 37 is a message flow diagram for a system of adaptive advertisement within a mobile application, according to an embodiment. The devices or services receiving or sending messages in the diagram are a phone with an integrated advertisement and communication application 3510, a notification service 3530, a matching service 3540, a datastore 3550, and a recipient device 3511. A user of a user mobile device running an integrated advertisement and communication application 3510 may send their preferences and personal data to a datastore 3550, 3710, allowing a notification service 3530 to poll this data and receive the customer's data as well as the data from companies that may wish to match with the consumer 3720. The notification service 3530 then informs the user via the application 3510 of any notifications, matches, or reminders that are scheduled 3730, at which point a user may interact with the notifications and respond to them 3740 which is sent to the matching service 3540, or the user may initiate communications with a second recipient mobile device 3511, 3750.

Figure 38:
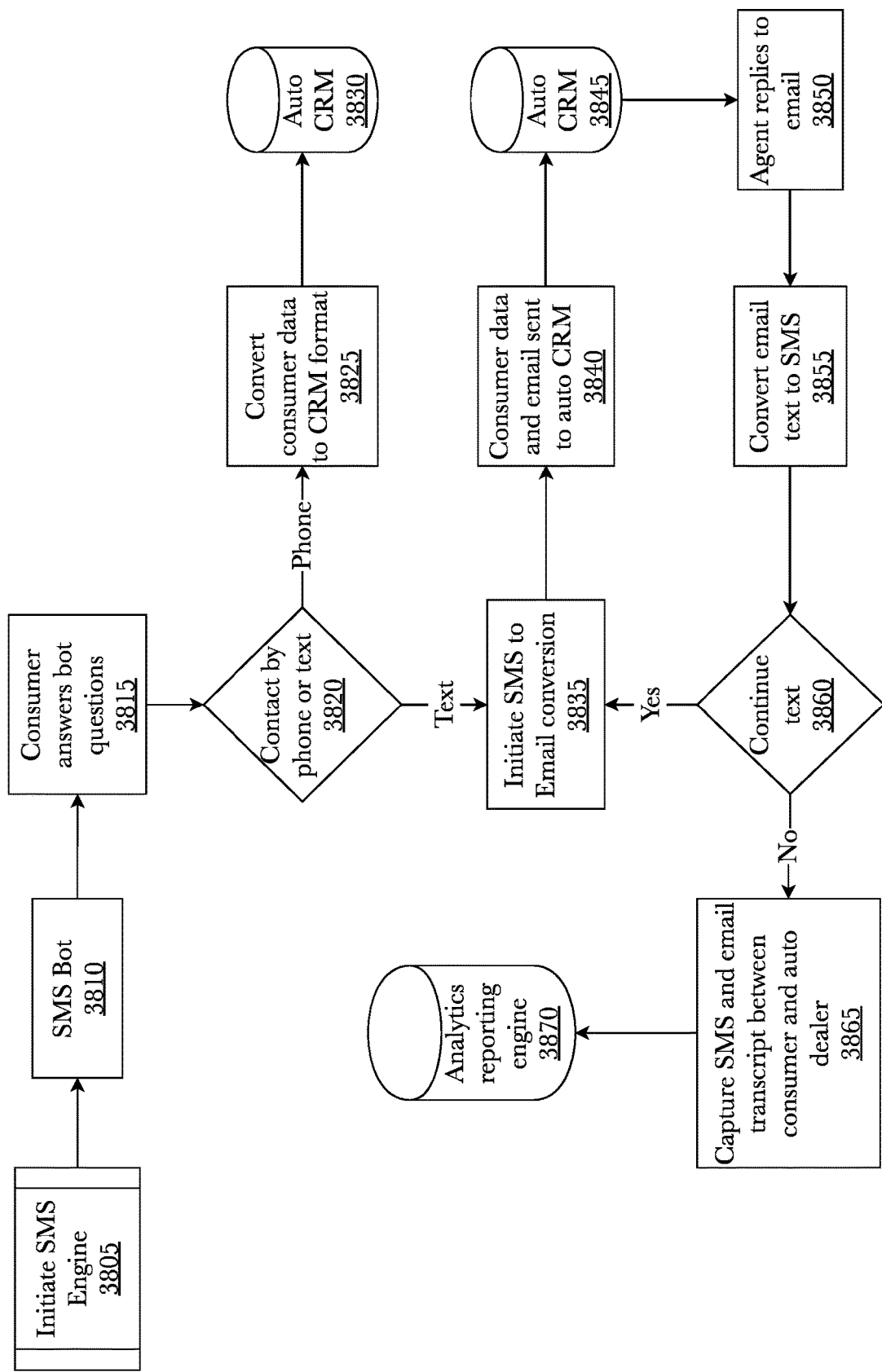
FIG. 38 is a flowchart showing an exemplary conversion of SMS, voice, and email data, for an exemplary automotive dealer interaction.

FIG. 38 is a flowchart showing an exemplary conversion of SMS, voice, and email data, for an exemplary automotive dealer interaction. First, an SMS engine from an advertisement integration application is initiated 3805 that may include an SMS bot 3810, which may pose consumer questions 3815. Query and response may include personal information questions, preferences, or settings for the application or for an instant communication. For example, if a merchant or advertiser wishes to contact a consumer; or if the consumer has indicated they wish to be contacted by a merchant. A consumer may answer whether they wish to be contacted by phone or text 3820, and if they answer "phone," a phone call is initiated with an agent to gather and then convert their data to the proper CRM format 3825 and to handle the consumer's interaction as normal, such as converting the user data to MICROSOFT DYNAMICS 365™ format, and storing it in an auto dealer's CRM system 3830, for an exemplary auto dealer interaction. If the user instead answer "text" at step 3820, the application may initiate an SMS to email conversion 3835 by taking the text typed by the consumer and putting it in the appropriate fields of an email, or by putting the text entirely in the body of the email, depending on the implementation. The consumer data may then be emailed to the auto dealer CRM system 3840 for input into the system 3845, at which point an agent for the auto dealer may reply to the email sent by the consumer 3850 if applicable. The email sent by the auto dealer agent is then converted into SMS 3855, for instance the body of the email being put into the SMS, with the recipient being automatically matched with the email thread in the CRM. The consumer may be asked if they wish to continue texts with the agent, by the SMS bot 3860, at which point, if they specify "yes," they will be redirected back into the SMS-to-email loop 3835. If they answer "no" however, indicating that the interactions are finished, then a transcript of the SMS and emails between the consumer and auto dealer agent is captured 3865 and all data is stored in an analytics data store for later use in analytics reporting 3870.

Figure 39:
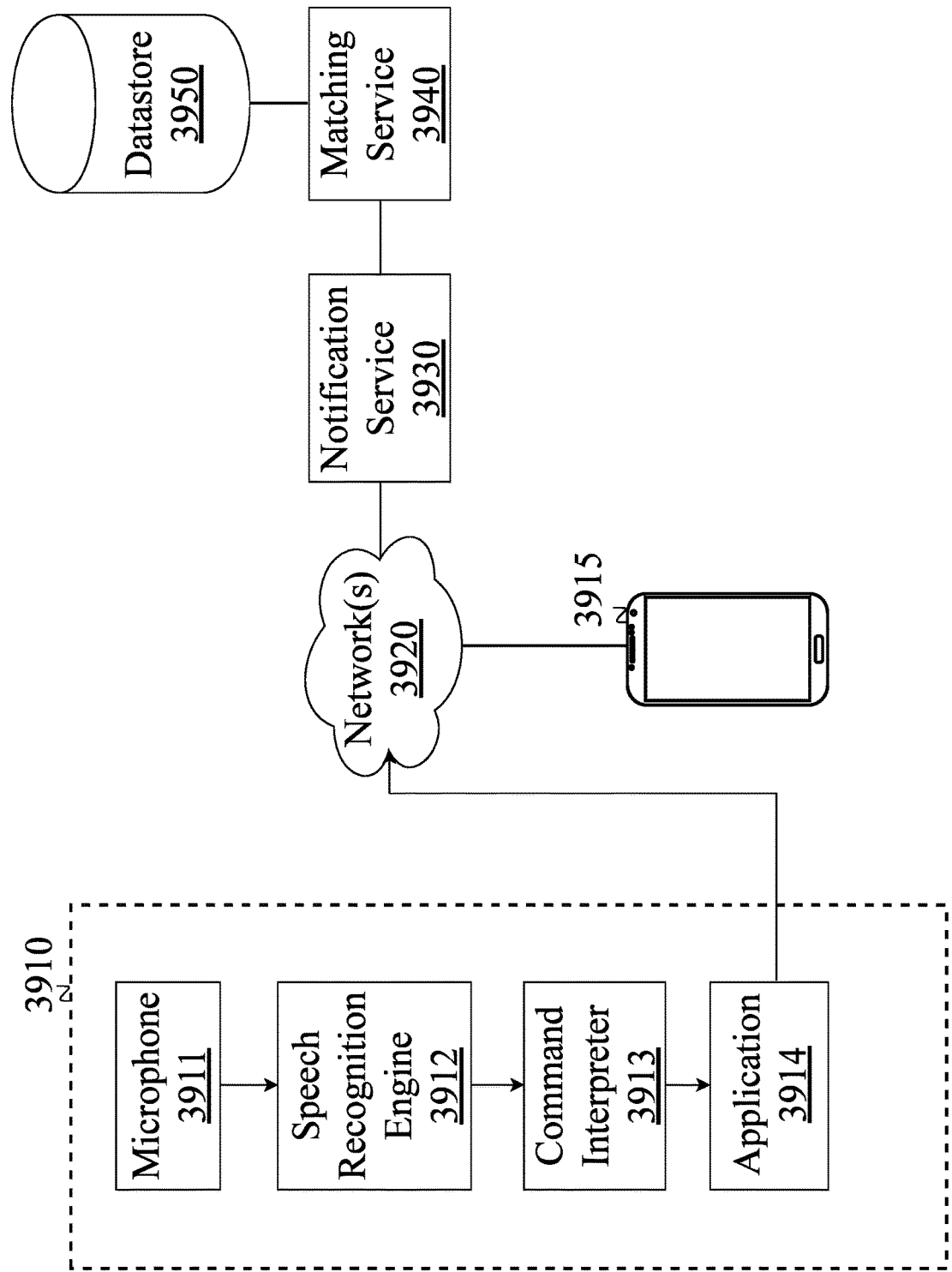
FIG. 39 is a diagram of a system for adaptive advertisement within a mobile application using speech recognition, according to an embodiment.

FIG. 39 is a diagram of a system for adaptive advertisement within a mobile application, according to an embodiment. A user mobile device with a communications and advertising application 3910 exists which may be used by a consumer while connected to a network or multiple networks 3920, such as but not limited to the Internet or a cellular network, and which may be a smartphone or other manner of mobile device such as a tablet, or personal computing device. The operating system of such a device may range from such software as ANDROID™, IOS™, WINDOWS™, LINUX™, or others, and a second mobile device 3915 may also operate on at least one of the same networks 3920 as the first mobile device 3910, and may be communicated with over that network or networks 3920 by the first mobile device and application 3910.

The first mobile device 3910 comprises at least a microphone 3911, a speech recognition engine 3912, a command interpreter 3913, and an application 3914. The command interpreter 3913 and speech recognition 3912 are software operating on hardware connected to or part of the interior of the mobile device 3910 and may be part of the software of the application 3914, rather than separate software. Independent software for speech recognition 3912 may be used, such as DRAGON NATURALLY SPEAKING™, SPHINX™, and others. Some operating systems such as ANDROID™ may have built-in speech recognition which may be utilized as well. A microphone 3911 may be a separately connected device, also known as an external microphone, or may be an integrated microphone that is part of the construction of the mobile device 3910, and is used to receive audio and deliver it to the speech recognition engine 3912, which interprets the audio data to form words, forwarding the translated data to the command interpreter 3913 software, which interprets strings of words as commands to the application 3914, such as "tap that link" or "send a birthday greeting to my Mother."

The application running on a first mobile device 3910 may communicate over the network or networks 3920, such as with the TCP/IP protocol, with a notification service 3930 that manages both incoming and outgoing data to the application, for the purpose of sending notifications such as PUSH notifications to the user, while also allowing a user to input and edit their own data for a matching service 3940, the data being stored in a datastore 3950. The services 3930, 3940 and datastore 3950 may be stored on the same server device, or on some combination of separate or interconnected devices, the specific configuration of which is not limiting to the invention. A matching service 3940 may be used to match a user's inserted preferences and data with stored 3950 data from companies that wish to advertise to such users, for instance it may match a user who has very open preferences for any companies offering advertised deals within a 20 mile radius, in which case the user may get notifications of such offers within his specified distance, from the matching service 3940. If a match is made, the notification service 3930 is used to notify the user and allow them to perform an action based on the notification, within the application.

Figure 40:
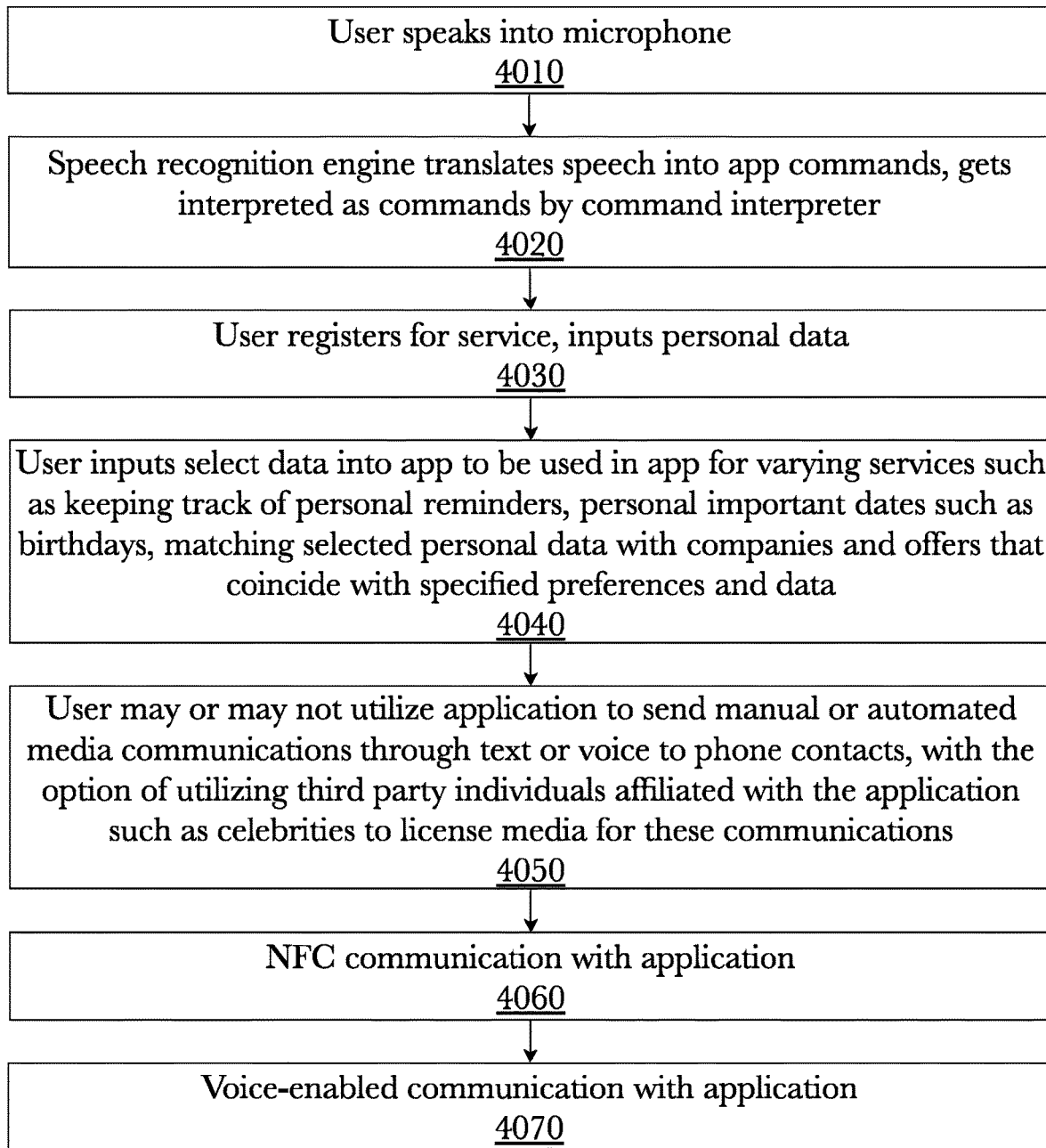
FIG. 40 is a method diagram for a system of adaptive advertisement within a mobile application using speech recognition, according to an embodiment.

FIG. 40 is a method diagram for a system of adaptive advertisement within a mobile application, according to an embodiment. First a user speaks into microphone 4010, which may be either an integrated microphone or an external or separately attached microphone, and which may be connected through one of several possible methods, including a 3.5 mm jack using any of TS, TRS, TRRS, or TRRRS construction, or an XLR microphone either connected directly to the mobile device or connected through the use of an adapter, or connected over a network connection including wireless connections, or some other connection method. The audio data the user speaks is then translated into text with a speech recognition engine, which may be software operating as part of the mobile device or as part of a separately connected device, before giving the string of translated words in the supported language of the user to a command interpreter to be interpreted as application commands 4020. According to the embodiment, the application in this instance may be used for integration of adaptive advertisement and other communications, utilizing a user's voice to receive commands rather than buttons or a touchscreen interface, or in addition to them in some cases. Such commands may include "send a birthday greeting to my Mother," "I don't want to get offers from automotive dealers," "respond to that offer," and others.

A user may register with a communications and advertisement application for service, and input their personal data 4030. Personal data may include fields such as date of birth, name, location, gender or sex, sexual orientation, income, or any other data as needed by the communications and advertisement integration application. After a user registers and enters their selected data, a user may input further select data into the application to be used for varying services such as keeping track of personal reminders, keeping track of important dates such as birthdays of loved ones, and matching select personal data with companies and offers that coincide with specified preferences and data 4040, for instance through a variety of menu options, text fields, and more. A user may or may not then utilize the application to send manual or automated media communications through text or voice to phone contacts, with the option of utilizing third party individuals affiliated with the application such as celebrities to license media for these communications 4050. For instance, after a user has registered and entered relevant personal data into the application, they may specify that automated "happy birthday" messages should be sent to their relatives as specified in the application, and may even include an option for third parties such as celebrities or noteworthy figures to send pre-recorded birthday messages, as part of the message sent to the user's relatives. Such third party individuals may require payment, may be part of a subscription package in the application, and may even be other relatives or a self-recorded audio file, rather than a third party individual. NFC communications mentioned earlier may integrate with the application 4060 for the purposes of allowing NFC-enabled products or tags to trigger an offer from an advertiser or seller to appear on a customer's application. Voice-enabled communications with the application 4070 may also be enabled by a user so that they may replace traditional user interface interactivity with voice commands, such as instructing the application, "send happy birthday message to my Aunt Patrice," or some other voice command. Communications sent from a mobile device operating such an application may be received by a recipient device without such an application, and may be received as emails, text SMS messages, phone calls or messages, or other communications methods, techniques and services that may be or may become common in mobile device communications.

Figure 41:
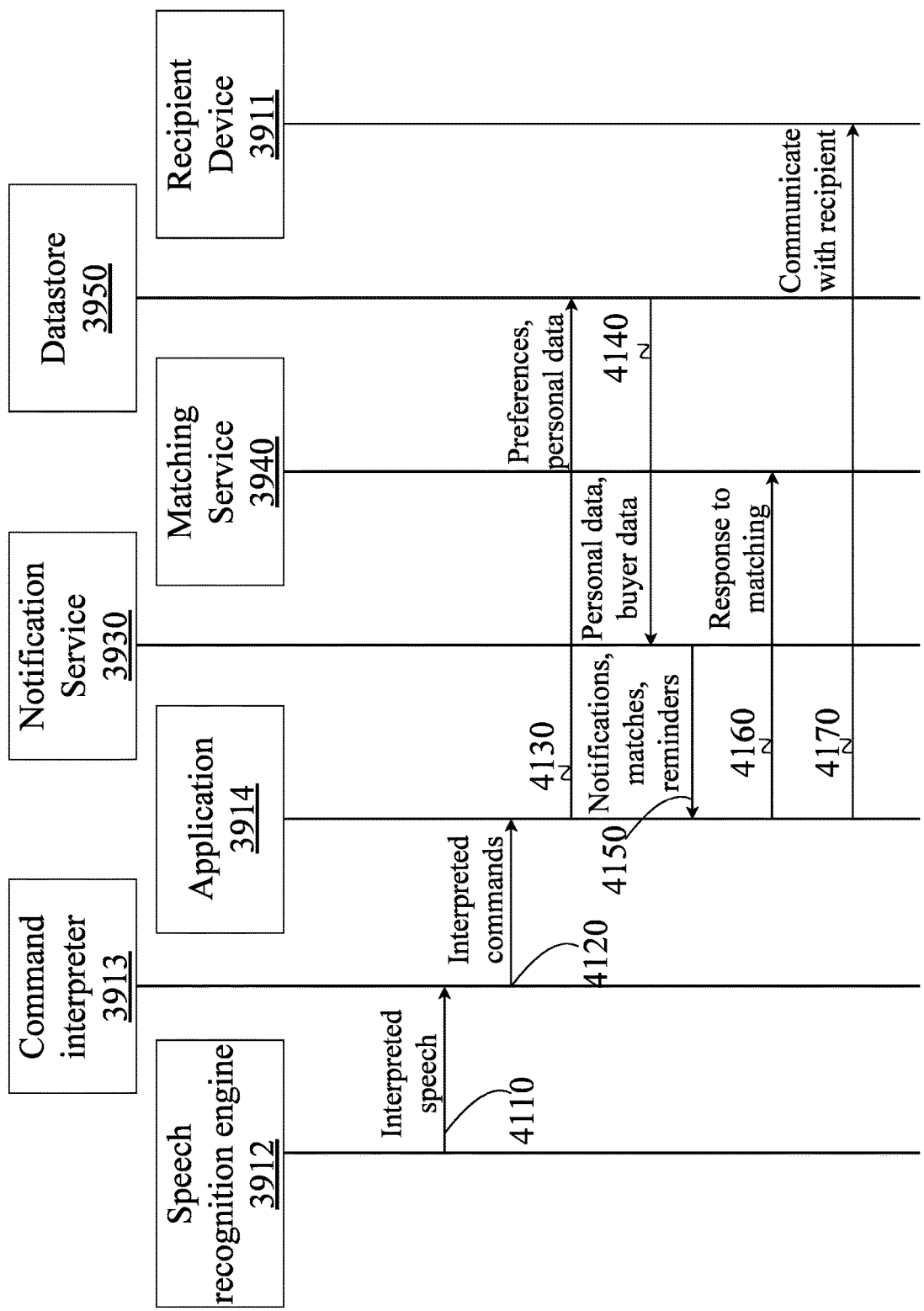
FIG. 41 is a message flow diagram for a system of adaptive advertisement within a mobile application using speech recognition, according to an embodiment.

FIG. 41 is a message flow diagram for a system of adaptive advertisement within a mobile application, according to an embodiment. The devices or services receiving or sending messages in the diagram are a speech recognition engine 3912, a command interpreter 3913, a mobile application 3914, a notification service 3930, a matching service 3940, a datastore 3950, and a recipient device 3915. A mobile device user may speak into a connected microphone to have their speech interpreted by a speech recognition engine 3912, whereby the interpreted speech is sent from the speech recognition engine 3912 to the command interpreter 3913, 4110. Such a data transmission may be merely a software pipeline between two software operating on the same computer, or may be a network connection between software operating on network-connected devices. Such a speech recognition engine 3912 may be an operating system service such as one offered by ANDROID™ operating systems, or a proprietary or open source system such as DRAGON NATURALLY SPEAKING™ or SPHINX™, while a command interpreter 3913 may be an integrated software component of the application 3914, interpreting the string of text as a limited set of commands within the application 4120, such as "ignore that offer" or "close app."

A user of a phone running an integrated advertisement and communication application 3910 may send their preferences and personal data to a datastore 3950, 4130, allowing a notification service 3930 to poll this data and receive the customer's data as well as the data from companies that may wish to match with the consumer 4140. The notification service 3930 then informs the user via the application 3910 of any notifications, matches, or reminders that are scheduled 4150, at which point a user may interact with the notifications and respond to them 4160 which is sent to the matching service 3940, or the user may initiate communications with a second recipient mobile device 3915, 4170.

Figure 45:
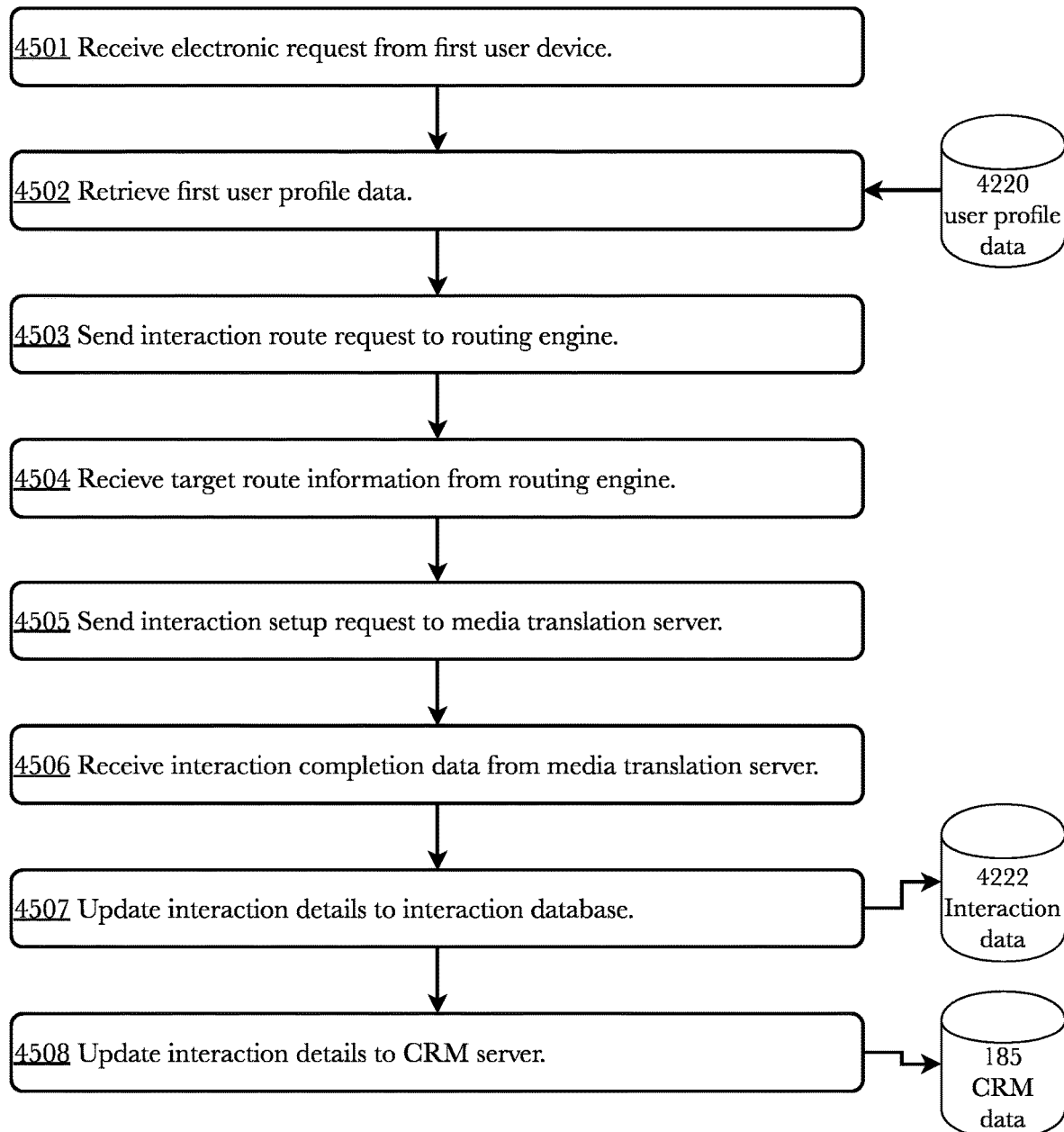
FIG. 45 is a method diagram illustrating interaction control between two user devices, according to an embodiment.

FIG. 45 is a flow diagram showing the steps of an exemplary method for interaction control. In a first step, 4501 receive an electronic request from a first user device, electronic request comprising user name or number identifying user, origination address, product or service of interest, associated advertising campaign, time and date of availability if not immediately; to establish a text-based connection, text-based (e.g. SMS or other communication protocol available to those skilled in the art); from a first user device whereas the first user device is associated with a customer (e.g. customer user mobile device 130) to a second user device whereas the second user device is associated with a business (e.g. business user mobile device 132). In a next step, 4502 retrieve a first user profile data from a user profile database that may be associated with a business' CRM system, user profile customer profile data comprising user name, address, phone number, email, preferred contact method, historical purchase information, customer tiering level (e.g. bronze, silver, gold), personal information (e.g. marital status, number of dependents, net worth, interests/hobbies). In a next step, 4503 send an interaction routing request to a routing engine, interaction routing request comprising list of prior customer interactions with business, brand, product, or if available competitor business, brand or product, product or service purchased, amount of purchase, prior communications (e.g. text, chat, email, snail mail, voice call, call center interaction, in-person, telegram or other communications means) with business or business partner, attribution data associated with advertising campaigns customer experienced including media channel (e.g. TV, social media, near-field-communication, in-store offers, targeted email), dates and times of ad campaigns, aggerate sales data associated with each advertising campaign, customer-specific sales outcome (e.g. made purchased, deferred purchase, returned item). In a next step, 4504 receive target route information from a routing engine, target route information comprising target type (e.g. traditional phone-based agent, multi-media agents, AI-based or traditional interactive voice response ("IVR") systems, AI-driven chat bots or speech bots, or non-traditional resources for example field sales), target resource name (e.g. Jim Johnson), title (e.g. car sales advocate), destination address (e.g. 360.867.5309). In a next step, 4505 send target route information to media translation server. In a next step, 4506 receive interaction completion data from a media translation server, interaction completion data comprising first user identifier, second user identifier, interaction type (e.g. text-to-text, email-to-text, chat-to-text), interaction date and time stamp, interaction duration, termination originator (e.g. first user device, second user device), interaction outcome (e.g. purchase made, problem resolved, follow up required). In a next step, 4507 update interaction details to interaction database, interaction details comprising first user identifier, second user identifier, interaction type (e.g. text-to-text, email-to-text, chat-to-text), interaction date and time stamp, interaction duration, termination originator (e.g. first user device, second user device), interaction outcome (e.g. purchase made, problem resolved, follow up required). In a next step, 4508 update interaction details to a CRM database 185, interaction details comprising first user identifier, second user identifier, interaction type (e.g. text-to-text, email-to-text, chat-to-text), interaction date and time stamp, interaction duration, termination originator (e.g. first user device, second user device), interaction outcome (e.g. purchase made, problem resolved, follow up required).

Figure 46:
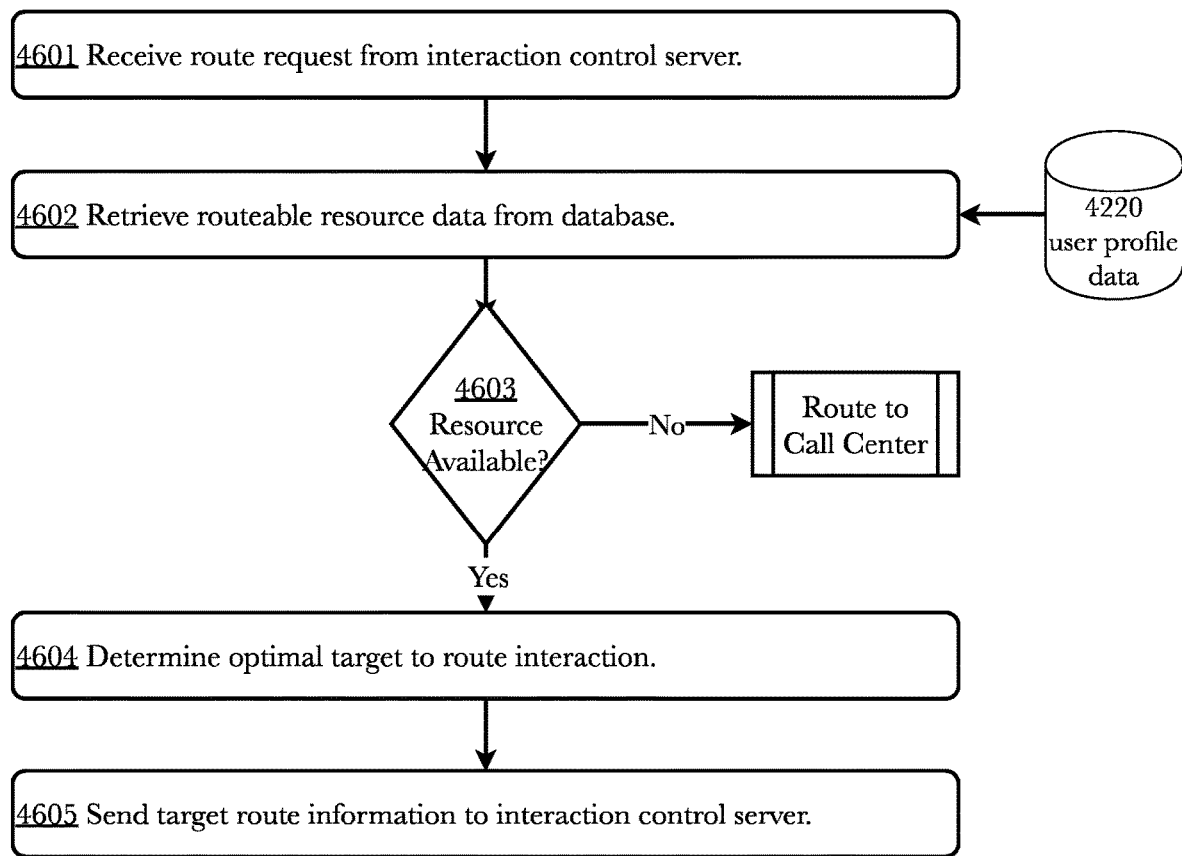
FIG. 46 is a method diagram illustrating interaction routing between two user devices, according to an embodiment.

FIG. 46 is a flow diagram showing the steps of an exemplary method for interaction routing. In a first step, 4601 receive interaction routing request from interaction control server, interaction routing request comprising list of prior customer interactions with business, brand, product, or if available, competitor business, brand or product, product or service purchased, amount of purchase, prior communications (e.g. text, chat, email, snail mail, voice call, call center interaction, in-person, telegram or other communications means) with business or business partner, attribution data associated with advertising campaigns customer experienced including media channel (e.g. TV, social media, near-field-communication, in-store offers, targeted email), dates and times of ad campaigns, aggerate sales data associated with each advertising campaign, customer-specific sales outcome (e.g. made purchased, deferred purchase, returned item). In a next step, 4602 retrieve routable resource data from resource repository, routable resource data comprising target route information comprising target type (e.g. traditional phone-based agent, multi-media agents, AI-based or traditional interactive voice response ("IVR") systems, AI-driven chat bots or speech bots, or non-traditional resources for example field sales), target resource name (e.g. Jim Johnson), title (e.g. car sales advocate), destination address (e.g. 360.867.5309). In a next step, 4603 identify target availability. In a next step, 4604 determine optimal resource to route the interaction, optimal resource determination is achieved through use AI techniques known to those skilled in the art including deep learning algorithms and incorporate data comprised of time-of-day, day-of-week, store hours, resource availability, service level requirements, customer user profile data, previous customer interaction and transactions, customer tiering structure, and business CRM data. In a next step, 4605 send target route information (second user) to interaction control server, target route information target route information comprising target type (e.g. traditional phone-based agent, multi-media agents, AI-based or traditional interactive voice response ("IVR") systems, AI-driven chat bots or speech bots, or non-traditional resources for example field sales), target resource name (e.g. Jim Johnson), title (e.g. car sales advocate), destination address (e.g. 360.867.5309).

Figure 47:
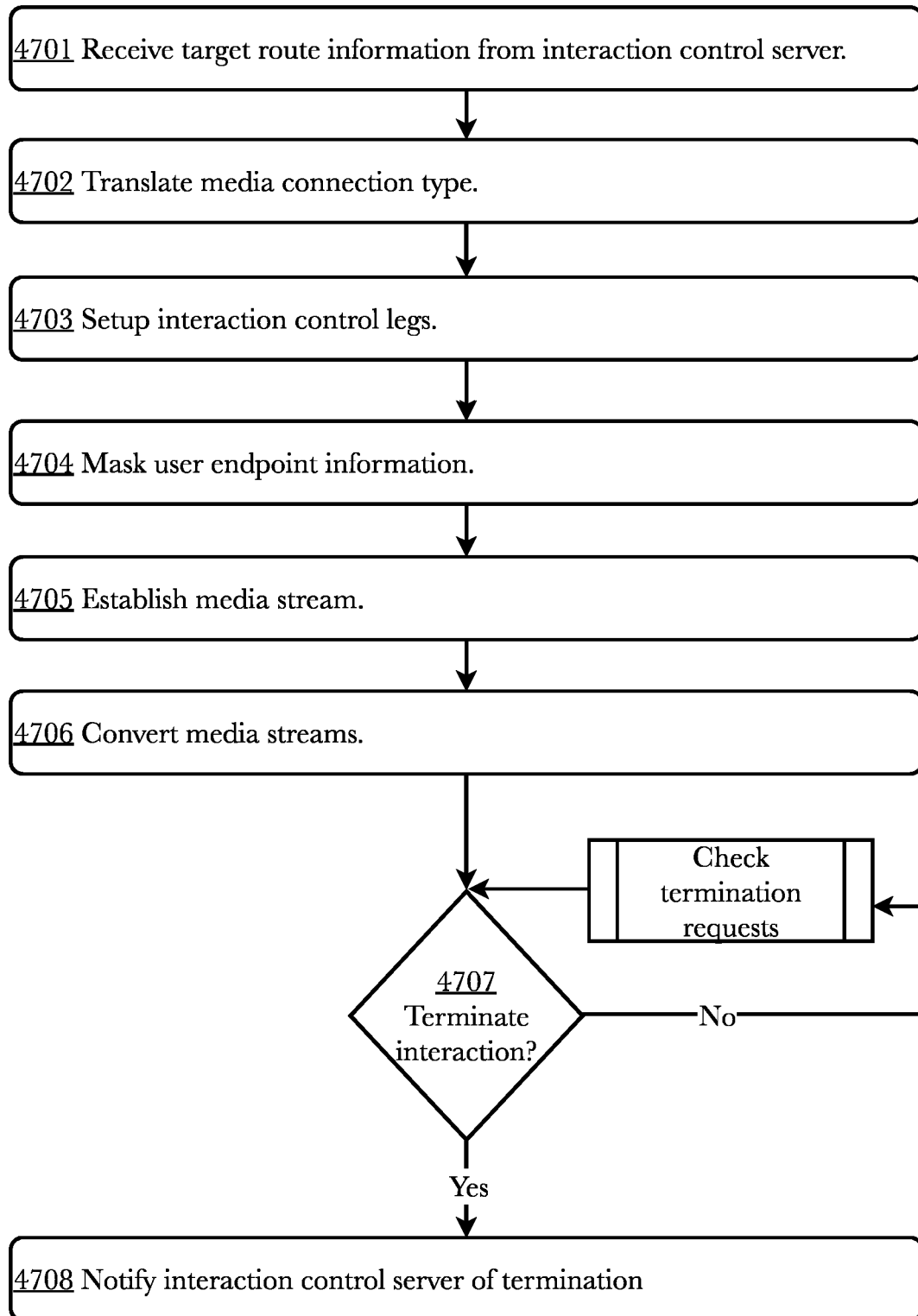
FIG. 47 is a method diagram illustrating media translation and communication between two user devices, according to an embodiment.

FIG. 47 is a flow diagram showing the steps of an exemplary method for media translation. In a first step, 4701 receive target route information from an interaction control server, target route information comprising target route information comprising target type (e.g. traditional phone-based agent, multi-media agents, AI-based or traditional interactive voice response ("IVR") systems, AI-driven chat bots or speech bots, or non-traditional resources for example field sales), target resource name (e.g. Jim Johnson), title (e.g. car sales advocate), destination address (e.g. 360.867.5309). In a next step, 4702 translate media connection type, media connection type comprising text-to-text, email-to-text, or chat-to-text. In a next step, 4703 set up interaction control legs between a first user device (e.g. customer) and a second user device (e.g. business user), interaction control legs comprising communication network sockets (e.g. IP/TCP) that enable communication between user devices. In a next step, 4704 mask user device endpoint information from a first user to a second user, and from a second user to a first user. In a next step, 4705 establish media stream between a first user and a second user. In a next step, 4706 convert media stream as required, converted media stream include email-to-text, chat-to-text such that customer user device (text, chat, email) can communicate with business user device (text) without necessitating using a dedicated device or changing devices or downloading and logging into a dedicated application on either customer user device or business user device. In a next step, 4707 terminate connection, termination request may come from either customer user device or business user device. In a next step, 4708 notify interaction control server of terminated connection and provide interaction completion data, interaction completion data comprising first user identifier, second user identifier, interaction type (e.g. text-to-text, email-to-text, chat-to-text), interaction date and time stamp, interaction duration, termination originator (e.g. first user device, second user device), interaction outcome (e.g. purchase made, problem resolved, follow up required).

Figure 48:
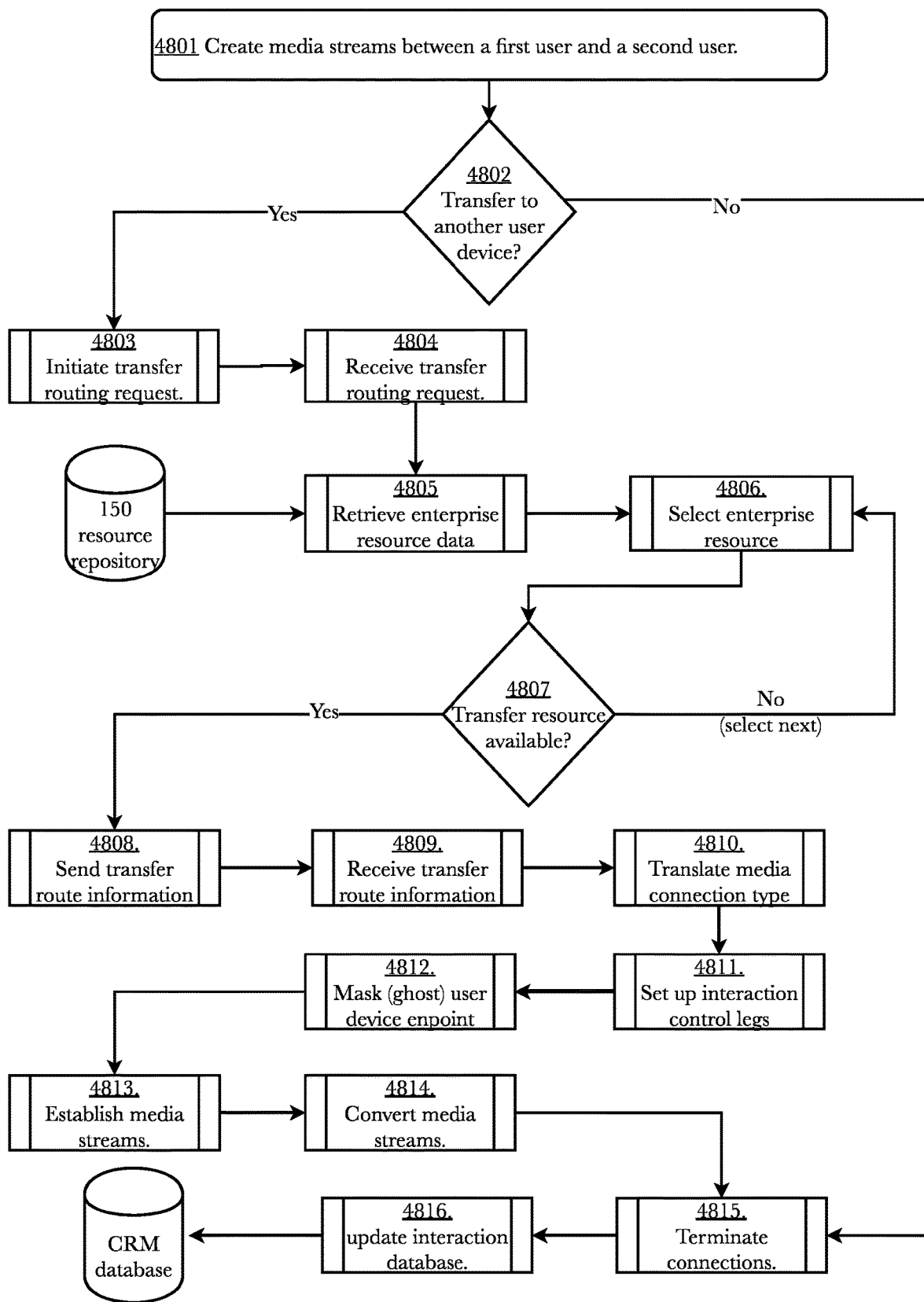
FIG. 48 is a method diagram illustrating transfer of communication from one user device to another user device, according to an embodiment.

FIG. 48 is a flow diagram showing the steps of an exemplary method for interaction transfer from a first user and a second user, to a first user and a third user. In a first step, 4801 create interaction media streams between a first user and a second user as exemplified in flow diagrams FIG. 45, FIG. 46, and FIG. 47. In a next step, 4802 a second user device sends a request to an interaction control server to transfer the interaction to a third user device. In a next step, 4803 an interaction control server initiates a transfer routing request to an interaction routing engine. In a next step, 4804 an interaction routing engine receives transfer routing request from an interaction control server, transfer routing request comprising list of current and prior customer interactions with business, brand, product, or if available, competitor business, brand or product, product or service purchased, amount of purchase, prior communications (e.g. text, chat, email, snail mail, voice call, call center interaction, in-person, telegram or other communications means) with business or business partner, attribution data associated with advertising campaigns customer experienced including media channel (e.g. TV, social media, near-field-communication, in-store offers, targeted email), dates and times of ad campaigns, aggerate sales data associated with each advertising campaign, customer-specific sales outcome (e.g. made purchased, deferred purchase, returned item). In a next step, 4805 an interaction routing engine retrieves enterprise resource data from resource repository, enterprise resource data comprising target route information comprising target type (e.g. traditional phone-based agent, multi-media agents, AI-based or traditional interactive voice response ("IVR") systems, AI-driven chat bots or speech bots, or non-traditional resources for example field sales), target resource name (e.g. Jim Johnson), title (e.g. car sales advocate), destination address (e.g. 360.867.5309). In a next step, 4806 select enterprise resource to transfer route the interaction, enterprise resource determination is achieved through use AI techniques known to those skilled in the art including deep learning algorithms and incorporate data comprised of time-of-day, day-of-week, store hours, resource availability, service level requirements, customer user profile data, previous customer interaction and transactions, customer tiering structure, and business CRM data. In a next step, 4807 identify transfer target availability based on calendar availability, if unavailable check next resource in target list. In a next step, 4808 send target transfer route information (third user) from an interaction routing engine to an interaction control server. In a next step, 4809 receive target transfer route information at an interaction control server. In a next step, 4810 translate media connection type, media connection type comprising text-to-text, email-to-text, or chat-to-text. In a next step, 4811 set up interaction control legs between a first user device (e.g. customer) and a third user device (e.g. business user), interaction control legs comprising communication network sockets (e.g. IP/TCP) that enable communication between user devices. In a next step, 4812 mask user device endpoint information from a first user to a third user, and from a third user to a first user. In a next step, 4813 establish media stream between a first user and a third user. In a next step, 4814 convert media stream as required, converted media stream include email-to-text, chat-to-text such that customer user device (text, chat, email) can communicate with business user device (text) without necessitating using a dedicated device or changing devices or downloading and logging into a dedicated application on either customer user device or business user device. In a next step, 4815 terminate connection, termination request may come from either customer user device or business user device. In a next step, 4816 update enterprise CRM database with interaction completion data, interaction completion data comprising first user identifier, second user identifier, third user identifier, interaction type (e.g. text-to-text, email-to-text, chat-to-text), interaction date and time stamp, interaction duration, termination originator (e.g. first user device, second user device), interaction outcome (e.g. purchase made, problem resolved, follow up required).

Figure 49:
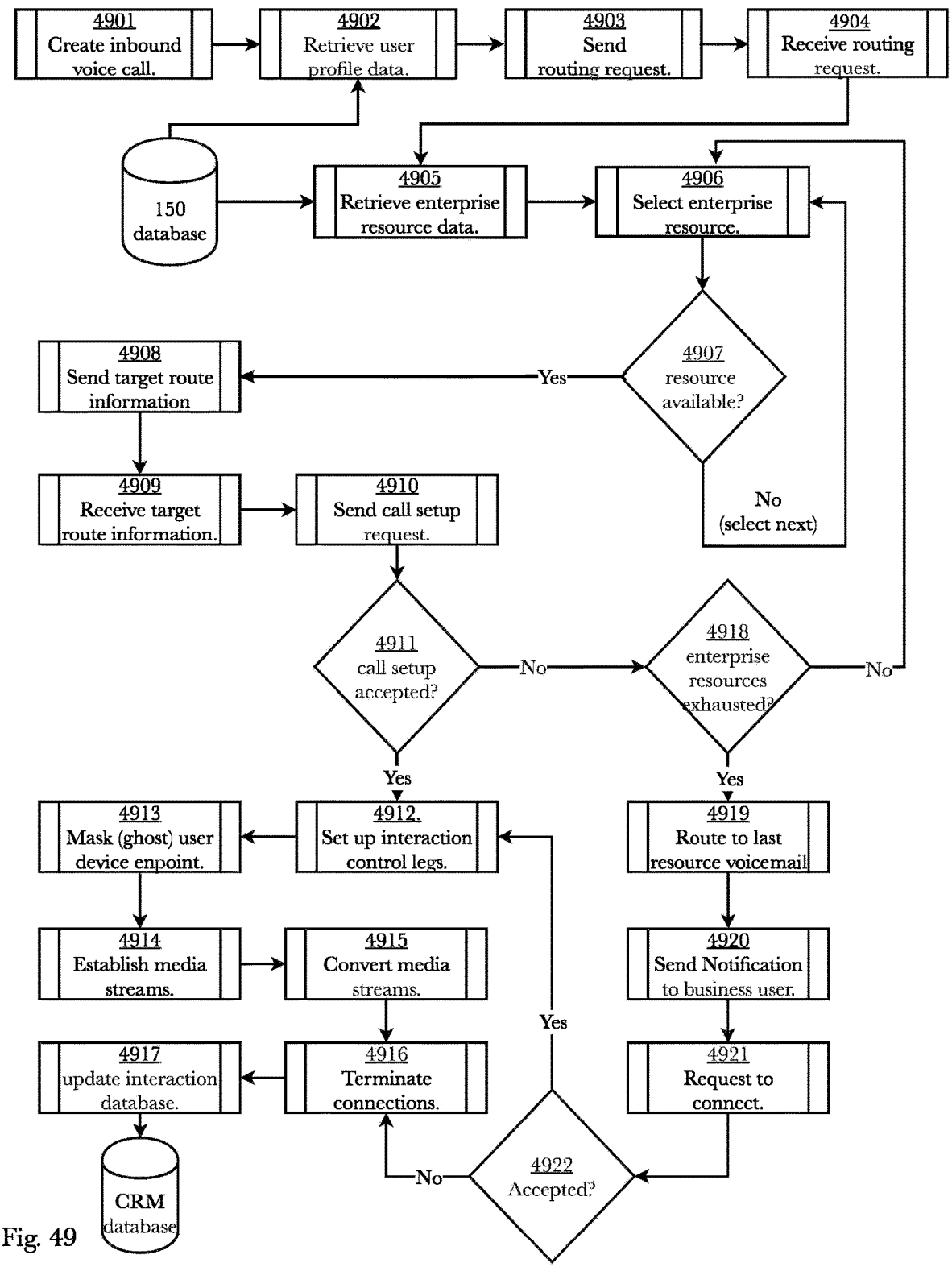
FIG. 49 is a method diagram illustrating voice communication from one user device to a voicemail system with a subsequent text-based communication from another user device, according to an embodiment.

FIG. 49 is a flow diagram showing the steps of an exemplary method for voice interaction from a first user to a voicemail of a second user; and a subsequent text interaction from a second user to a first user as a result of the voice interaction. In a first step, 4901 create an inbound voice call from a first user device whereas the first user device is associated with a customer (e.g. customer user mobile device 130) to an interaction control server associated with an enterprise and business user devices (e.g. business user mobile device 132 or other business user mobile device 134); inbound voice call is initiated through first user interaction with first user device, by clicking on text link, or tapping on picture element; inbound voice call data comprising user name or number identifying user, origination address, product or service of interest, and associated advertising campaign. In a next step, 4902 retrieve a first user profile data from a user profile database that may be associated with a business' CRM system or other enterprise database, user profile customer profile data comprising user name, address, phone number, email, preferred contact method, historical purchase information, customer tiering level (e.g. bronze, silver, gold), personal information (e.g. marital status, number of dependents, net worth, interests/hobbies). In a next step, 4903 send an interaction routing request from an interaction control server to a routing engine, interaction routing request comprising list of prior customer interactions with business, brand, product, or if available competitor business, brand or product, product or service purchased, amount of purchase, prior communications (e.g. text, chat, email, snail mail, voice call, call center interaction, in-person, telegram or other communications means) with business or business partner, attribution data associated with advertising campaigns customer experienced including media channel (e.g. TV, social media, near-field-communication, in-store offers, targeted email), dates and times of ad campaigns, aggerate sales data associated with each advertising campaign, customer-specific sales outcome (e.g. made purchased, deferred purchase, returned item). In a next step, 4904 an interaction routing engine receives routing request from an interaction control server, routing request comprising list of current and prior customer interactions with business, brand, product, or if available, competitor business, brand or product, product or service purchased, amount of purchase, prior communications (e.g. text, chat, email, snail mail, voice call, call center interaction, in-person, telegram or other communications means) with business or business partner, attribution data associated with advertising campaigns customer experienced including media channel (e.g. TV, social media, near-field-communication, in-store offers, targeted email), dates and times of ad campaigns, aggerate sales data associated with each advertising campaign, customer-specific sales outcome (e.g. made purchased, deferred purchase, returned item). In a next step, 4905 an interaction routing engine retrieves enterprise resource data from resource repository, enterprise resource data comprising target route information comprising target type (e.g. traditional phone-based agent, AI-based such as natural language processing or traditional interactive voice response ("IVR") systems, or non-traditional resources for example field sales), target resource name (e.g. Jim Johnson), title (e.g. car sales advocate), destination address (e.g. 360.867.5309). In a next step, 4906 select enterprise resource to route the voice call, enterprise resource determination is achieved through use AI techniques known to those skilled in the art including deep learning algorithms and incorporate data comprised of time-of-day, day-of-week, store hours, resource availability, service level requirements, customer user profile data, previous customer interaction and transactions, customer tiering structure, and business CRM data. In a next step, 4907 identify target availability based on calendar availability, if enterprise resource unavailable, go back to step 4906 and select next resource in target list. If resource is available in a next step, 4908 send target route information from an interaction routing engine to an interaction control server. In a next step, 4909 receive target route information at an interaction control server. In a next step, 4910 send voice call set up request from an interaction control server to a business user mobile device. In a next step, 4911 voice call set up request is accepted or rejected. If the call setup request is accepted by the business user mobile device, then in a next step, 4912 set up interaction control legs between a first user device (e.g. customer) and a second user device (e.g. business user), interaction control legs comprising communication network sockets (e.g. IP/TCP) that enable communication between user devices. In a next step, 4913 mask ("ghost") user device endpoint information from a first user to a second user, and from a second user to a first user. In a next step, 4914 establish interaction (e.g. voice, text) media stream from a first user to a second user, and from a second user to a first user. In a next step, 4915 convert media stream as required, converted media stream include email-to-text, chat-to-text such that customer user device (text, chat, email) can communicate with business user device (text) without necessitating using a dedicated device or changing devices or downloading and logging into a dedicated application on either customer user device or business user device. In a next step, 4916 terminate connection, termination request may come from either first user (customer) device or second user (business) device. In a next step, 4917 update enterprise CRM database with interaction completion data, interaction completion data comprising first user identifier, second user identifier, interaction type (e.g. voice-to-voicemail, voice-to-voice, text-to-text, email-to-text, chat-to-text), interaction date and time stamp, interaction duration, termination originator (e.g. first user device, second user device), interaction outcome (e.g. purchase made, problem resolved, follow up required). If the call setup request is not accepted 4911 by the business user mobile device, then in a next step, 4918 a determination is made enterprise resources have been selected from a routable target list. If enterprise resources are not exhausted, then process returns to step 4906. If enterprise resources are exhausted, then in a next step 4919, an interaction control server routes call to first targeted second (business) user voicemail. In a next step 4920, send notification (e.g. text message) to business user mobile device. In a next step, 4921 a second user (business) user mobile device sends an electronic message through an interaction control server to first user (customer) mobile device requesting to connect. In a next step, 4922 first user mobile device either accepts or rejects the request to connect. If the first user accepts the request, then process continues to step 4912. If the first user device does not accept, then process continues to step 4916.

Figure 50:
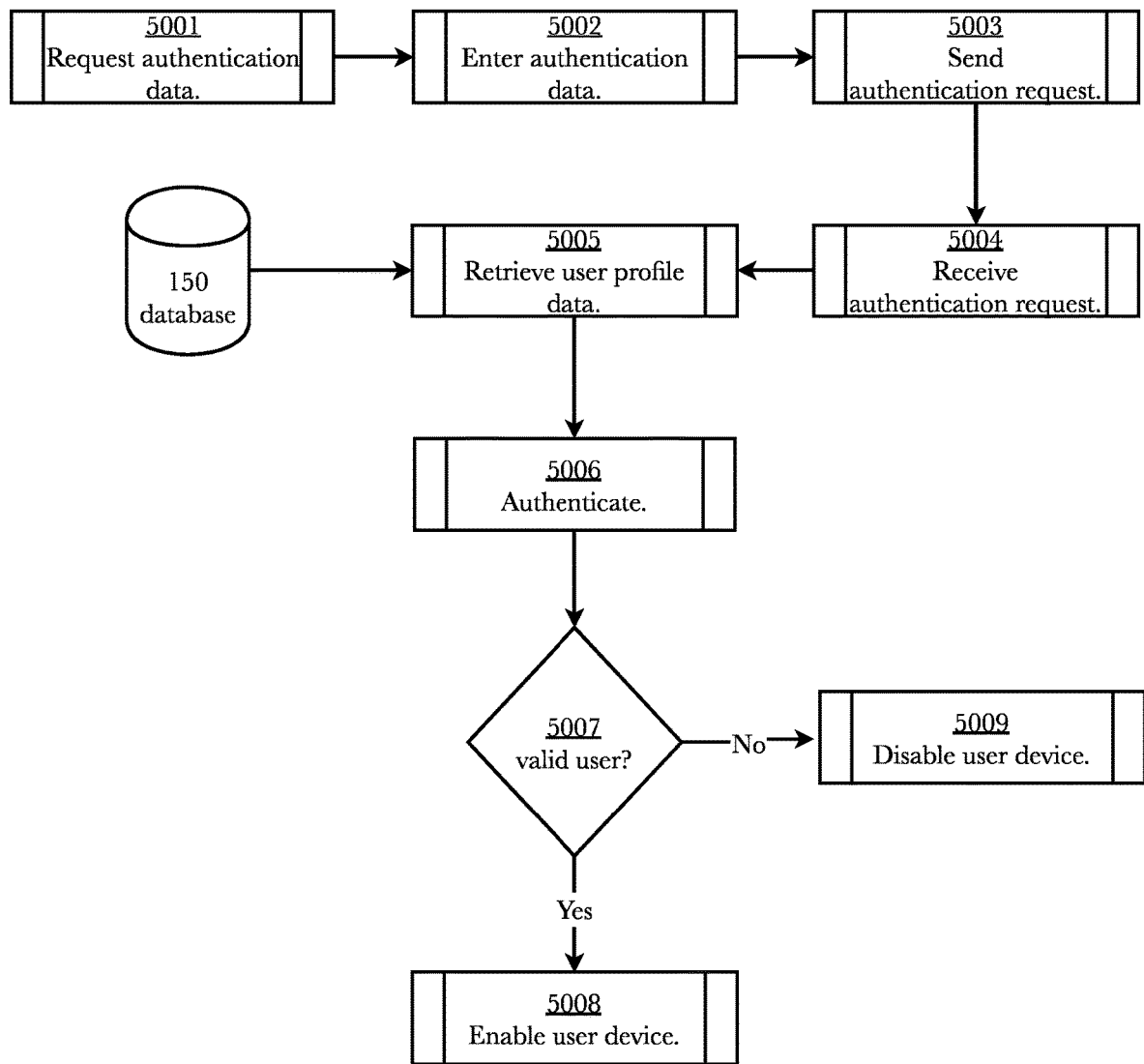
FIG. 50 is a method diagram illustrating authentication of TCPA compliant mobile device with an interaction control system, according to an embodiment.

FIG. 50 is a flow diagram showing the steps of an exemplary method for authentication of the TCPA compliant mobile device. In a first step, 5001 the TCPA compliant mobile device 136 requests user to enter their authentication data that uniquely identifies them, the request may be in the form of a log in screen to receive typed user input, a voice prompt from an auditory device, a camera lens to receive visual data, or a fluid receptacle to receive identifying fluids from a user, or any other means to collect uniquely identifying user data. In a next step, 5002 the device user enters their authentication data (authentication factors) that uniquely identifies them, authentication data input may include what the user knowns (e.g. user name, user password, personal identification number, etc.), what the user has (e.g. mobile push authenticator, multi-factor authentication code generated from 3$^{rd}$ party device such as GEMALTO™, GOOGLE AUTHENTICATOR™, or other device), something the user is (e.g. biometric data from retinal scan, fingerprint, DNA sample and the like), or some other verification technique. In a next step, 5003 the secure mobile device sends authentication request along with authentication data to the interaction control server 4218. In a next step, 5004 interaction control server receives 4218 authentication request along with authentication data. In a next step, 5005 the interaction control server retrieves business user profile data 4220 from database 155 that may be associated with a business' CRM system or other enterprise database, business user profile data comprising user name, address, phone number, job/position title, level of authorization available to business user, level of authorization may include systems (e.g. CRM, payroll, sales, human resources) or data (e.g. sales, customer, account) accessible by a business user. In a next step, 5006 the user is authenticated which may include comparing the authentication data, such as username, one-time-password, retinal scan data or the like, with corresponding data stored in user profile database or 3rd party credential service provider or similar technique to those skilled in the art. In a next step, 5007 if the user is a valid user, then the TCPA compliant mobile device 136 is enabled 5008 to send or receive electronic communications through the interaction control server 4218; if the user is determined invalid, the TCPA compliant mobile device is disabled 5009 to send or receive any electronic communication until a successful authentication occurs.

Figure 51:
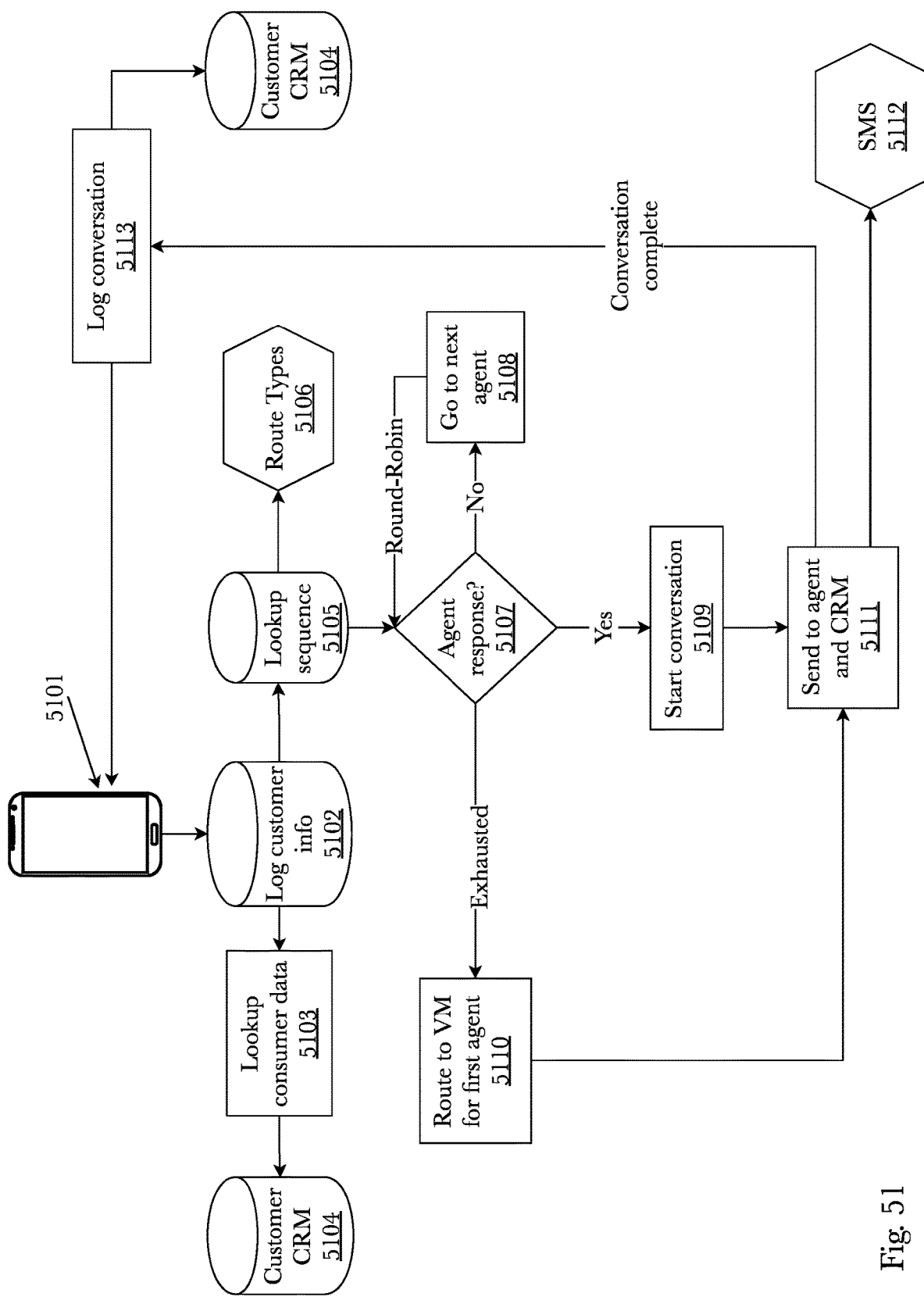
FIG. 51 is a method diagram illustrating routing of communications between a customer and one or more agents, according to an embodiment.

FIG. 51 is a method diagram illustrating routing of communications between a customer and one or more agents, according to an embodiment. A consumer mobile device running an integrated advertisement and communication application 5101 comprises a unique tracking ID. That unique tracking ID allows the advertisement and communication application to log customer information passively and actively 5102 and then is stored in a customer CRM database 5104 to a customer profile matching the unique tracking ID. During the use or various purposes involving the advertisement and communication application, such as a tap text link or interaction, a lookup of the user's data using the unique ID 5103 to better inform sales and business agents with data about the interaction and customer. For example, during the use of a tap text application, a lookup sequence is initiated 5105 whereby agent locations (users) and route types (sequential, round robin, percentage) 5106 are first identified. Agents may be contacted in a prioritized manner according to various parameters such as expertise, location, performance, scheduling, etc. Customer preferences may be considered as to a preferred type of communication regardless of the initial method of contact. Customer data such as location or hobbies may allow agents to strike up more personalized conversations with the customer to form a stronger relationship thus increasing sales. Typically, a round robin is performed 5108 until either an agent responds 5107, or the list of possible agents is exhausted and the customer will be routed to the voicemail on the primary agent's device 5110. Whether or not an agent makes contact with a customer 5109, messages 5112 such as SMS messages will be generated providing content as described in previous figures. Additionally, details and other telemetry will be sent to the agent of highest priority 5111. That agent may be any agent in the chain that actually made contact with the customer, or an agent that received a voicemail from the customer. Upon completion of a conversation, or lack thereof, recorded audio and other details and reports are stored 5113 with the customer's profile in the CRM database 5104. At all times, uniquely identifying contact information, e.g., phone number, email, etc., of the customer and agents are hidden from each other regardless of which communication channel is used. Furthermore, the dynamic routing of an interaction is pulled from the mobile application via a webservice according to one aspect.

Figure 52:
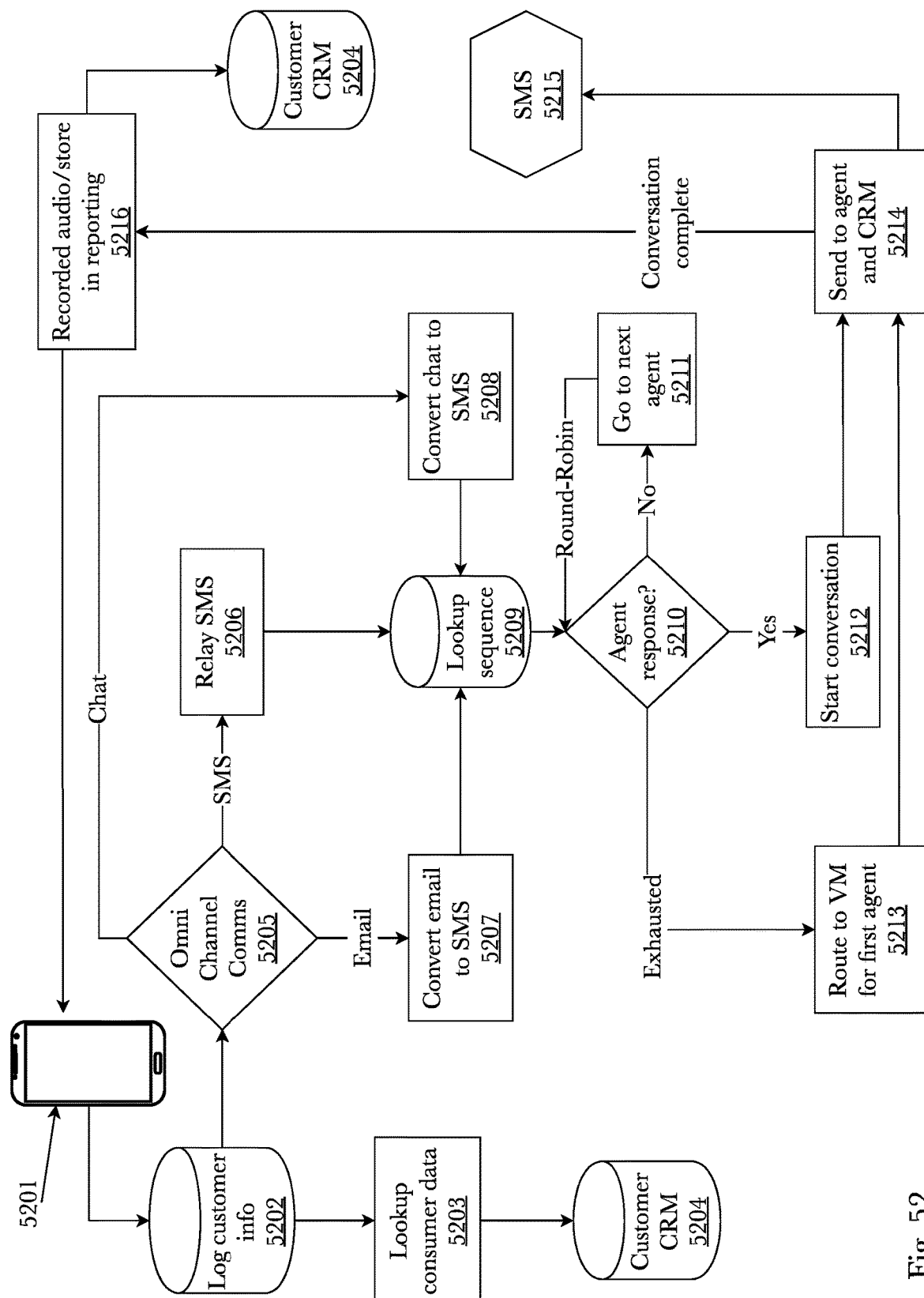
FIG. 52 is a method diagram illustrating omnichannel conversion to SMS between a customer and one or more agents, according to an embodiment.

FIG. 52 is a method diagram illustrating omnichannel conversion to SMS between a customer and one or more agents, according to an embodiment. This diagram illustrates a method for converting all omnichannel communications to text. Specifically, when a customer is presented with an option for a chat, in this case meaning a web-based chat, and he or she chooses to chat, all communications from the customer are converted to SMS texts and sent directly to an agent without the agent needing the application. The same may happen for emails, whereby a media translation system converts SMS texts from the agent to emails sent to the customer.

A consumer mobile device running an integrated advertisement and communication application 5201 comprises a unique tracking ID. That unique tracking ID allows the advertisement and communication application to log customer information passively and actively 5202 and then is stored in a customer CRM database 5204 to a customer profile matching the unique tracking ID. During the use or various purposes involving the advertisement and communication application, such as a tap text link or interaction, a lookup of the user's data using the unique ID 5203 to better inform sales and business agents with data about the interaction and customer. For example, during the use of a tap text application, a user may be presented with an option for chat, email, and/or text 5205. If the user chooses email or text, a media translation system will receive, convert 5207, 5208, and facilitate a conversation between the user and an agent. The agent will not need to have any application or special software to participate in the conversation as all incoming communications from the user 5201 are converted to SMS texts for the agent. If the consumer requests communication with an agent via text, the media translation system will relay those messages 5206, keeping both numbers anonymous. A lookup sequence is initiated 5209 whereby agent locations (users) and route types (sequential, round robin, percentage) are first identified. Agents may be contacted in a prioritized manner according to various parameters such as expertise, location, performance, scheduling, etc. Customer preferences may be considered as to a preferred type of communication regardless of the initial method of contact. Customer data such as location or hobbies may allow agents to strike up more personalized conversations with the customer to form a stronger relationship thus increasing sales. Typically, a round robin is performed 5211 until either an agent responds 5210, or the list of possible agents is exhausted and the customer will be routed to the voicemail on the primary agent's device 5213. Whether or not an agent makes contact with a customer 5109, messages 5215 such as SMS messages will be generated providing content as described in previous figures. Additionally, details and other telemetry will be sent to the agent of highest priority 5214. That agent may be any agent in the chain that actually made contact with the customer, or an agent that received a voicemail from the customer. Upon completion of a conversation 5212, or lack thereof, recorded audio and other details and reports are stored 5216 with the customer's profile in the CRM database 5204. At all times, uniquely identifying contact information, e.g., phone number, email, etc., of the customer and agents are hidden from each other regardless of which communication channel is used. Furthermore, the dynamic routing of an interaction is pulled from the mobile application via a webservice according to one aspect.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 16:
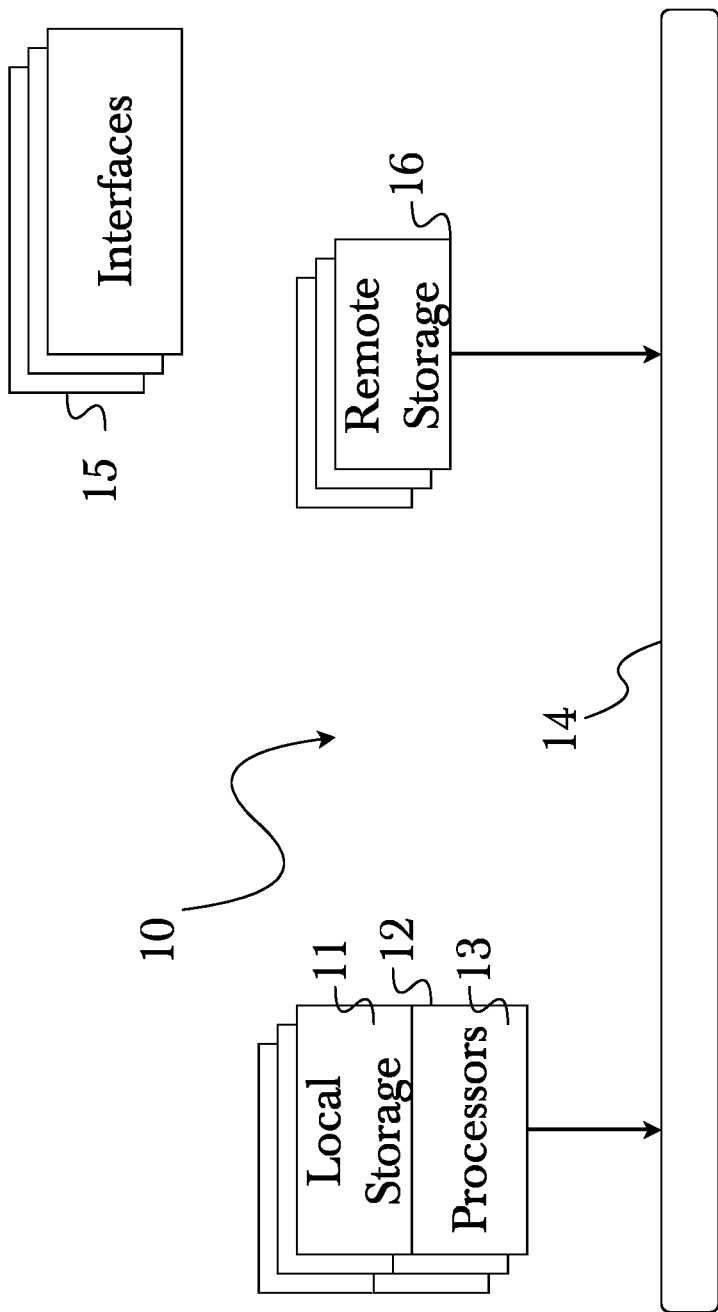
FIG. 16 is a block diagram illustrating an exemplary hardware architecture of a computing device.

Referring now to FIG. 16, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (A™) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity AN hardware interfaces) and, in some instances, volatile and/or non-volatile memory (e.g., RAM).

Although the system shown in FIG. 16 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 17:
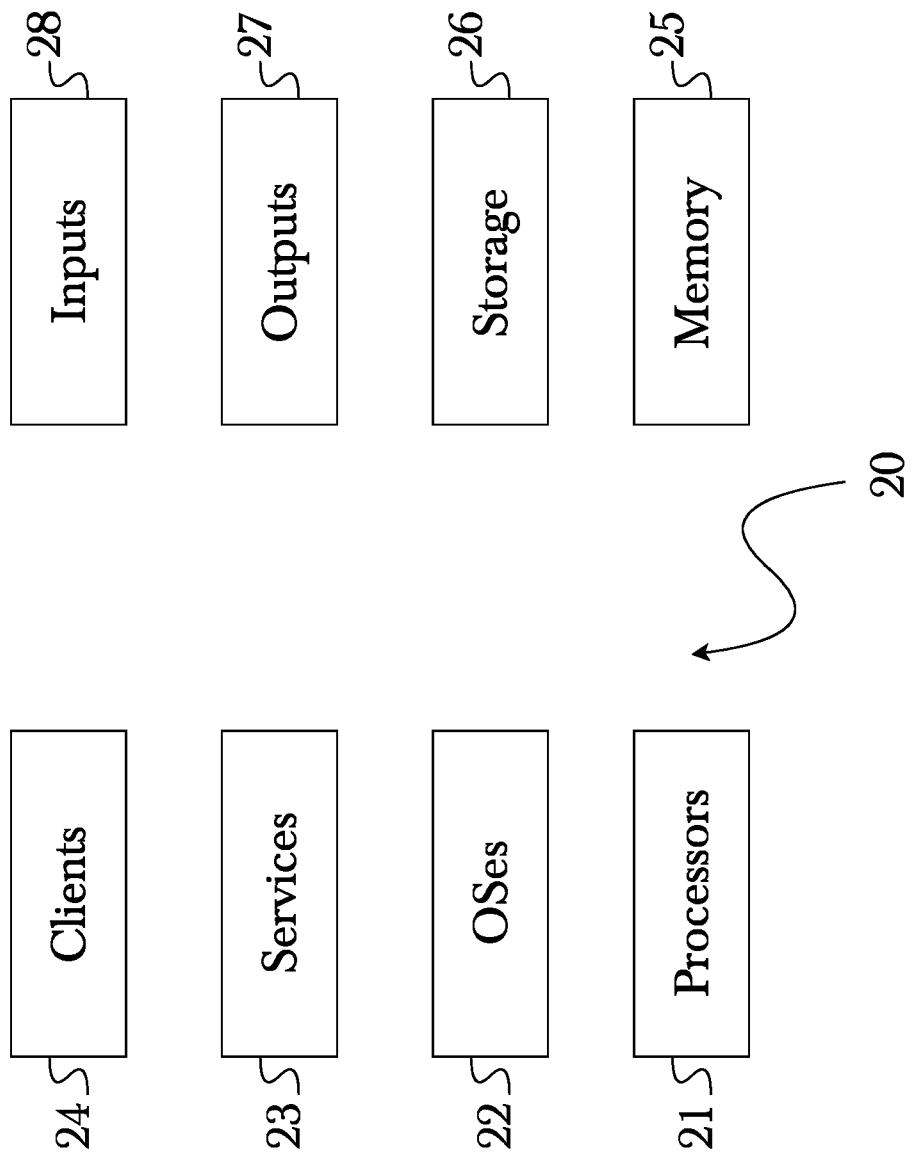
FIG. 17 is a block diagram illustrating an exemplary logical architecture for a client device.

In some embodiments, systems may be implemented on a standalone computing system. Referring now to FIG. 17, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 16). Examples of storage devices 26 include flash memory, magnetic hard drive, CD-ROM, and/or the like.

Figure 18:
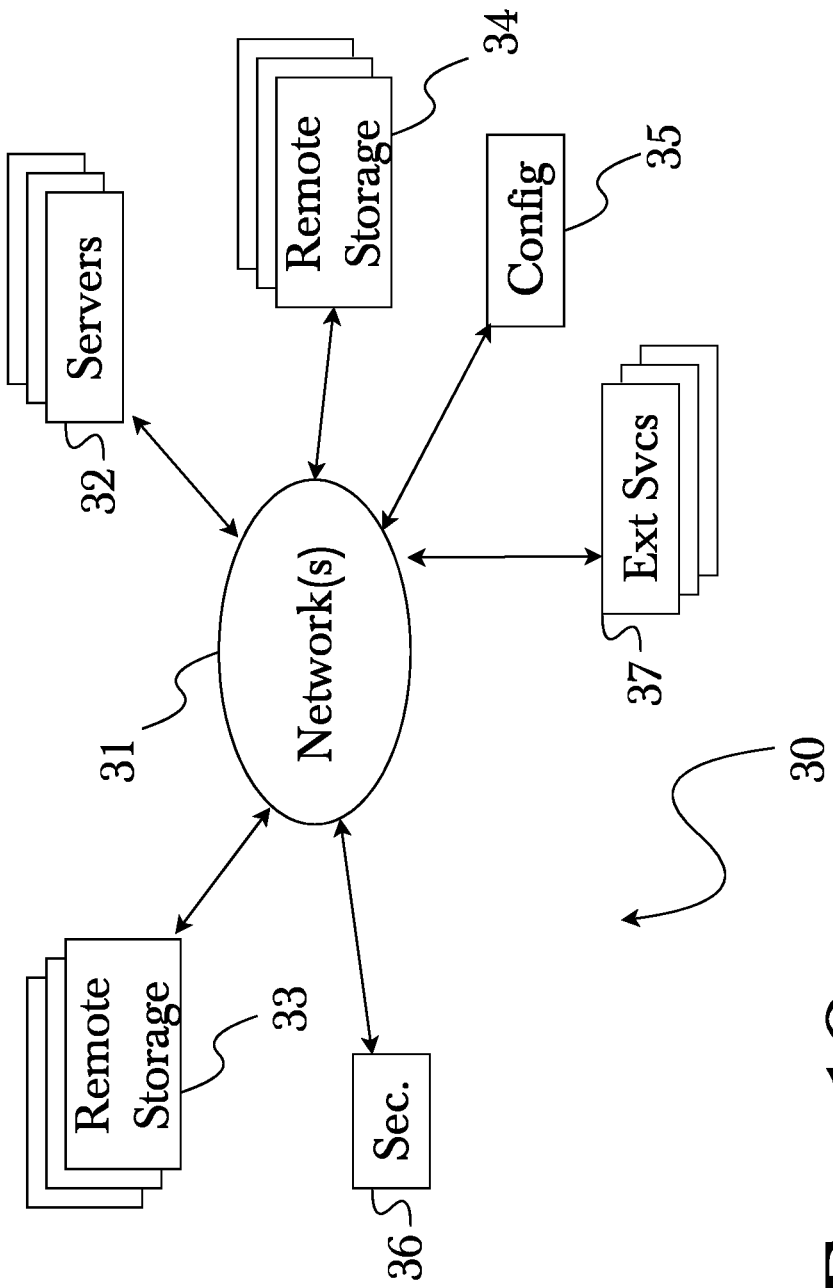
FIG. 18 is a block diagram showing an exemplary architectural arrangement of clients, servers, and external services.

In some embodiments, systems may be implemented on a distributed computing network, such as one having any number of clients and/or servers. Referring now to FIG. 18, there is shown a block diagram depicting an exemplary architecture 30 for implementing at least a portion of a system on a distributed computing network. According to the embodiment, any number of clients 33 may be provided. Each client 33 may run software for implementing client-side portions; clients may comprise a system 20 such as that illustrated in FIG. 17. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art. Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a SQL, while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific embodiment.

Figure 19:
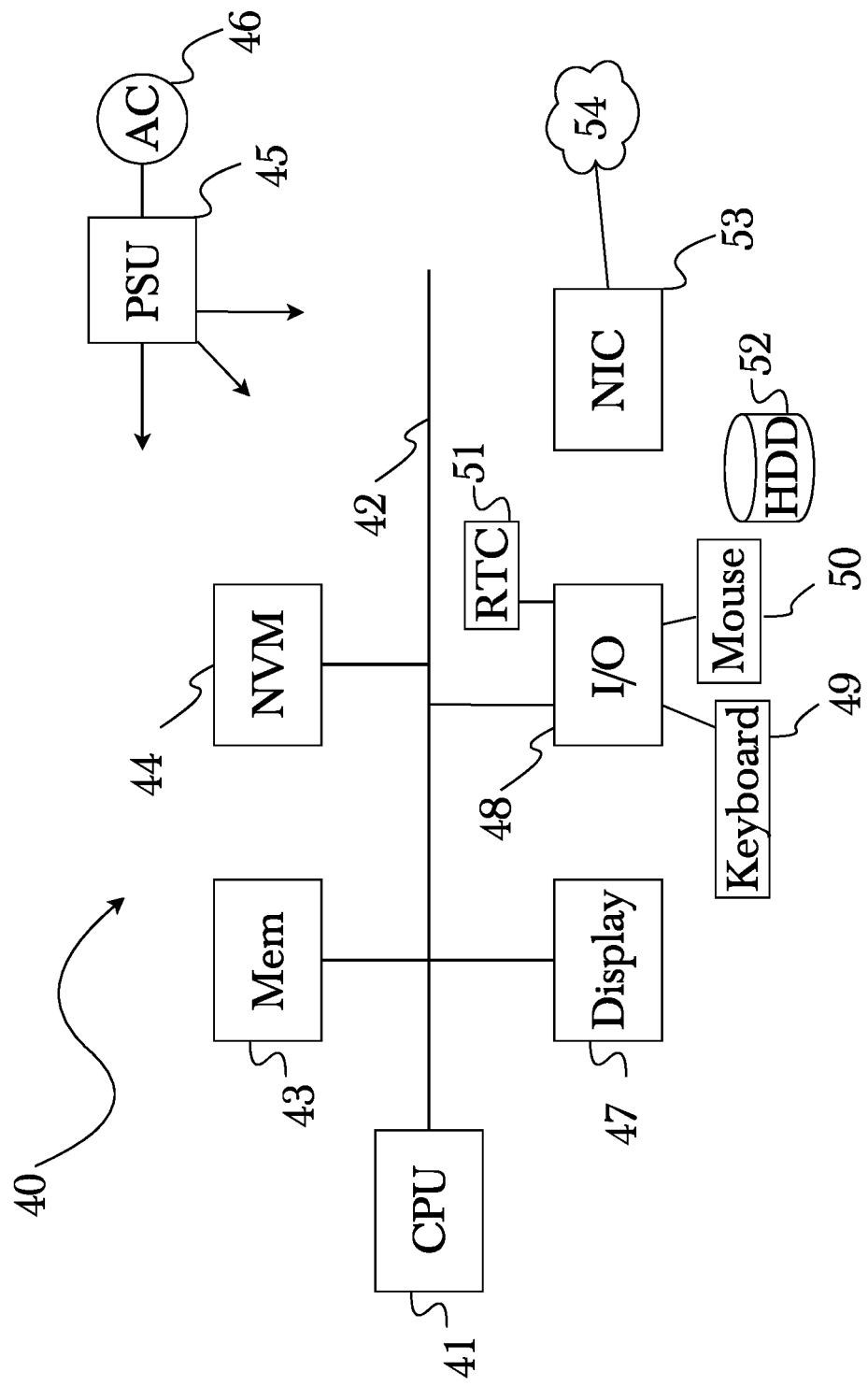
FIG. 19 is another block diagram illustrating an exemplary hardware architecture of a computing device.

FIG. 19 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods may be distributed among any number of client and/or server components. For example, various software modules may be implemented for performing various functions in connection with the various embodiments, and such modules may be variously implemented to run on server and/or client components.

The skilled person will be aware of a range of possible modifications of the various embodiments described above. Accordingly, the present invention is defined by the claims and their equivalents.

What is claimed is:
1. A system for real-time omnichannel voice interaction, comprising:
   an interaction control server comprising a first plurality of programming instructions stored in a memory of, and operable on a processor of, a computing device, wherein the first plurality of programming instructions, when operating on the processor of the computing device, cause the computing device to:
      receive a non-Internet-based phone call from a first user device;
      send a call routing request to a routing engine;
      receive a call route from the routing engine; and
      send the call route to a media translation server
   a routing engine comprising a second plurality of programming instructions stored in a memory of, and operable on a processor of, the computing device, wherein the plurality of programming instructions, when operating on the processor of the computing device, cause the computing device to:
      receive the call routing request from the interaction control server;
      retrieve a plurality of enterprise resources from an enterprise database;
      use a routing logic to iterate through the plurality of enterprise resources testing for a successful connection of the non-Internet-based phone call from the first user device to a second user device;
      select the first successfully connected enterprise resource as the second user device; and
      send the call route to the interaction control server, the call route is between the first user device and the first successfully connected enterprise resource, the first successfully connected enterprise resource being the second user device; and
   a media translation server comprising a third plurality of programming instructions stored in a memory of, and operable on a processor of, the computing device, wherein the third plurality of programming instructions, when operating on the processor of the computing device, cause the computing device to:
      receive the call route from the interaction control server;
      create a first set of interaction control legs between the first user device and the second user device, the interaction control legs comprising a network socket connection via the Internet; masking personally identifying information of the first user from the second user device, and of the second user from the first user device;

establish an Internet-based voice stream between the first user device and the second user device; and after the Internet-based voice stream is established, disconnect both the first set of interaction control legs and the non-Internet-based phone call.

2. The system of claim 1, wherein a notification of completion is sent to the interaction control server upon disconnection of any real-time voice stream.

3. The system of claim 1, wherein the routing logic is selected from the group consisting of priority ordered routing, circular ordered routing, and percentage-based algorithmic routing.

4. The system of claim 1, wherein the routing logic includes a timeout feature that re-routes the interaction to a subsequent user device if the interaction is not handled within a given time.

5. The system of claim 1, wherein the routing logic leverages artificial intelligence including machine learning and deep learning techniques based on prior customer interaction data, customer relationship management data, sales and marketing data and business operation data.

6. The system of claim 1, wherein the plurality of enterprise resources comprises more than one enterprise.

7. The system of claim 1, wherein the first user device comprises a mobile application to initiate the non-Internet-based phone call by clicking or tapping on a picture or graphic.

8. The system of claim 1, wherein the first user device receives an advertisement to initiate the non-Internet-based phone call.

9. The system of claim 1, wherein the iteration of testing for successful connections of the plurality of enterprise resources concludes once all enterprise resources have been attempted one or more times.

10. The system of claim 9, wherein the conclusion of the iteration configures the call route to be between the first user device and a voicemail, the voicemail associated with the enterprise.

11. A method for real-time omnichannel voice interaction, comprising the steps of:

receiving a non-Internet-based phone call from a first user device;

retrieving a plurality of enterprise resources from an enterprise database;

using a routing logic to iterate through the plurality of enterprise resources testing for a successful connection of the non-Internet-based phone call from the first user device to a second user device;

selecting the first successfully connected enterprise resource as the second user device;

creating a first set of interaction control legs between the first user device and the second user device, the interaction control legs comprising a network socket connection via the Internet;

masking personally identifying information of the first user from the second user device, and of the second user from the first user device;

establishing an Internet-based voice stream between the first user device and the second user device; and after the Internet-based voice stream is established, disconnecting both the first set of interaction control legs and the non-Internet-based phone call.

12. The method of claim 11, wherein a notification of completion is sent to the interaction control server upon disconnection of any real-time voice stream.

13. The method of claim 11, wherein the routing logic is selected from the group consisting of priority ordered routing, circular ordered routing, and percentage-based algorithmic routing.

14. The method of claim 1, wherein the routing logic includes a timeout feature that re-routes the interaction to a subsequent enterprise resource if the interaction is not handled within a given time.

15. The method of claim 11, wherein the routing logic leverages artificial intelligence including machine learning and deep learning techniques based on prior customer interaction data, customer relationship management data, sales and marketing data and business operation data.

16. The method of claim 11, wherein the plurality of enterprise resources comprises more than one enterprise.

17. The method of claim 11, wherein the first user device comprises a mobile application to initiate the non-Internet-based phone call by clicking or tapping on a picture or graphic.

18. The method of claim 11, wherein the first user device receives an advertisement to initiate the non-Internet-based phone call.

19. The method of claim 11, wherein the iteration of testing for successful connections of the plurality of enterprise resources concludes once all enterprise resources have been attempted one or more times.

20. The method of claim 19, wherein the conclusion of the iteration configures the call route to be between the first user device and a voicemail, the voicemail associated with the enterprise.

* * * * *